(12) United States Patent
Meadow

(10) Patent No.: US 12,169,991 B2
(45) Date of Patent: Dec. 17, 2024

(54) MULTILAYER MATERIAL WITH AN EMBEDDED PROCESSOR

(71) Applicant: LOCATORX, INC., Atlanta, GA (US)

(72) Inventor: William D. Meadow, Jacksonville, FL (US)

(73) Assignee: LocatorX, Inc., Atlanta, GA (US)

( * ) Notice: Subject to any disclaimer, the term of this patent is extended or adjusted under 35 U.S.C. 154(b) by 0 days.

(21) Appl. No.: 18/488,323

(22) Filed: Oct. 17, 2023

(65) Prior Publication Data

US 2024/0112516 A1    Apr. 4, 2024

Related U.S. Application Data

(63) Continuation of application No. 17/185,352, filed on Feb. 25, 2021, now Pat. No. 11,798,339, which is a
(Continued)

(51) Int. Cl.
*G07C 9/29* (2020.01)
*G01S 5/00* (2006.01)
(Continued)

(52) U.S. Cl.
CPC ............. *G07C 9/29* (2020.01); *G01S 5/0027* (2013.01); *G01S 5/0036* (2013.01); *G01S 5/02216* (2020.05); *G01S 5/0294* (2013.01); *G01S 5/10* (2013.01); *G01S 5/14* (2013.01); *H04W 4/021* (2013.01); *G06Q 10/0833* (2013.01); *G06Q 20/3224* (2013.01); *H04W 12/06* (2013.01)

(58) Field of Classification Search
CPC ..................................................... G07C 9/29
See application file for complete search history.

(56) References Cited

U.S. PATENT DOCUMENTS 3,397,400 A   8/1968   Maass et al.
3,613,095 A   10/1971  Elwood
(Continued)

FOREIGN PATENT DOCUMENTS

CN   1340936 A      3/2002
CN   101690271 A    3/2010
(Continued)

OTHER PUBLICATIONS

Extended European Search Report for European Application No. 16735315.0, mailed Aug. 23, 2018, 10 Pages.
(Continued)

*Primary Examiner* — Travis R Hunnings
(74) *Attorney, Agent, or Firm* — Joseph P. Kincart; Tracnik Law PLLC

(57) ABSTRACT

A multi-layer packaging material can include a layer of material with an outer surface and an inner surface. The layer of material formable into a package. An electronic circuit can be fixedly attached to the layer of material. The electronic circuit can include a clock, a processor in logical communication with the clock, a radio receiver, a transmitter, and a digital storage. The digital storage can include software executable upon demand. The software can be operative with the processor to cause the electronic circuit to receive and store radio signals from multiple reference points.

20 Claims, 32 Drawing Sheets

Related U.S. Application Data continuation of application No. 17/062,164, filed on Oct. 2, 2020, now Pat. No. 11,227,460, which is a continuation of application No. 16/536,753, filed on Aug. 9, 2019, now Pat. No. 10,825,278, which is a continuation of application No. 15/820,797, filed on Nov. 22, 2017, now Pat. No. 10,416,280, which is a continuation of application No. 15/803,163, filed on Nov. 3, 2017, now Pat. No. 10,310,053, which is a continuation of application No. 14/988,103, filed on Jan. 5, 2016, now Pat. No. 9,841,494.

(60) Provisional application No. 62/589,384, filed on Nov. 21, 2017, provisional application No. 62/189,427, filed on Jul. 7, 2015, provisional application No. 62/117,946, filed on Feb. 18, 2015, provisional application No. 62/100,033, filed on Jan. 5, 2015.

(51) Int. Cl.
| | | |
|---|---|---|
| *G01S 5/02* | (2010.01) | |
| *G01S 5/10* | (2006.01) | |
| *G01S 5/14* | (2006.01) | |
| *H04W 4/021* | (2018.01) | |
| *G06Q 10/0833* | (2023.01) | |
| *G06Q 20/32* | (2012.01) | |
| *H04W 12/06* | (2021.01) | |

(56) References Cited

U.S. PATENT DOCUMENTS

| | | | |
|---|---|---|---|
| 4,555,707 A | 11/1985 | Connelly | |
| 5,192,921 A | 3/1993 | Chantry et al. | |
| 5,600,418 A | 2/1997 | Hart et al. | |
| 5,696,514 A | 12/1997 | Nathanson et al. | |
| 5,945,948 A | 8/1999 | Buford et al. | |
| 5,959,580 A | 9/1999 | Maloney et al. | |
| 5,982,324 A | 11/1999 | Watters et al. | |
| 6,108,555 A | 8/2000 | Maloney et al. | |
| 6,119,013 A | 9/2000 | Maloney et al. | |
| 6,153,287 A | 11/2000 | Gasnier | |
| 6,201,499 B1 | 3/2001 | Hawkes et al. | |
| 6,324,586 B1 | 11/2001 | Johnson | |
| 6,331,817 B1 | 12/2001 | Goldberg | |
| 6,600,418 B2 | 7/2003 | Francis et al. | |
| 6,943,678 B2* | 9/2005 | Muirhead | B29C 51/12 340/572.8 |
| 7,069,096 B1 | 6/2006 | Maturana et al. | |
| 7,440,762 B2 | 10/2008 | Maloney et al. | |
| 7,558,157 B1 | 7/2009 | Gardner et al. | |
| 8,072,337 B2* | 12/2011 | Zank | G06K 19/07735 340/505 |
| 8,217,724 B2 | 7/2012 | Briggs et al. | |
| 9,894,485 B2 | 2/2018 | Finlow-Bates | |
| 9,943,128 B2 | 4/2018 | Atashbar et al. | |
| 10,178,203 B1 | 1/2019 | Simms | |
| 10,416,280 B2 | 9/2019 | Meadow | |
| 10,677,886 B2 | 6/2020 | Meadow | |
| 10,839,630 B2 | 11/2020 | Meadow et al. | |
| 10,863,330 B1 | 12/2020 | Lingle et al. | |
| 11,061,105 B2 | 7/2021 | Meadow | |
| 11,270,542 B2 | 3/2022 | Meadow et al. | |
| 11,579,239 B2 | 2/2023 | Meadow | |
| 2004/0160909 A1 | 8/2004 | Sheynblat | |
| 2004/0217654 A1 | 11/2004 | Maturana et al. | |
| 2005/0275531 A1 | 12/2005 | Johnson | |
| 2006/0012480 A1 | 1/2006 | Klowak | |
| 2006/0015233 A1 | 1/2006 | Olsen et al. | |
| 2007/0290803 A1 | 12/2007 | Ayyagari et al. | |
| 2008/0204200 A1 | 8/2008 | Zhu et al. | |
| 2009/0005061 A1 | 1/2009 | Ward et al. | |
| 2009/0303003 A1 | 12/2009 | Pritchard et al. | |
| 2010/0019887 A1 | 1/2010 | Bridgelall et al. | |
| 2010/0025934 A1 | 2/2010 | Hassman et al. | |
| 2010/0097208 A1 | 4/2010 | Rosing et al. | |
| 2010/0141435 A1 | 6/2010 | Breed | |
| 2010/0259334 A1 | 10/2010 | Briggs et al. | |
| 2011/0032081 A1 | 2/2011 | Wild | |
| 2011/0102264 A1 | 5/2011 | Sin et al. | |
| 2011/0156901 A1 | 6/2011 | Culpepper et al. | |
| 2012/0050033 A1 | 3/2012 | Westen | |
| 2012/0161967 A1 | 6/2012 | Stern | |
| 2013/0135107 A1 | 5/2013 | Craine | |
| 2013/0339498 A1 | 12/2013 | Johnson | |
| 2014/0084060 A1 | 3/2014 | Jain et al. | |
| 2014/0236611 A1 | 8/2014 | Ribble et al. | |
| 2014/0375505 A1 | 12/2014 | Anderson et al. | |
| 2016/0179076 A1 | 6/2016 | Groth | |
| 2016/0187143 A1 | 6/2016 | Colby et al. | |
| 2016/0195602 A1* | 7/2016 | Meadow | G01S 5/14 701/517 |
| 2017/0176949 A1 | 6/2017 | Liang et al. | |
| 2017/0366353 A1 | 12/2017 | Struttmann | |
| 2018/0343114 A1 | 11/2018 | Ben-Ari | |
| 2020/0034928 A1 | 1/2020 | Lim et al. | |
| 2024/0029589 A1* | 1/2024 | Krejcarek | G06K 1/121 |

FOREIGN PATENT DOCUMENTS

| | | |
|---|---|---|
| CN | 102204396 A | 9/2011 |
| EP | 2171546 A1 | 4/2010 |
| JP | 2006304193 A | 11/2006 |
| JP | 2007295057 A | 11/2007 |
| JP | 2008199530 A | 8/2008 |
| JP | 2010531990 A | 9/2010 |

OTHER PUBLICATIONS

Extended European Search Report for European Application No. 20208193.1, mailed Mar. 18, 2022, 16 Pages.

Hannah E.C., et al., "Conceptual Design of a Micron-Scale Atomic Clock," Arxiv.org, Cornell University Library, 201 Olin Library Cornell University Ithaca, NY 14853, Jul. 31, 2007, XP080295741.

International Preliminary Report on Patentability for International Application No. PCT/US2016/012223, mailed Feb. 17, 2017, 4 Pages.

International Search Report and Written Opinion for International Application No. PCT/US2016/012223, mailed Mar. 7, 2016, 9 Pages.

Non-Final Office Action for U.S. Appl. No. 18/148,514 mailed Oct. 24, 2023, 5 Pages.

Notice of Allowance for U.S. Appl. No. 17/062,164, mailed Nov. 26, 2021, 16 Pages.

Partial European Search Report for European Application No. 20208193.1, mailed Dec. 14, 2021, 16 Pages.

Torrieri D.J., "Statistical Theory of Passive Location Systems," IEEE Transactions on Aerospace and Electronic Systems, Mar. 1984, vol. AES-20, No. 2, pp. 183-198, XP011167896.

* cited by examiner

MULTILAYER MATERIAL WITH AN EMBEDDED PROCESSOR

CROSS REFERENCE TO RELATED MATTERS

This application is a continuation of U.S. patent application Ser. No. 17/185,352, filed on Feb. 25, 2021 and entitled "MULTILAYER MATERIAL WITH AN EMBEDDED PROCESSOR," which is a continuation of U.S. patent application Ser. No. 17/062,164, now U.S. Pat. No. 11,227,460, filed on Oct. 2, 2020, entitled Apparatus For Determining An Authenticated Location Of An Asset With A Global Resource Locator, which is a continuation of U.S. patent application Ser. No. 16/536,753 filed on Aug. 9, 2019, entitled Apparatus For Determining An Authenticated Location Of An Asset With A Global Resource Locator, which is a continuation of U.S. Pat. Ser. No. 10,416,280 filed on Nov. 22, 2017, entitled Methods for Tracking Assets with a Global Resource Locator, which claims priority of U.S. Provisional Patent Application No. 62/589,384 filed on Nov. 21, 2017, entitled Global Resource Locator Packaging and is a continuation of U.S. Pat. No. 10,310,053, filed on Nov. 11 3, 2017, entitled Global Resource Locator, which is a Continuation Application of U.S. Pat. No. 9,841,494 filed on Jan. 5, 2016, entitled Global Resource Locator, which claims the benefit of the United States Provisional Patent Application bearing the Ser. No. 62/100,033, filed Jan. 5, 2015 and entitled "Resocator," claims the benefit of the United States Provisional Patent Application bearing the Ser. No. 62/117,946, filed Feb. 18, 2015 and entitled "Resocator," claims the benefit of the United States Provisional Patent Application bearing the Ser. No. 62/189,427, filed Jul. 7, 2015 and entitled "Resocator." The contents of these heretofore mentioned applications are hereby incorporated by reference herein in their entireties.

FIELD OF THE DISCLOSURE

The present disclosure relates to a miniature location device, with a highly accurate timing mechanism, such as an atomic clock a security device that saves energy, time and effort by accurately locating, identifying, and tracking physical Assets and data contained within the Assets. More specifically, the present disclosure presents a physical device (sometimes referred to herein as a GRL Device) that may be adhered onto or inserted into an Asset and used to provide highly accurate tracking of a location of the Asset in relation to a reference or another Asset. The GRL Device may include a computer, a radio receiver and a trilateration mechanism and may be included in a product, organism, produce, or component of a product.

BACKGROUND OF THE DISCLOSURE

A simple review of news events indicates that in order to counter terrorism it is extremely helpful to be able to ascertain who is within an area defined by a boundary, such as boundary defined as a national border, or within a secured area in an authenticated manner. However, to date there is no economic and efficient method of ascertaining such information. Once admitted within a border, a person is relatively free to traverse an area within a Spatial Domain defined by that border. In addition, it is difficult to ascertain who a person admitted within a Spatial Domain has visited with or come into close proximity to.

It is known to use passports to gain access within a national border. In addition, it is known to utilize a security badge, which may include an identity photo to gain access to a secure area. However, it is very difficult to ascertain where within defined boundaries, a person associated with the passport or the security badge travels and when. It is also very difficult to ascertain who the person may have come into contact with while they are within the defined boundary.

In another aspect, location-based technology has surged in the past decade, and countless applications have integrated location-based features into their functionality. For example, Smartphones generally include a geo-location feature when not able to obtain GPS signals, and some of these software applications for the Smartphone depend on this capability as described in U.S. Pat. No. 5,945,948." However, a Smartphone is not a secure or reliable way to track an Asset other than the Smartphone itself.

Radio-frequency identification (RFID) is an example of wireless transfer of data for the purposes of automatically identifying and tracking tags attached to objects. RFID devices were seen by many as a way to replace barcodes because RFID tags allow a reader wirelessly query a tag and have the tag transmit back information stored on a semiconductor chip included in the tag. RFID tags are useful for readers in close proximity and to convey pre-stored information, but are generally limited to communications within a building or home.

ISO/IEC 20248 specifies a method whereby data stored within a barcode and/or RFID tag is structured and digitally signed. The purpose of the standard is to provide an open and interoperable method, between services and data carriers, to verify data originality and data integrity in an offline use case. The ISO/IEC 20248 data structure is also called a "DigSig" which refers to a small, in bit count, digital signature. ISO/IEC 20248 also provides an effective and interoperable method to exchange data messages in the Internet of Things [IoT] and machine to machine [M2M] services allowing intelligent agents in such services to authenticate data messages and detect data tampering." However, there are some drawbacks in the RFID technology framework and implementations that have limited its ability to provide more value, one of the key limitations is the inability for a RFID to Self-Locate.

Bluetooth has achieved adoption as data transmission protocol for allowing low power devices of many types to communicate and compared to traditional Bluetooth, Bluetooth Smart is designed to provide dramatically reduced power consumption and cost while providing comparable communication capabilities.

Bluetooth is viewed generally as a wireless technology standard for exchanging data over short distances (using short-wavelength UHF radio waves in the ISM band from 2.4 to 2.485 GHz) from fixed and mobile devices, and building personal area networks (PANs). Bluetooth may be managed by a Bluetooth Special Interest Group (SIG), which has more than 25,000 member companies in the areas of telecommunication, computing, networking, and consumer electronics." With this level of adoption billions of devices may support the new Bluetooth Low Energy that can enables a myriad of device types and useful applications. As Bluetooth usage becomes larger it may be desirable for people to be able to keep track of Bluetooth enabled devices. It may also be useful to have functionality for other Bluetooth devices to assist in finding missing items.

Internet of Things is currently going through a dramatic growth in market adoption due to the convergence of a variety of technologies that enable low cost low power transmission of data between "Things". The Internet of Things (IoT) is generally viewed as a network of physical objects or "things" embedded with electronics, software, sensors, and network connectivity, which enables these objects to collect and exchange data. It allows objects to be sensed and controlled remotely across existing network infrastructure, creating opportunities for more direct integration between the physical world and computer-based systems, and resulting in improved efficiency, accuracy and economic benefit; when IoT is augmented with sensors and actuators, the technology becomes an instance of the more general class of cyber-physical systems, which also encompasses technologies such as smart grids, smart homes, intelligent transportation and smart cities. Each thing is uniquely identifiable through its embedded computing system but is able to interoperate within the existing Internet infrastructure." However, there is no miniature apparatus or reliable method by which the IoT "things" may Self-Locate indoors and outside.

Location Based Services+ is the ability to open and close specific data objects based on the use of location and/or time as (controls and triggers) or as part of complex cryptographic key or hashing systems and the data they provide access to. Location based services today are a part of everything from control systems to smart weapons. They are actively used trillions of times a day and may be one of the most heavily used application-layer decision framework in computing today." However, the location data that is provided does not typically include any level of authentication to the coordinates. In the era of IoT devices, there are risks of asking or telling an IoT device to take some action and or report information if does not know or can report its actual location.

There are numerous strategies and technologies available for locating objects indoors. Due to the signal attenuation caused by construction materials, the satellite based Global Positioning System (GPS) loses significant power indoors affecting the required coverage for receivers by at least four satellites. In addition, the multiple reflections at surfaces cause multi-path propagation serving for uncontrollable errors. These very same effects are degrading all known solutions for indoor locating which uses electromagnetic waves from indoor transmitters to indoor receivers. Physical and mathematical methods have been applied to compensate for these problems.

An indoor positioning system (IPS) is a system to locate objects or people inside a building using radio waves, magnetic fields, acoustic signals, or other sensory information collected by mobile devices. There are several commercial systems on the market, but there is no standard for an IPS system. System designs must take into account that at least three independent measurements are needed to unambiguously find a location (see trilateration).

Indoor Positioning Systems use different technologies, including distance measurement to nearby anchor nodes (nodes with known positions, e.g., Wi-Fi access points), magnetic positioning, dead reckoning. They either actively locate mobile devices and tags or provide ambient location or environmental context for devices to get sensed. The localized nature of an IPS has resulted in design fragmentation, with systems making use of various optical, radio, or even acoustic technologies." The challenges of determining precise location requires that the system use highly accurate clocks to calculate TDOA Time Delay of Arrive, just as GPS satellites do provide that information for ground units to process and determine location.

As referenced in U.S. Pat. No. 5,982,324 by Watters et al, Another problem encountered is that the typical clock in a cellular mobile terminal does not measure time precisely, and may have a tendency to drift, generally known as clock drift. Therefore, time measurements may be made by the terminal are not extremely accurate, which results in an erroneous time and therefore location determination. The error due to the drift grows larger the longer the mobile terminal clock is used.

As referenced in US2014/0375505A1 TV signals may generate a receiver location was taught in U.S. Pat. No. 4,555,707 entitled "Television pulsed navigation system". Improvements to the art include the use of DTV signals for location, customization of the DTV signal, and the hybridization of DTV broadcast location with other network-based or mobile-based location technologies.

US patent 7,440.762 provides examples of such infrastructure-based (or network-based) systems for the determination of locations for Wireless mobile units are found in Stilp, et al. The use of collateral information to enhance and even enable location determination in further applications of such infrastructure based systems is described in Maloney, et al., U.S. Pat. No. 5,959,580; and further described in Maloney, et al., U.S. Pat. Nos. 6,108,555 and 6,119,013.

U.S. Pat. No. 6,201,499 describes the estimation of forming hyperbolas from the TDOA calculations between the three or more receiving sensors. Transmitter location is estimated from the intersection of two or more independently generated hyper bolas determined from three or more receiving sensors. Methods for determining RF transmitter location based on time difference of arrival are discussed in greater detail in "Statistical Theory of Passive Location Systems" by Don J. Torrieri (IEEE Transactions on Aerospace and Electronic Systems, Vol. AE, 5-20, No. 2, March 1984, pp. 183-198) which is expressly incorporated herein by reference.

Along with the advent of a large number of simple hackable computers (aka IoT Devices) has created well deserved concerns that have slowed or impeded technology adoption in environments where they can provide useful services.

A strong set of security capabilities exist today and our disclosure will outline how we will implement required security framework with open source and custom development in our apparatus with new methods to resolve concerns and provide a trustworthy environment for the growth of machines that can help improve our lives. There is a need for improved Security in the M2M and IoT era and we share some history to some solutions that have been deployed.

Security Counterfeiting: There is a significant global counterfeiting problem that interferes with normal commerce and the free exchange of goods. Counterfeiting is generally accepted to mean to imitate something. Counterfeit products are fake replicas of the real product. Counterfeit products are often produced with the intent to take advantage of the superior value of the imitated product. The word counterfeit frequently describes both the forgeries of currency and documents, as well as the imitations of clothing, handbags, shoes, pharmaceuticals, aviation and automobile parts, watches, electronics (both parts and finished products), software, works of art, toys, movies."

Security Authentication is generally accepted to mean a goal to provide authentication. It is the act of confirming the truth of an attribute of a single piece of data (a datum) claimed true by an entity. In contrast with identification which refers to the act of stating or otherwise indicating a claim purportedly attesting to a person or thing's identity, authentication is the process of actually confirming that identity. A vendor selling branded items implies authenticity, while he or she may not have evidence that every step in the supply chain was authenticated. Another type of authentication relies on documentation or other external affirmations. In criminal courts, the rules of evidence often require establishing the chain of custody of evidence presented. This can be accomplished through a written evidence log, or by testimony from the police detectives and forensics staff that handled it."

Security Packaging is generally accepted to mean techniques for minimizing counterfeiting. Packages may include authentication seals and use security printing to help indicate that the package and contents are not counterfeit; these too are subject to counterfeiting. Packages also can include anti-theft devices, such as dye-packs, RFID tags, or electronic article surveillance tags that can be activated or detected by devices at exit points and require specialized tools to deactivate."

Over the past three decades security technologies have evolved to provide basic capabilities of verifying the integrity of messages between trading parties. A public key infrastructure (PKI) is a set of hardware, software, people, policies, and procedures needed to create, manage, distribute, use, store, and revoke digital certificates and manage public-key encryption.

The purpose of a PKI is to facilitate the secure electronic transfer of information for a range of network activities such as e-commerce, internet banking and confidential email. It is required for activities where simple passwords are an inadequate authentication method and more rigorous proof is required to confirm the identity of the parties involved in the communication and to validate the information being transferred. In order for Enveloped Public Key Encryption to be as secure as possible, there needs to be a "gatekeeper" of public and private keys, or else anyone could create key pairs and masquerade as the intended sender of a communication, proposing them as the keys of the intended sender. This digital key "gatekeeper" is known as a certification authority.

A certification authority is a trusted third party that can issue public and private keys, thus certifying public keys. It also works as a depository to store key chain and enforce the trust factor. PKI Key escrow (also known as a "fair" cryptosystem) is an arrangement in which the keys needed to decrypt encrypted data are held in escrow so that, under certain circumstances, an authorized third party may gain access to those keys. These third parties may include businesses, who may want access to employees' private communications, or governments, who may wish to be able to view the contents of encrypted communications."

Public Private Key methods have become the defacto standard for encryption of electronic Messages between systems. In 1977, a generalization of Cocks' scheme was independently invented by Ron Rivest, Adi Shamir and Leonard Adleman, all then at MIT. The latter authors published their work in 1978, and the algorithm came to be known as RSA, from their initials. RSA uses exponentiation modulo a product of two very large primes, to encrypt and decrypt, performing both public key encryption and public key digital signature. Its security is connected to the extreme difficulty of factoring large integers, a problem for which there is no known efficient general technique. Public-key cryptography refers to a set of cryptographic algorithms that are based on mathematical problems that currently admit no efficient solution—particularly those inherent in certain integer factorization, discrete logarithm, and elliptic curve relationships.

It is computationally easy for a user to generate a public and private key-pair and to use it for encryption and decryption. The strength lies in the "impossibility" (computational impracticality) for a properly generated private key to be determined from its corresponding public key. Thus the public key may be published without compromising security. Security depends only on keeping the private key private."

A Secure Hash Algorithm 2) SHA-2) is a set of cryptographic hash functions designed by the NSA. [3] SHA stands for Secure Hash Algorithm. Cryptographic hash functions are mathematical operations run on digital data; by comparing the computed "hash" (the output from execution of the algorithm) to a known and expected hash value, a person can determine the data's integrity.

The integrity of communication from a person or a machine is critical for one to trust and rely on the message. An important application of secure hashes is verification of message integrity. Determining whether any changes have been made to a message (or a file), for example, can be accomplished by comparing message digests calculated before, and after, transmission (or any other event). For this reason, most digital signature algorithms only confirm the authenticity of a hashed digest of the message to be "signed". Verifying the authenticity of a hashed digest of the message is considered proof that the message itself is authentic. MD5, SHA1, or SHA2 hashes are sometimes posted along with files on websites or forums to allow verification of integrity. This practice establishes a chain of trust so long as the hashes are posted on a site authenticated by HTTPS.

In this era of M2M, and IoT where machines and things are communicating what can be critical information, the authenticity is critical as well. Digital signatures, in which a message is signed with the sender's private key and can be verified by anyone who has access to the sender's public key. This verification proves that the sender had access to the private key, and therefore is likely to be the person associated with the public key. This also ensures that the message has not been tampered with, as any manipulation of the message will result in changes to the encoded message digest, which otherwise remains unchanged between the sender and receiver.

Physical products that have been serialized for many reasons, most importantly it is so individual items can be tracked. In the world of computerized objects, they have also been serialized, typically with very large "product keys" for verification and activation of a purchased electronic product. Many times these "keys" can come in the form of a "public key" or as described herein it could also be a UUID.

The intent of UUIDs is to enable distributed systems to uniquely identify information without significant central coordination. In this context the word unique should be taken to mean "practically unique" rather than "guaranteed unique". Since the identifiers have a finite size, it is possible for two differing items to share the same identifier. This is a form of hash collision. The identifier size and generation process need to be selected so as to make this sufficiently improbable in practice.

A UUID may be created and used to identify something with reasonable confidence that a same identifier will not be unintentionally created by anyone to identify something else. Information labeled with UUIDs can therefore be later combined into a single database without needing to resolve identifier (ID) conflicts. A globally unique identifier GUID is a unique reference number used as an identifier in computer software. The term "GUID" typically refers to various implementations of the universally unique identifier (UUID) standard."

In contrast, symmetric-key algorithms include variations of which have been used for thousands of years and use a single secret key. The single key must be shared and kept private by both the sender and the receiver, for example in both encryption and decryption.

To use a symmetric encryption scheme, the sender and receiver must securely share a key in advance. Because symmetric key algorithms are nearly always much less computationally intensive than asymmetric ones, it is common to exchange a key using a key-exchange algorithm, then transmit data using that key and a symmetric key algorithm. PGP and the SSL/TLS family of schemes use this procedure, and are thus called hybrid cryptosystems."

Security One time Pads is a well-known technique to implement one time pads to further protect the authenticity of identity. However, there is no public-key scheme with this property, since all public-key schemes are susceptible to a "brute-force key search attack". Another potential security vulnerability in using asymmetric keys is the possibility of a "man-in-the-middle" attack, in which the communication of public keys is intercepted by a third party (the "man in the middle") and then modified to provide different public keys instead.

A common fraudster technique used in Internet is spoofing. A spoofing attack is a situation in which one person or program successfully masquerades as another by falsifying data. The false program thereby gains an illegitimate advantage. Spoofing can work with GPS and just about any other technology that provides location information. A GPS spoofing attack attempts to deceive a GPS receiver by broadcasting counterfeit GPS signals, structured to resemble a set of normal GPS signals, or by rebroadcasting genuine signals captured elsewhere or at a different time.

With the massive growth of M2M and IoT devices, the Message that needs to be authenticated may be coming from a machine not a person or any combination thereof. Message authentication involves hashing the message to produce a "digest" and encrypting the digest with the private key to produce a digital signature. Thereafter anyone can verify this signature by (1) computing the hash of the message, (2) decrypting the signature with the signer's public key, and (3) comparing the computed digest with the decrypted digest. Equality between the digests confirms the message is unmodified since it was signed, and that the signer, and no one else, intentionally performed the signature operation. This presumes that the signer's private key has remained secret. The security of such procedure depends on a hash algorithm of such quality that it is computationally impossible to alter or find a substitute message that produces the same digest but studies have shown that even with the MD5 and SHA-1 algorithms, producing an altered or substitute message is not impossible. A current hashing standard for encryption is SHA-2. The message itself can also be used in place of the digest.

With a large number of IoT devices being deployed a large number of network topologies are in use in mesh networks. A mobile ad hoc network (MANET) is a continuously self-configuring, infrastructure-less network of mobile devices connected without wires. Each device in a MANET is free to move independently in any direction, and will therefore change its links to other devices frequently. Each must forward traffic unrelated to its own use, and therefore be a router. The primary challenge in building a MANET is equipping each device to continuously maintain the information required to properly route traffic. Such networks may operate by themselves or may be connected to the larger Internet. They may contain one or multiple and different transceivers between nodes. This results in a highly dynamic, autonomous topology.

BRIEF SUMMARY OF THE DISCLOSURE

The present disclosure provide for methods and apparatus that may be applied to multiple purposes where the authenticity of aspects describing: who, what, where, when and how may be authenticated thereby providing efficiencies in many aspects of human commerce and activities. In general, GRL Device makes use of the functionality of a miniature atomic clock ("MAC") to calculate precise Self-Locating coordinates describing one or more geospatial locations. The geospatial locations may be combined with unique identifiers to generate a trail of data indicating where a GRL Device is and where it has been, as well as environmental conditions GRL Device encountered. In addition, a GRL System may track a proximity to other GRL Devices associated with other uniquely identified objects and/or persons. A geospatial location may be determined via one or both of trilateration and triangulation methods that incorporating reference transmitter locations with Time Delay of Arrival calculations. In some implementations, a GRL Device will include a set of security features that enable novel methods of providing an appropriate level Security Seal to those who wish to integrate GRL Devices into their operations.

Accordingly, a GRL Device will include some of the following, but not be limited to: UUIDs, Secret Keys (as part of a Key Pair), One Time Pads with variable data structures and formats for retrieval, Data Hashing Algorithms, Trilateration Algorithms for processing input from multiple types of signals, sensor arrays for detecting the environment as well as electromagnetic radiation (signals). GRL Device may produce an Authenticated Location designation which in turn may be associated with an Authenticated serial number assigned to a particular Asset.

The present disclosure teaches apparatus and methods that utilize precise timings of a Miniature Atomic Clock to perform trilateration calculations using strong terrestrial signals from Reference Points that currently penetrate most structures around the world.

In some implementations, a GRL Device can Self-Authenticate its location as well as its location of manufacture. A GRL Device that is Affixed to an asset can provide automatic serialization and tracking of that individual Asset. Hashed messages generated from information provided by a GRL Device provide an ascertainable degree of trust. GRL Devices with one time pads can provide extremely secure message delivery.

In another aspect, the present disclosure additionally provides apparatus and methods for precise timing and location. In addition, the disclosure provides apparatus and methods to enable Authenticated Location Data on Serialized Assets (ALDOSA). According to some aspects of the present invention, the precise timing and location may be used to track movement of a person or asset within a defined boundary and proximity of a first person or asset to a second person or asset within the boundary. A GRL Device and supporting systems enable indoor and outdoor location determination of the GRL Device. The GRL Device may be Affixed to an Asset such as a passport or a security badge and tracked according to physical location, time of day and proximity to other GRL Devices. In addition, in some implementations, the GRL Device provides data from sensors incorporated into the GRL Device and may provide data indicative of almost any ascertainable data measurable by the GRL Device.

The implementation of Miniature Atomic Clocks will enable the opportunity to offer a variety of improve operations to IoT devices by adding the trilateration capabilities with accurate location fixing for a wide range of Assets including and especially for IoTs that would benefit from knowing their precise location indoors and out without the need for GPS receivers nor various incompatible custom beacons installations that may or may not be trustworthy Reference Points.

In some embodiments our Miniature Atomic Clock may operate with the zero standby power (such as with a class of fullerene based MACs as disclosed herein) and finally as we disclose in this document the addition of security keys affixed to the physical GRL Device itself there is a fundamental set of protections available to the owner of the GRL Device.

In some implementations, a GRL Device may include a miniature atomic clock in logical communication with a processor that is also in logical communication with a receiver for receiving timing signals from multiple reference locations. The GRL Device also includes a memory for storing a unique identifier and an affixing vehicle for affixing the GRL Device to an Asset. Affixing the GRL Device to the Asset thereby associates a UUID with the asset. The GRL Device may also include a wireless transmitter for transmitting data a digital storage including location coordinates of known transmitters. The location coordinates may be accessible to the processor. Executable software may be stored on the GRL Device and executable on demand. The software is operative with the processor to cause the GRL Device to: receive respective transmissions from the multiple reference locations; determine a physical location of the GRL Device based on the respective transmissions received from the multiple reference locations and the location coordinates of known transmitters; and transmit an authenticated location including the UUID and the determined physical location. In some implementation, a private key may also be transmitted.

In additional aspects, a method is provided for determining a location of an asset, wherein the method included the steps of: entering a value for a universally unique identifier (UUID) and a private key into the digital memory of the GRL Device; affixing a GRL Device including a processor, a digital memory, a miniature atomic clock and data receptor to the asset; associating the UUID with the asset; generating a timing signal via the miniature atomic clock; receiving a respective timing signal from three or more reference locations; determining a physical location of the GRL Device via execution of programmable code by the processor, where the physical location is based upon the respective timing signal from three or more reference locations and the timing signal from the atomic clock; and transmitting the determined physical location, the private key and the UUID via a smart gateway configured to provide logical communication between the processor and a digital communications network.

A public key that may be matched with a hash value to verify a physical location of an asset to which the GRL Device is affixed.

In still another aspect, GRL System is described for tracking a location of multiple GRL Devices, the GRL System may include: a network server in logical communication with a digital communications network; one or more smart gateways in logical communication with the digital communications network and in logical communication with at least one GRL Device via wireless communication; a first GRL Device affixed to an asset and in logical communication with one or both of the smart gateway and the network server, the first GRL Device including: a miniature atomic clock; a processor in logical communication with the miniature atomic clock; a receiver for receiving timing signals from multiple reference locations; a memory for storing a unique identifier; an affixing vehicle for affixing the first GRL Device to an asset and thereby fixedly associating the UUID with the asset; a wireless transmitter for transmitting data signals; a digital storage including location coordinates of known transmitters, the location coordinates accessible to the processor; and executable software stored on the first GRL Device and executable on demand, wherein the software may be operative with the processor to cause the first GRL Device to: receive respective transmissions from the multiple reference locations; determine a physical location of the first GRL Device based on the respective transmissions received from the multiple reference locations and the location coordinates of known transmitters; and transmit the UUID and the determined physical location to the smart gateway via wireless communications.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

Figure 1:
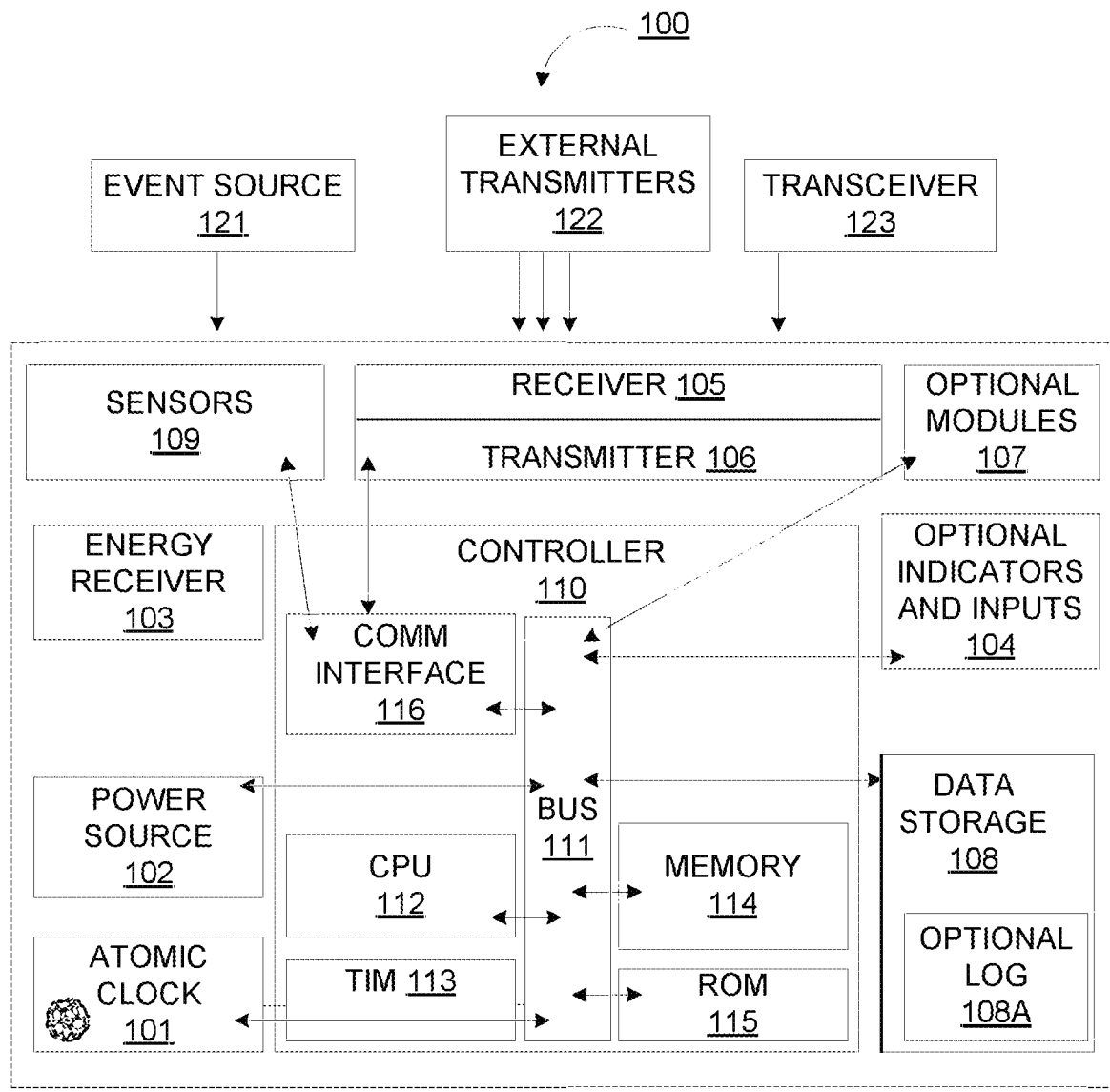
FIG. 1 illustrates an exemplary embodiment of a GRL Device with base components and optional components.

The present disclosure provides generally for energy and security related benefits from a miniature and serialized location device with a highly accurate timing mechanism, such as an atomic clock. According to the present disclosure, a GRL Device may be attached to, inserted into, incorporated as part of or otherwise fixedly associated with an Asset and thereby enable precise location determination of the Asset. The GRL Device may receive wireless data transmissions from external sources and use information included in the data transmissions to calculate its location by referencing an internal Miniature Atomic Clock, hereinafter sometimes referred to as a "MAC" (further defined below).

In the following sections, detailed descriptions of examples and methods of the disclosure will be given. The description of both preferred and alternative examples are exemplary only, and it is understood that to those individuals and teams skilled in the arts that variations, modifications, and alterations may be apparent. It is therefore to be understood that the examples do not limit the broadness of the aspects of the underlying disclosure as defined by the claims.

The invention will enable among other things, the ability to provide Authenticated Location Data On Serialized Asset (s) we further abbreviate this capability as "ALDOSA". Some aspects will may be enabled by implementing a variety of proprietary and/or open source reference implementations of one or more of: Integrated Development Environments for applications and databases, PKI systems, and RF test environments to name a few.

One skilled in the art will recognize a broad array implementations utilizing GRL Device enabled Assets that provide utility and value to society at large. The following description includes a few examples that highlight some aspects and value of the present invention.

In general the present invention that leverages the capabilities of a solid state miniature atomic clock. Some preferred embodiments incorporate a miniature atomic clock design as invented by Professor George Andrew Davidson Briggs and Arzhang Ardavan of Oxford University and generally described in European Patent 2171546 entitled "Nano Clock" and U.S. Pat. No. 8,217,724 entitled "Atomic Clock" both of which are incorporated herein by reference. The present disclosure provides for the ability to combine multiple Miniature Atomic Clocks working together in a synchronized fashion would enable improved time keeping.

Another aspect of the present disclosure enables the provision of identification and location information for massive numbers of low band with IoT devices on cellular frequencies providing. The disclosed GRL Device with its MAC enhanced timing will offers improved utilization of bandwidth and lower collisions on their network traffic at various nodes.

The present disclosure provides for the ability to combine multiple Miniature Atomic Clocks working together in a synchronized fashion would enable improved time keeping.

Another aspect of the present disclosure enables the provision of identification and location information for massive numbers of low band with IoT devices on cellular frequencies providing. The disclosed GRL Device with its MAC enhanced timing will offers improved utilization of bandwidth and lower collisions on their network traffic at various nodes.

In still another aspect of the present invention, systems integrators in multiple industries are provided with trustworthy indoor and outside location information providing solutions using Assets that have GRL Devices Affixed. The ability of GRL Devices to form Collectives and securely unify Authenticated Locations from GRLEAs that can selectively and securely broadcast information from their Assets Sensor Data and other information opens a wide variety of useful capabilities.

Referring now to FIG. 1, a block diagram of some implementations of a GRL Device 100 is illustrated. The GRL Device 100 includes multiple components 101-116 providing various functionality to the GRL Device 100 as a unit. In some embodiments, the components of a GRL Device can be assembled and built in high volume production lines with well-known Micro Electro Mechanical Systems (MEMS) wafer bonded to standard COTS CMOS based manufacturing technology to enable the various features of a GRL Device, which may be applied for a range of purposes, such as product tracking, vehicle tracking, personnel tracking, container tracking, Asset tracking and any combinations thereof.

As described herein, the GRL Device 100 is based upon a highly accurate timing device, such as a miniature atomic clock 101 in logical communication with a processor, such as a CPU 112 included in a miniature controller 110. The controller 110 includes a data bus 111 to provide a vehicle for logical communication amongst components 111-116 located internal to the controller 110 and, in some implementations, to components located external 121-123 to the controller 110. In various embodiments, the data bus 111 may be an 8 bit bus, a 16 bit bus, a 32 bit bus a 64 bit bus or a 128 bit bus.

Base components of GRL Device may include, by way of non-limiting example: a miniature atomic clock 101 or other highly accurate, micro or nano sized timing device; a Power Source 102, an Energy Receiver 103, one or more indicators and/or inputs devices; a Receiver 105 for logical communication; a Transmitter 106 for logical communication; a Module 107; a Data Storage 108, which may include a log 108A; Sensors 109; a Controller 110; a data bus 111; a CPU 112; a TIM 113; a dynamic Main Memory 114; a Read only Memory 115; and a communications interface 116. In some embodiments, one or more components may be incorporated into a commercially available controller unit. Components external to a GRL Device 100 may include an Event Source 121; External Transmitters 122 and an External Transceiver 123.

The highly accurate, micro sized timing device, such as miniature Atomic Clock 101 provides highly accurate timing information in a small energy efficient package. High accuracy of the timing device allows for more accurate location calculations. A miniature Atomic Clock 101, for example, may provide accuracy in the range of $10^{-7}$ to $10^{-9}$ of a second per day, as compared to traditional timing devices, such as quartz based timing devices which in general are several magnitudes less accurate. In some implementations, the miniature Atomic Clock 101 operates on electrical energy made available via an on chip power source that energizes the metallic coils that create the electromagnetic waves. Examples of a suitable Atomic Clock 101 are discussed in U.S. Pat. No. 8,217,724 to Briggs and include an endohedral fullerene system to provide standard frequency oscillations.

In preferred embodiments, highly accurate timing information provided by a miniature atomic clock or other highly accurate micro sized timing device, includes timing data accurate to about $10^{-7}$ seconds per day (for a frequency error of approximately 1 part in $10^{12}$). Additional embodiments may include even higher accurate timing information. Atomic clocks are generally several orders of magnitude better than LC Circuits, Quartz or MEMS clocks. In some implementations, a Miniature Atomic Clock (MAC) may be susceptible to changes in external conditions, such as temperature and/or magnetic fields. Accordingly, stability and/or compensating arrangements may mitigate the influence of external conditions. For example, the compensating arrangements may comprise a variable a physical displacement/adjustment, or publishing of calibration quality data.

In another aspect, in some implementations, a Timing Interface Module, TIM 113 is in logical communication with the Atomic Clock 101 and thereby enables transfer of digital information from the Atomic Clock 101 to the TIM 113 including an indication of a time value to the Timing Interface Module.

A Power Source 102 includes a source of electrical energy suitable for powering the GRL Device 100 in one or both of a sleep mode and an operations mode. Power Source may therefore include one or more of: a battery, a capacitor, a fuel cell, or other mechanism capable of supplying a necessary level of voltage and amount of current to power the GRL Device during one or more states of operation.

In some implementations, an Energy Receiver 103 may supplement or supplant a Power Source 102. An Energy Receiver 103 receives energy from a source external to the GRL Device 100 and include electromagnetic energy of a wavelength suitable for receipt by the Energy Receiver 103. The Energy Receiver may include, for example, one or more of: an induction coil, a power antenna, an ambient energy harvesting device or other mechanism capable of supplying power directly to components 101-116 of the GRL Device during one or more states of operation, or being stored in a Power Source 102 for subsequent use be the GRL Device 100.

An ambient energy harvesting device may include a wireless energy receptor, such as, for example, one or more of: an antenna, a coil, and a lead, tuned for, or otherwise suitable for receiving electromagnetic energy. The wireless energy receptor can include a conductive material, such as, for example, a metallic material. Suitable metallic materials include: gold, silver and copper. Conductive fibers may also be suitable, such as conductive carbon fibers.

In some embodiments, a GRL Device 100 may interface with an external power source emitting a bandwidth of electromagnetic energy to GRL Devices in proximity to the external power source. The bandwidth of electromagnetic energy may be tuned to a set of frequencies suitable for being harvested by an antenna, coil or other energy harvesting aspect included with the GRL Device 100.

In some examples, a Power Source 102 may include an energy harvester that includes a motion based device, such as a piezoelectric film or acoustical receiver. Other examples include power derived from a mechanism that utilizes photovoltaic, thermal differential, ultrasonic, biological, and/or IR, as non-limiting examples.

A processor, such as a Central Processing Unit, CPU 112, is included in the GRL Device 100. In some embodiments, a Central Processing Unit, CPU 112 may be based in a microcontroller unit 110 ("MCU") that integrates processing logic with display and storage capability. Examples of MCU's include Silicon Labs™ products, such as the EFM8™, EFM 32™ and the C8051Fx™ MCUs; and ultra-low power microcontrollers such as ARM processors.

The CPU interfaces with GRL Device components 101-116 and external devices 121-123 and is capable of executing logical instructions, such as, instructions included in executable code. The interface may be accomplished, for example via one or both of a data bus 111 and a communication interface 116.

The GRL Device 100 may include a Memory 114 which acts as primary storage and provides RAM (Random Access Memory) or dynamic RAM functionality. In general the Memory 114 holds data and instructions for processing by the CPU 112 for only as long as a program they pertain to is being executed by the processor. A memory may be situated to provide very fast access to instructions and data. Xxx The GRL Device 100 may additionally include a Data Storage 108 for storing data more permanently than a Memory 114. The Data Storage 108 may function as secondary storage and transfer desired data using intermediate area in primary storage. In preferred embodiments, the Data Storage 108 is non-volatile. GRL Device 100 may include two orders of magnitude or more of secondary storage as compared to memory 114 (primary storage). Data Storage 108 may include one or more of: SSD, ROM, EPROM, firmware or other digital storage medium.

In some implementations, the Data Storage 108 includes a database of transmitter locations (GPS coordinates) and identifier signals (station identifier codes). Data including global locations for transmitter locations may include approximately 100 megabytes of data. In prevalent storage densities of presently available storage devices, such as CMOS data storage devices, 100 megabytes may equate to a fraction of a square millimeter of CMOS storage.

In addition to data, a Data Storage 108 may include an operating system and executable code compatible with the operating system. Typically the operating system will include a micro controller or embedded operating systems, such as Embedded Linux, OpenWrt, Android, NetBSD, RTOS or other available operating system compatible with a the controller 110.

The controller 110 may execute software commands the implement one or both of Trilateration and triangulation, wherein trilateration is viewed herein as a process of determining absolute or relative locations of points by measurement of distances, using the geometry of circles, spheres or triangles; and triangulation includes a process of determining the location of a point by measuring angles to it from known points at either end of a fixed baseline, rather than measuring distances to the point directly (trilateration). It could be located from the angles subtended from three known points, but measured at the new unknown point rather than the previously fixed points. A location determination may be more accurately determined based upon a mesh of triangles at a larger appropriate scale. Points inside the triangles may be accurately located with reference to the larger scale.

The storage may include a list of known reference points that may be used in trilateration. Reference Points that may be utilized by logic being executed by the GRL Device 100 may include one or more generally fixed locations, such as, by way of example: cellular service tower, FM Broadcast Tower, Wi-Fi Hotspot with fixed location, Repeaters or GRLEAS Broadcasters. In addition, in some implementations, a GRL System will determine a location based upon relative location to generally non-fixed location devices, such as, for example, one or more of: a Wi-Fi Hotspot with non-fixed locations, GRLE Smartphones, GRLE Wi-Fi Routers, GRLE Near Field Communications devices etc. In some aspects, a GRL Device may comprise full bi-directional communication components, such as a Transmitter 106 in addition to the Receiver 105. In some embodiments, intercommunication may occur between multiple GRL Devices and act as relays of data contained in their respective Data Storage 108 capacities. In some implementations, intercommunication between one or more of: multiple GRL Devices 100 and Smart Gateways may utilize a unique communication protocol not recognized by commonly recognized industry standards organizations.

A Data Storage 108 may also include Local Profile Data Values, such as, for example time intervals, may be set for individual or homogenous GRL Devices 100 to minimize energy consuming operations such as running trilateration applications and activating sensors. The time intervals may comprise a broad range and may be programmed in a profile Data Value and stored in the Data Storage 108, such as an SSD, in the GRL Device. In some aspects, the programming may include preprogramming, wherein a profile including ranges of values of one or more Data Values may be set as part of a manufacturing and preparation process. The Data Values may be set based upon variables relating to deployment of the GRL Device 100.

Accordingly, by way of example, Data Values may be based upon one or more of: an Asset type to which a GRL Device 100 will be Affixed; components of the GRL Device; expected environment into which the GRL Device will be deployed; power sources for the GRL Device and/associated sensors; length of time the GRL Device will be deployed; or other variable. Data Values may be stored in the SSD or other Data Storage 108.

In some embodiments, a Data Value range may be programmed with its unique profiles of an individual Asset or according to the needs of a set of homogenous Assets (such as a case of soup cans or a pallet of automotive alternators).

A Data Value range may be programed prior to being Affixed to an Asset, during an affixing process or after a GRL Device is Affixed. For example, a GRL Device may be Affixed to an Asset and stored in a manufacturers warehouse. In some embodiments, the GRL Device may receive Data Values before becoming Affixed to an Asset or during an Affixing process, in which case the Data Values GRL Device may be useful during storage in the manufacturer's warehouse. In other embodiments, the GRL Device may receive Data Value settings just prior to the Asset to which it is Affixed leaves the warehouse and include Data Values conducive to a next destination for the Asset to which it is Affixed.

Embodiments therefore include a GRL Device 100 may receive Data Values according to an Asset type, such as, by way of non-limiting example: a Smartphone, a vehicle, a container, livestock, produce, an identification means for a human, and a vehicle.

In some implementations, Data Values, such as timing interval profiles, may be programmable throughout the life of a GRL Device, wherein Local Profile Data Values may be adjusted and reprogrammed. For example, it may be preferable to adjust timing profiles when there is a Self-Determined location change in a Spatial Domain and/or a Status, such as a change in ownership. Data indicating a change of ownership, or other status change, may be stored an external server accessible via a communication network.

In some embodiments, a memory device and/or an external Profiler Database 410 may store Profiles with Local Profile Data Values for each of the homologous types of Assets GRL Devices are linked with in a Collective. In some aspects, the Profile may set the radio frequency of scanning for signals, the time interval in which scanning takes place, the UUID of the GRL Device.

In another aspect, in some embodiments, a GRL Device 100 may provide a very low energy transmission for receipt by one or more of: another GRL Device; a GRL Gateway App or other receiver. The very low energy transmission may include short electromagnetic signal pulses with unique sequence of transmission time intervals (based on an internal MAC), that have a one to one correlation with a UUID wherein the GRL Device and/or its Asset can be definitively identified. This will enable many similar Assets in close proximity such as on a shelf or in a warehouse, people in a crowd, a shipping container or other dense collection of Assets, to transmit data and eliminate data collisions while operating within extreme low power requirements.

An atomic clock enables transmission of data including precise timing data. As described in the definition of highly accurate timing, a GRL Device may include timing data accurate to frequency errors of 1 part in $10^{12}$ or better. Timing data may be transmitted over a defined time period and associated with a specific GRL Device, which in turn may be associated with a specific Asset. One or both of the GRL Device and the Asset may be identified with a UUID in order to maintain accurate record of each GRL Device and Asset.

Power may be conserved by scheduling transmissions based upon one or both of: a time interval programmed into the CPU and receipt of a signaling pulse requesting a transmission (sometimes referred to as a poll). Scheduled delays between signaling pulses provide a method of enabling low operating power. In some preferred embodiments, low operating power may be provided by ambient energy harvesting technologies. Harvested energy may include for example one or both of wireless electromagnetic energy and energy harvested from movement of the GRL Device. Harvested energy may be used to directly power one or more components within the GRL Device, or to recharge an energy storage device in electrical communication with, or incorporated into the GRL Device. Operation of the GRL Device may include driving a RF transmitter for short bursts of electromagnetic energy pulses.

In some implementations, a GRL Device may include one or more sensors 109 that provide data to the GRL Device 100. Sensors 109 may measure various ambient conditions, such as, environmental factors and physical conditions a GRL Device 100 has encountered. Accordingly, sensors 109 may measure variables including, but not limited. One or more of: to temperature, humidity, noise and/or acoustics, motion; vibration; electromagnetic signals; visual conditions; lighting; radiation; speed; acceleration; particulate; chemicals; or other factors.

In some implementations, the sensors may comprise one or more electronic motes. One or more of the electronic motes may be in logical communication with a GRL Device 100 and be associated with one or both of a GRL Device and an Asset. Accordingly, a plurality of scattered electronic motes may act as sensors to ascertain one or more predefined Data Values, such as temperature or motion. The mote sensors may convey data generated by the mote sensor to a GRL Device. In some embodiments, a plurality of motes may autonomously establish communication links, between motes on a same or different GRL Device.

In some implementations, a GRL Device 100 may be identified via a UUID (universally unique identifier) which may be stored in the Data Storage 108, wherein the UUID may comprise a sequence of numbers, a sequence of digital values, an auditory pattern such as a sequence of multifrequency tones, a visual pattern such as set of timed blinking lights, a biological based code such as an airborne molecular shape with detectable properties such as a pheromone, spore containing unique molecular markers, and/or genetic coding sequence, a liquid containing a set of unique identifiable molecule, a material that is embedded with a unique set of molecules.

In some implementations, the GRL Device may comprise trilateration calculating devices that include software operations running geometry computations based on a list of known transmitters and their exact location coordinates.

In some aspects, the GRL Device may be able to determine as a self-aware device as to its accuracy by processing its Local Profile Data Values and running one or both of a triangulation and trilateration program executed on the CPU 112, which may allow the GRL Device to recognize a need to recalibrate. The GRL Device may be self-calibrating, wherein it may recognize a prolonged absence of signals, reset location data, and reestablish location from transmitter signals.

Figure 2:
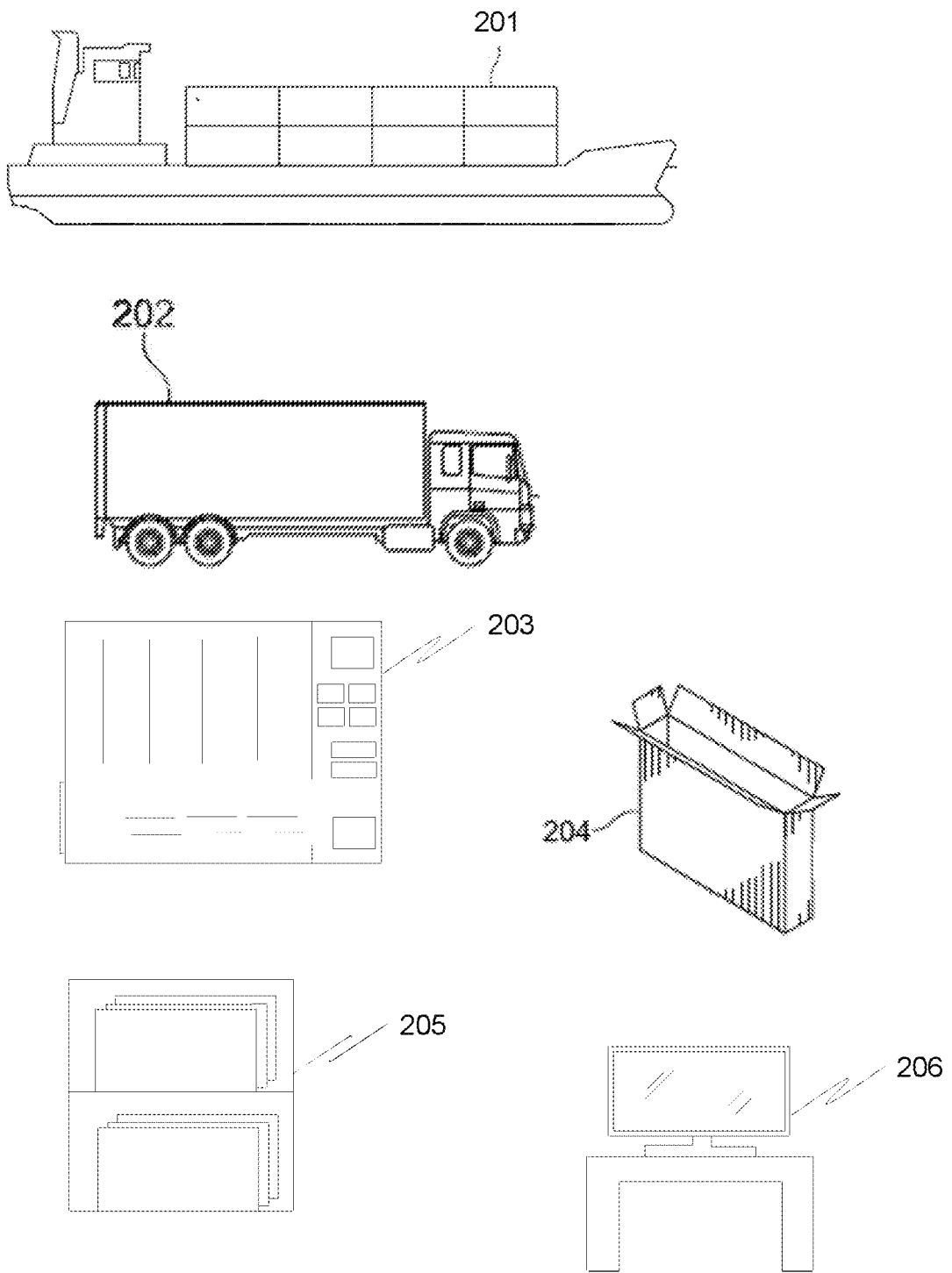
FIG. 2 illustrates the method and apparatus of an exemplary GRL Device System with physical and data process flow paths of a GRL Device.

Referring to FIG. 2, in some embodiments, the GRL Device may comprise a Data Storage 108. In some aspects, the GRL Device may comprise local knowledge of characterizations and profiles of RF transmitter, profile the local (inside the currently located Spatial Domain) radio reflection paths within a domain to improve the accuracy of transmitters, such as with timing profiles, and storage of the average variances of reflection paths within structures, such as buildings 203, ships 201, containers and boxes 204, shelves 205 or trucks 202, apparatus 206. In some aspects, a GRL Device may build profiles by layering signal data to refine structural information, such as by receiving profile updates through a centralized database service that may periodically publish refined profile data for one or more Domains by utilizing calibration signals.

In some implementations, the sensors may comprise one or more motes. In some embodiments, one or more electronic motes may be in logical communication with a GRL Device and be associated with one or both of a GRL Device and an Asset. Accordingly, a plurality of scattered electronic motes may act as sensors to ascertain one or more predefined Data Values, such as temperature or motion. The mote sensors may convey data generated by the mote sensor to a GRL Device. In some embodiments, a plurality of motes may autonomously establish communication links, between motes on a same or different GRL Device.

In some implementations, an event source 121 may provide a sensor triggering condition directly into a sensor 109 or sensor conditions may be transmitted via external transmitters 122. In various examples, the Sensors 109 may be substantially any transducer that is capable of sensing an Event Signal produced by the Event Source 121. In particular, the Sensors 109 may be adapted to receive and transform various types of physical quantities associated with the Event Source 121 including, but not limited to, vibrations and various related pressure waves (e.g., seismic motion, acoustic waves, etc.), electromagnetic field fluctuations and waves, a presence or absence of various atomic or molecular species (e.g., a molecular sensor), and physical quantities resulting from various nuclear processes (e.g., ionizing radiation).

In some examples, the Sensor, transceiver 123 transforms a sensed condition into an electronic signal (e.g., a voltage, current, etc.) that corresponds to or is related to the sensed condition. For example, a photonic Sensor 109 (e.g., a photodiode) may transform a sensed condition relating to photons into a corresponding electrical signal at an output of the photonic sensor. The output may be one or both of: processed by the Controller 110 and stored in the Data Storage 108.

Examples of transducers that monitor vibration include, but are not limited to, an accelerometer (e.g., a piezoelectric accelerometer, a Micro Electro Mechanical System (MEMS) accelerometer). A vibration may be associated with a seismic event such as a vibrating vehicle. The Sensor 109 may include an accelerometer that acts as a transducer for vibration energy that is received as a result of being in contact with the ground or floor of vehicle or other boxes in a vehicle through which vibrations propagate from a seismic source.

Examples of vibration related sensors include, but are not limited to, strain-based piezoelectric sensors, microphone-type sensors, capacitor-based microphone-type sensor and various sensors based on piezo-resistivity. For example, a strain Sensor 109 may be attached to a structure (e.g., an automobile strut) and an event may cause vibration to the structure. The vibrations, in turn, induce a signal to be generated from the strain Sensor 109.

In another aspect, external transmitters 122 may also communicate with the GRL Device 100 via wireless communication to transfer one or both of logic and data to the GRL Device 100. Logic may be used by the GRL Device 100 to provide functionality as the device operates. Data may be referenced during logical operations.

Some implementations include a transceiver 123 that may be used as an intermediary device between one or both of an external condition and an external logic device. The transceiver may receive input, such as the activation of a switch by a user and provide a signal into the GRL Device 100 based upon the input received. Transceivers 123 may be capable of receiving input from a user or from another apparatus.

Optional modules 10 may be included in the GRL Device 100 to provide one or both of additional logic to be executed by the GRL Device 100 or data to be accessed by the CPU 112.

Referring now to FIG. 2, an exemplary series of Spatial Domains for Assets that may comprise one or more GRL Device is illustrated. As defined more fully below, a Spatial Domain is essentially a defined space within which a GRL Device may be located. The Spatial Domain may be defined according to a set of coordinates within which a GRL Device is contained. A set of fixed coordinates may include, for example: GPS values, a fixed location on or above the earth represented with Latitude/Longitude coordinates and altitude). A set of relative coordinates may include, for example, one or more of: a positional description relative to another Asset or person, such as a shipping pallet or a vehicle, or a structure, such as a building. Relative coordinates may include, for example: a moving Spatial Domain such as a pallet on a transport vehicle.

Fixed coordinates and relative coordinates may be uniquely named, defined as a contiguous set of vectors forming an enclosed area such as, for example, a circle (as in property lines) or spherical area (such as a 3D shape) or is commonly known by such as inside a building or inside a box or inside a store room spatial domain A profile associated with a particular GRL Device, Asset, and/or an Asset type may set Data Values associated with a Spatial Domain such that a predefined action may occur when one or both of a positional location relative to a Spatial Domain or a GRL Device Status changes.

As an illustrative example, an Asset such as a Television product may be tracked throughout shipping and storage until authorized use. In some aspects, a GRL Device may recognize that it is in transit in a container on a ship 201 (over a body of water), and a frequency of Log entries may be once every 12 hours. The GRL Device may recognize that it is in transit in a container on a truck 202 (on roadways), and a frequency of Log entries may be once every 8 hours. The GRL Device may recognize that it is in a bulk box 204 in a store warehouse, building 203, and a frequency of Log entries may remain every 2 hours. The GRL Device may recognize that it is in the bulk box and that bulk box has been opened, and the frequency of Log entries may be once every 24 hours.

In some embodiments, the Local Profile may set awake/sleep timing interval values. For example, the timing may be based on purpose, such as follow an Asset or verify that it left or arrived at a specific location (a designated Spatial Domain).

As another example, the timing may be based on Asset type, such as while on a Ship 201 the GRL Device may scan less frequently than while it has received notice that it is on a Truck 202 or a container such as a Box 204 may scan less frequently than an individual product.

In some aspects, GRL Devices may be able to wake up each other up by sending the appropriate Local Profile Data Value wake up values. For example, in the same box, a product removed from its Box 204 container Domain may trigger an update of Local Profile Data Values for all other Assets (products) left in the Box, container, store, and/or ship.

The GRL Device may recognize that it is out of the bulk box (because its trilateration calculations and Spatial Domain location calculations indicate that it is now longer in proximity to or it cannot communicate with its Collective) and stocked on a shelf 205 based on its communications with other GRL Devices and sensor reading associated with air pressure sensors. If a GRL Device determines it is in its individual box and within an authorized location or store, and the frequency of Log entries may be once every 2 hours. The GRL Device may recognize (by querying its Local Database of valid coordinates for the designated Spatial Domain) that it is out of the bulk box in an unauthorized location because it did not receive a Status (such as an ownership Data Value) change setting after it left a Retail location 440. The GRL Device may recognize that it is in use by an authorized user, and the frequency of Log entries may be reduced to once every 7 days.

In some aspects, the GRL Device may receive a privacy sleep or kill signal, wherein scanning may be terminated or scanning may be paused until a designated time period. This may occur at a Warehouse 430 or at Point of Sale 443 or at the Consumer's discretion. In some embodiments, scanning may resume until plugged in again and a confirming privacy sleep signal is received. Such aspects may allow a stolen product to be tracked by publishing its Log when it is in range of a Data Network.

As another illustrative example, a container position may be tracked within a port and within a ship 201 or truck 202. The GRL Device may recognize it is in a port, and the frequency of Log entries may be once every 4 hours. The GRL Device may recognize it is in transit within the shipyard, and the frequency of Log entries may increase to once every 30 minutes. The GRL Device may recognize it is being transferred onto a ship where it receives a Spatial Domain signal from the ship, and the frequency of Log entries may decrease to once every day. The GRL Device may recognize a signal from a truck 202 and the frequency of Log entries may increase to once every hour.

Figure 3:
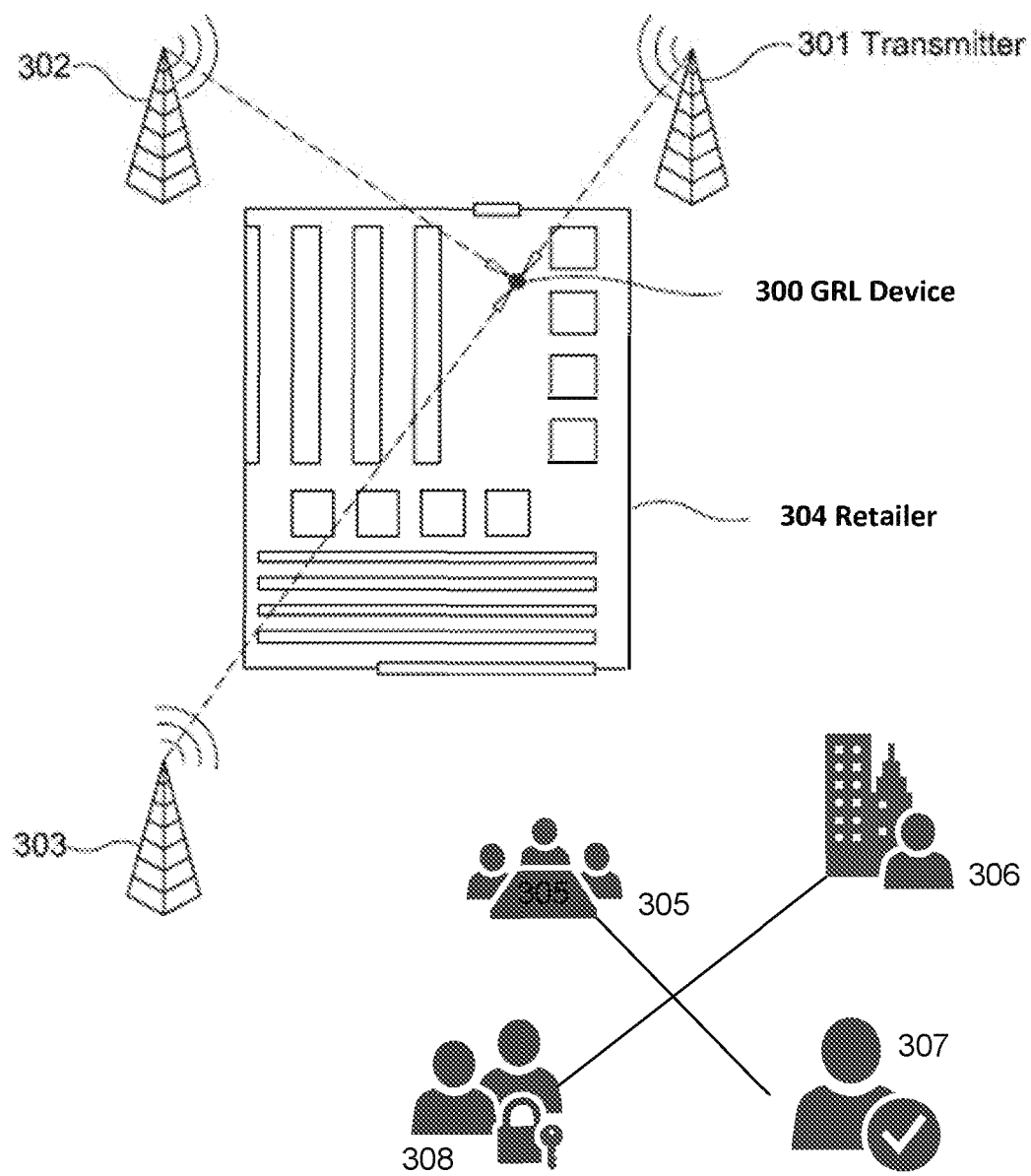
FIG. 3 illustrates method and apparatus of an exemplary series of Spatial Domains for Assets utilizing a GRL Device.

Referring now to FIG. 3, a block diagram illustrates a block diagram of reference points or transmitters 301-303 as they may be used in conjunction one or both of triangulation and trilateration functions associated with a GRL Device. An exemplary GRL Device 300 receives transmissions from multiple reference points, such as, proximate communications towers (Transmitters 301, 302, 303). In the illustrated example, the GRL Device 300 is located within a Retailer building 304 with long rectangles representing shelves and boxes representing store shelves and check out areas respectively.

The triangulation may reference the transmitters 301-303 to execute a process of determining a location the GRL Device 300 by measuring angles from transmitters 301-303 at either end of a fixed baseline or other process of determining absolute or relative locations of points by measurement of distances, using the geometry of circles, spheres or triangles (via well-known trilateration algorithms), or from measuring distances to the GRL Device 300 to the transmitters 301-303 directly (trilateration). For example, the point can then be fixed as the third point of a triangle with one known side and two known angles.

As discussed in detail within this disclosure, a controller may execute logic to determine a location of a GRL Device 300 based upon principals of one or both of Trilateration and triangulation, wherein trilateration includes logic for a process of determining absolute or relative locations of the GRL Device 300 according to distances. The determination is based upon logic using geometry of circles, spheres or triangles. Similarly, logic based upon triangulation may determine a location of a GRL Device 300 based upon angles to the GRL Device 300 from reference points of transmitters 301-303 at either end of a fixed baseline, rather than measuring distances to the point directly (trilateration). A location of the GRL Device 300 may be determined based upon angles subtended from three known points, but measured at the new unknown point rather than the previously fixed points. A location determination may be more accurately determined based upon a mesh of triangles at a larger appropriate scale. Points inside the triangles may be accurately located with reference to the larger scale.

According to some aspects of the present disclosure an authenticated location may be determined based upon a list of known reference points such as Transmitters 301 that may be used in trilateration and/or triangulation logic execution. Known or certified or authentic Reference Points of transmitters 301-303 may include by way of non-limiting example: cellular service tower, FM Broadcast Tower, Wi-Fi Hotspot with fixed location, a GRL Base Device, a Repeater, and GRLEAS Broadcasters.

In addition, in some implementations, a GRL System may execute logic to determine a location based upon a relative location to generally non-fixed location devices, such as, for example, one or more of: a Wi-Fi Hotspot with non-fixed locations, GRL Enabled Smartphones, GRL Enabled Wi-Fi Routers, GRL Enabled Near Field Communications devices, GRL Enabled Assets that move.

As illustrated, a Spatial Domain for the GRL Device 300 may include the Retailer building 304. A GRL Device may execute logic based upon determination of an authenticated location utilizing the transmitters 301-303 as reference points. Logic may include, for example, one or more of: establishing itself as part of a Collective, determining that the GRL Device 300 is in an authorized location (the Retailer Building) establishing that it is in a box with other GRL Devices 300 each associated with a UUID of a product to be sold.

In another aspect of the present disclosure, authenticated determination of one or more users 305-308 may be determined and logged. Tracking of users 305-308 may be undertaken, for example, in the case of foreign nationals entering within a national border. The users 305-508 may be required to carry a passport or other documentation that has a GRL Device 300 fixedly attached to the passport or other documentation.

As the User 305-308 changes locations, they may be tracked in relation to a building 304 or other landmark. The Users 305-308 may also be tracked in relation to other Users 305-308, such as for example multiple congregated Users 305; a User 306 in a known city; Users 307 who check in at predetermined intervals; and Users 308 with security clearances. Logic may be executed on a controller and determine whether rules pertaining to specific Users 305-308 are being adhered to, or if anomalies take place. Authentication may be derived from a combination of unique identifiers for reference location of transmitters 301-303 and a PKI associated with a GRL Device 300 UUID associated with a User 305-308. In some embodiments, logic may also publish a location and a public key that allows another Person to ascertain a location of a User 305-308.

Figure 4:
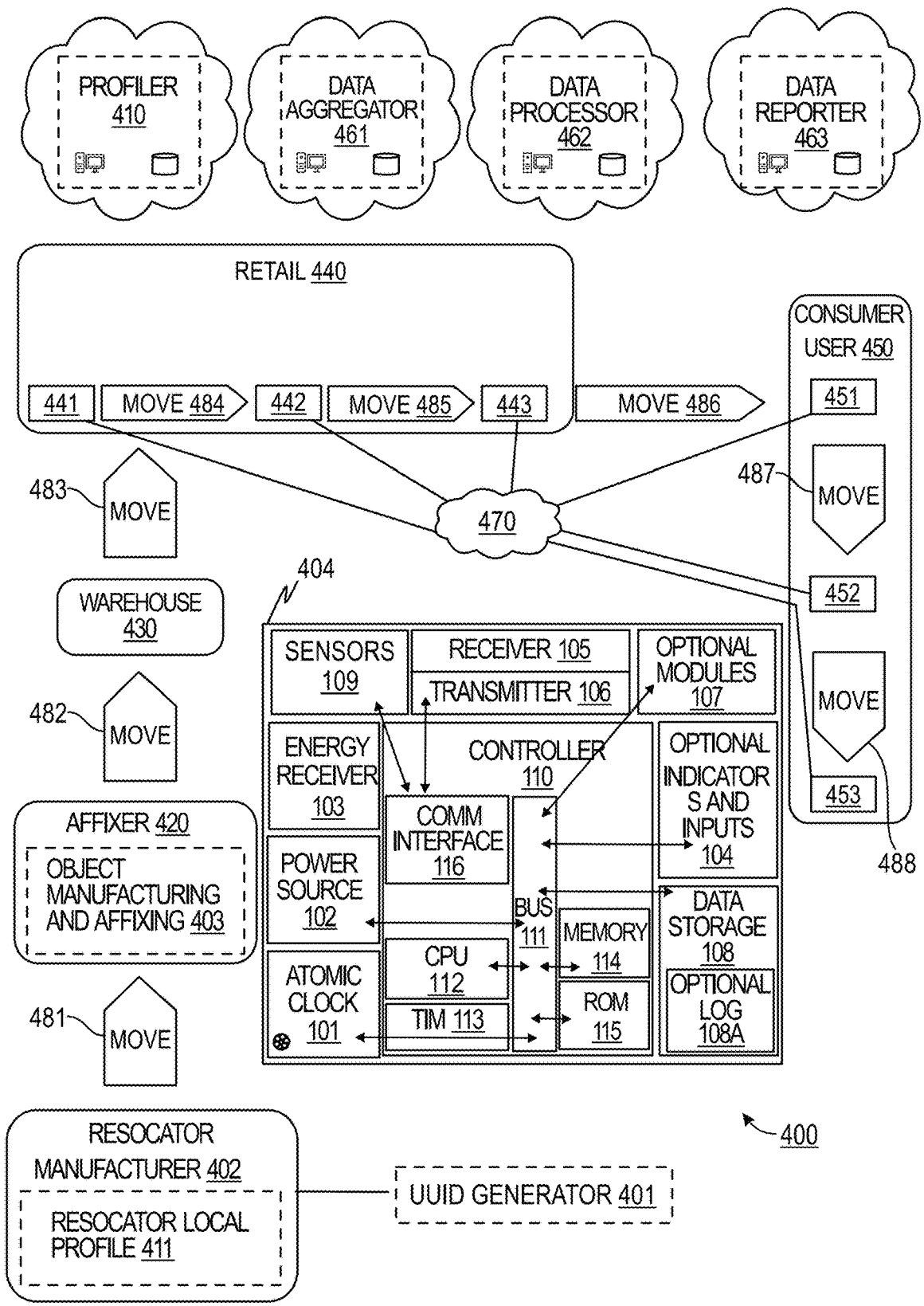
FIG. 4 illustrates the method and apparatus of an exemplary triangulation with a GRL Device receiving transmissions from proximate communications towers (Reference Points).

Referring now to FIG. 4, a schematic diagram illustrates some exemplary embodiments of a GRL System 400 as it pertains to an exemplary lifecycle of a GRL Enabled Asset. Various devices and apparatus represented in the illustration are in logical communication and thereby capable of transmitting data, such as digital data organized into logical patterns of electric pulses. In some embodiments, logical communication will include a Data Communications Network, such as, for example, one or more of: the Internet, a Virtual Private Network and a cellular network. Additional examples of communications mediums may include, Wi-Fi, Near Field Communications, and Bluetooth, RF or other vehicle for conveying logic and/or data.

A UUID Generator 401 generates and transmits or otherwise conveys a unique identifier to a GRL Device 404. The unique identifier may include a binary string of data. In some preferred embodiments, the binary string of data includes 128 bit codes. The UUID generator 401 may include a processor executing logic or firmware code.

Upon request, the UUID Generator 401 provides a list of valid and trackable UUID codes. The UUID Codes allow for one or more Assets to be identified throughout their life cycle and usage. The UUIDs created by the UUID Generator 401 may be transmitted via a communications network as a file or other valid data format to several locations such as, for example, to one or more of: a Manufacturer 402; a Profiler 410, a Data Aggregator 461, a Data Processor 462 and a Data Reporter 463.

GRLE Security devices such as USB chips with security codes may be enabled to retain location log data and publish to a Data Aggregator 461 through the computer that it is plugged into, using that computer as a Gateway to the public Internet. In this regard, any security device and its associated computer may constantly publish its physical location in a way that the location of a computer and its GRLE Security device can be authenticated with a high level on a security Quality Seal.

Broadcasting of activation codes of certain privacy settings by police agencies may include higher levels of authentication using known techniques such as challenge response and secret keys embedded with each GRL Device and its UUID, in this regard, privacy can be maintained and only a registered owner of an Asset with its UUID may create a request that will enable police to activate controls, such as, for example, privacy settings from off to on, broadcast location log and other interactive controls.

Notification by a registered owner of an Asset may be accomplished by logging into a Data Aggregator 461 site where the user may request an alert for all GRL Device enabled Assets who participate to transmit the privacy update signal as well as listen for the extreme low power unique sequence of transmission time intervals that can be added to nearly all GRL Devices. Filtering mechanisms such as geography and types of environments can limit the number of requests that participating receivers need to listen.

A GRL Device Manufacturer 402 may add GRL Device UUID codes as well as a list of known transmitter locations (obtained from a Data Aggregator 461) which may be placed in SSD and or Data Storage.

When a GRL Devices 404 is shipped or otherwise moved to an Affixer 420, a Data Aggregator 461 may receive a list of GRL Device UUIDs via a transmission that associates the GRL Devices with an Affixer 420.

A Profiler 410 may include automated apparatus that generates logic and data to be conveyed to the GRL Device 404. In some implementations, a stream of data may be transmitted to a GRL Device 404 when it is in Authenticated Configuration Mode.

A Local Profile database may include a variety of different types of data based on the type of use that is planned for the GRL Device. Typical Local Profiles include Utility Tables of Security Codes, Ownership Tables, UUID, Date Time Stamps, Log File Configurations and the like. Since GRL Devices may be based on multi use controllers, it is within the scope of this disclosure to have varied potential Local Profiles. The present disclosure includes a number of specific examples from which a person of ordinary skill in Computer Science would easily determine appropriate Data Elements to be stored to enable the functionality described An Affixer 420 is any apparatus or person that undertakes the actions required to Affix a GRL Device to an Asset. In some embodiments, an Affixer receives stand-alone GRL Device and fixedly attaches the GRL Device 404 to an Asset. In other embodiments, an Affixer will incorporate a GRL Device 404 into another product which becomes the Asset. I tis within the scope of this invention to authenticate a time and location of the Affixer and the GRL Device when an act of Affixing takes place. The authenticated time and place of Affixing is useful for identifying non-authorized Assets that have entered the stream of commerce. Non authorized Assets may include, one or more of: counterfeit Assets; Assets not authorized to leave a manufacturer or distributor; gray market Assets, and black market Assets. As such, pharmaceuticals or other trackable Assets destined for one marketplace can be identified if they appear in another marketplace. Similarly border control may scan Assets crossing the border and determine their origin and whether a proclaimed destination is legitimate.

The GRL Device Manufacturer 402 may place Local Profile Data Values that have been established for the type of Asset (and in some cases may include unique Data Values for each serialized Asset) that the GRL Device is to be associated or embedded or build with when it is delivered to the Affixer 420 (which is typically a manufacturing facility of any type of Asset or it may be where people manually handle Assets that contain GRL Devices) which performs the function of Asset Manufacturing and Affixing 403. This information of the associated GRL Devices and Assets can be transmitted to one or more Data Aggregators 461.

Information containing the association of one or more GRL Devices to Assets can be transmitted to one or more Data Aggregators 461 at a time consistent with the when the GRL Device is Affixed to an Assets. In some embodiments, the GRL Device will be Affixed during Asset manufacturing. Additional embodiments include, a GRL Device being associated with a Boxes 204 or shipping container in which the Asset is transported, or retail packaging associated with the Asset.

An Affixer may move from a manufacturer 481 to the Affixer 420 and then to a logistics and transportation company that moves 482 the Assets (finished goods) and transmit the list of Assets with the associated GRL Devices and Boxes.

A shipping company may move 483 the Assets from a Warehouse 430 to a Retail location Spatial Domain 440 and then place them in receiving bay or storeroom 441 and then transmit to a Data Aggregator 461 the completion of delivery.

An individual GRL Device 404 may then receive signals 470 from the Retailer 440 as an associated Asset moves 483, 484, and 485 within the store.

Events and interactions between GRLEAs and people such as, one or more of: finding products, finding Assets on sale, finding nearby Assets, learning details about an individual or homogenous Group of Assets, moving Assets from a delivery dock to a storeroom or other movement.

When an Asset leaves a Retail Spatial Domain 440 after going through a check out point of sale 443 at another Spatial Domain it is moved 486 by the new Consumer User 450 (which may be an individual, a family, an employee, an agent or a UAV/Drone) who enters the Spatial Domain of storage closet 451 at the door, as it places the Asset in the Consumer/Users Spatial Domain 450 where it may move 487, 488 to a storage area (such as a closet 451, locker 452, pantry, refrigerator, storeroom, etc.) wherein the Authenticated Location information can be transmitted to a Data Aggregator.

When the GRL Device detects that its Asset has been utilized, it may transmit the data to a Data Aggregator 461

The Data Aggregators 461 may capture data from various industries, retailers, associations, government agencies, payment processors or any other entity that tracks the movement and status of products.

Various aspects of the functionality presented (i.e. 410-411, 461-463) may be accomplished with a controller or other automated processor that may be embodied in apparatus specific to one or more of the functions illustrated. The controller may include a processor unit, such as one or more processors, coupled to a communication device configured to communicate logic and/or data. In some aspects, the communication device may be used to communicate for with one or more online devices, such as a Smart Gateway, checkout terminal, laptop, or a handheld device.

In some aspects, the processor may be in logical communication with a storage device. The storage device may include appropriate information storage device, including combinations of electronic storage devices, such as, for example, one or more of: hard disk drives, optical storage devices, and semiconductor memory devices such as Random Access Memory (RAM) devices and Read Only Memory (ROM) devices.

Retail theft ("shrinkage") poses a significant problem and retail check-out lines are expensive to operate. Products with packaging and labels embedded in products (Assets) that contain GRL Device enabled devices will enable a wide variety of new crime prevention and customer convenience options. Bar codes and RFID tags have made improvements in retail operations however, they do not address the ability for individual products to track their physical location.

As described herein, numerous strategies can be implemented to meet individual retailer preferences for linking payment transaction modes as products leave the retailers Spatial Domain while in close proximity to a shopper who is carrying a GRL Device equipped broadcasting Smartphone. This same broadcasting Smartphone can be spatially analyzed by an application in the Smart Phone to register that the Assets in the shopping cart are moving in close proximity. In this way, as a cart is filled, the list of items intended to be purchased can be displayed by the app and when the cart leaves a retailers Spatial Domain a payment transaction can be initiated. In some embodiments, the payment transaction may be completed by an affirmative action taken by a Purchaser controlling a Smartphone or other mobile device running an associated application. In some embodiments, items in a cart may automatically associated with multiple Smartphones in proximity to the cart.

As a Purchaser completes a purchase transaction, all purchased items may be receive a purchased indication on all Smartphones the items appeared and/or be removed from one or more Smartphones onto which the items logged. In this manner, only one Purchaser will be charged for an item with a given GRL Devices UUID.

Once purchased items are carried to a home refrigerator, pantry or a storeroom, a Smartphone application may be configured to activate a camera so that Assets within view may be displayed and Local Profile status Data Values of individual Assets could be queried and nearness to expiration date (based on environment log data) could be calculated and then superimposed over the image from the camera. In this regard, a user could very quickly scan and evaluate the various food products or whatever assets may need to be utilized next.

Typically a user of the Data Reporter may be an official or employee of the agency or entity that locates, tracks and/or monitors GRL Device tagged Assets (just as today where a vibrant industry exists for tracking and reporting of RFID tagged products exists). The user of the Data Reporter service may be an owner, shipper, carrier, recipient or other individual or entity having an interest in the Asset and/or its location, and so there may be many such users utilizing the Global Resource Locator service.

At locations where GRL Devices are utilized, 402, 420, 430, 440, 450 and a transportation vehicle along the way may communicate directly with the GRL Devices by transmitting signals 470 detected by the GRL Device's receiver 105. The illustration of the various communications of signals 470 is meant to show individual transmissions at various stages as a GRL Device and its associated Asset is moved in a Retail and Consumer/User environment. It is not intended to be a complete list or illustration of the possible uses of a GRL Device with associated Assets.

In addition, transmissions by users of a Global Resource Locator service may use computers in one or more Spatial Domains such as manufacturer 402, affixer 420, warehouse 430, retail location 440, and consumer user 450 directly with GRL Devices and not deliver the information to a Data Aggregator 461.

Some users that access data from computers may have a signature capture device or other identification device associated therewith for controlling access to the UUID data, contents of the SSD 153 or the Log 108A or the Data Storage 108.

In addition, users may include government agencies that may have or desire real-time access Asset, Domain and Profile information pertinent thereto, such as security agencies, port and terminal agencies, defense agencies, judicial agencies, corrections agencies, police and investigative agencies that may need or desire information available via PC, Tablet or Smartphone type device.

In some aspects, GRL Devices 404 may be utilized in advertising for a wide variety of applications, for example wherein pricing may be based on querying a centralized database (Data Aggregator 461) containing information regarding GRL Devices and their Logs who bought it, such as bulk or loyalty customers may pay a lower price after the fact when the Consumer's 450 Spatial Domain is recognized as the new location of a particular purchased Asset containing a GRL Device with a Transmitter.

In some embodiments, GRL Devices 404 may be utilized to increase efficiency of ordering products based on real time supply and demand information provided by GRL Devices to Aggregators 461 who deliver to Data Processors 462 and then deliver to Data Reporters 463 who tabulate data base on individual products across all modes of distribution and sales.

It is noted that a computer and a storage symbol in dashed boxed line illustrated in the Profiler 410, Data Aggregator 461, Data Processor 462 and Data Reporter 463 may comprise one or more of the PC server and storage arrangement and elements. A centralized computer system includes one or more database servers coupled to one or more storage devices. The storage devices may located at a different location than is the main or primary storage device, so as to provide data backup and protection against such dangers as fire, earthquake, cut fiber line, DDOS attack etc. Typically and preferably a firewall is provided for protecting computer from unauthorized access, from malicious viruses and from unauthorized access of data. Such computer system may include a local switch, a router, a local area network (LAN), a wide area network (WAN), a wireless network, a connection to the public Internet.

In some embodiments, a multi element system as illustrated preferably includes access via the Internet or another network or communication medium, such that properly authorized users such as defense, security, intelligence and other agencies, as well as shippers, owners, recipients, and the like, may have essentially immediate access to location and tracking records and/or history at any time authorized. Thus, such persons may have "real time," i.e. essentially immediate, access to the current locating and tracking records in a local, regional and/or central database at any time, whereby real and/or perceived threats may be identified and acted upon appropriately. Alternatively, all or part of the aggregated locating and tracking database by the Data Aggregator 461 on computer PC may be loaded onto individual computers, either via the Internet or other network or SSDs or other medium, for use at a site wherein Internet/intranet access is inconvenient or not available.

Suitable software that may be used to generate logic with the foregoing computers includes, for example, Oracle, Microsoft and IBM offer relational database software and development frameworks which facilitates communication between various users and the computers of a GRL Device 100. Various other suitable software is available from different sources known to PHOSITAs, e.g., for data capture, databases, data retrieval, networking, Internet interfacing, etc.

In some aspects, GRL Device's Data Processor 462 communicating via the Internet to a retail checkout location or point of sale 443 may allow for flexible payment terms, which may eliminate the need of an immediate payment transaction because it has authenticated that the buyer has a registered GRL Device on their person or some other authentication device has uniquely identified the individual and is at the same location.

In some implementations, GRL Devices may include anti-theft devices, wherein the GRL Device may recognize when it is removed and/or used in a location (a designated Absolute or Relative Spatial Domain) other than the expected or authorized location (the Spatial Domain for that GRL Device). The GRL Device that is associated with a container such as Box 204 may maintain a log of Spatial Domains within a vehicle such as a Truck 202 and when it no longer receives its signals that it is in range may then relay this information to the GRL Devices within the Box 204 so the individual GRL Devices may store Log 108A files for subsequent queries that the GRL Device can respond to with its Transmitter.

GRL Devices may decouple near field communication requirements for payment transaction approval. For example, the GRL Devices may be self-aware, and a customer may not be charged for an ordered product until the shipped product arrives at the customer's home.

In some embodiments, GRL Devices may provide data for quality control. For example, for crops, GRL Devices may be randomly distributed where they can publish their location and then it may monitor its designated Status, such as an area of the crops where temperature, humidity, pollen and other airborne particulates, and/or measurable conditions of the environment.

In some implementations, GRL Devices may be used with livestock. For example, chickens are often shipped alive, and GRL Devices may allow a user to track precisely, log and report, when, where, and under what environmental conditions livestock experienced in transit.

In some aspects, GRL Devices may be used in food product containers, wherein a user may track the internal and/or ambient environmental conditions throughout shipping, once a GRL Device is attached.

In some embodiments, GRL Devices may be used in drug administration. For example, one or more of: a patient arm band, a syringe, a nurse, and a container with an injectable drug dose may each have a GRL Device. The syringe's GRL Device may awake when its motion detector senses being removed from a storage box and may scan radio signals for trilateration at a shorter timing interval until in proximity to one or both a nurse or the injectable drug container. The GRL Device located on the person of a nurse may awake when it receives an awake signal from a hospital's interior Spatial Domain transmitter, wherein the GRL Device may be embedded in a uniform, nametag, bracelet, identity badge or person. A GRL Device in injectable drug dose may awake with an accelerometer detected movement of the bottle, may track remaining doses with its Log 108A, and based on its Local Profile Data Value, may transmit an alarm signal if removed from an authorized location prior to being empty, and may go into sleep mode when empty. The GRL Device in the Syringe may Log its proximity to the patients arm band's GRL Device and then transmit when requested by a Data Aggregator 461.

In some aspects, GRL Devices may be used in ecological or scientific studies, such as to track wildlife and study Group dynamics, which may use intra-communication between GRL Devices.

In some aspects, the GRL Device may receive privacy configuration information that can be configured and updated at a designated location, such as for example one or more of: a Warehouse 430; a Point of Sale 443; and at locations of the Consumer's discretion such as storage closet 451, locker 452, and storage area 453. The settings may include access to a portion of the GRL Device Local Profile 411 and may be uniquely coded to an individual GRL Device's UUID.

Figure 5:
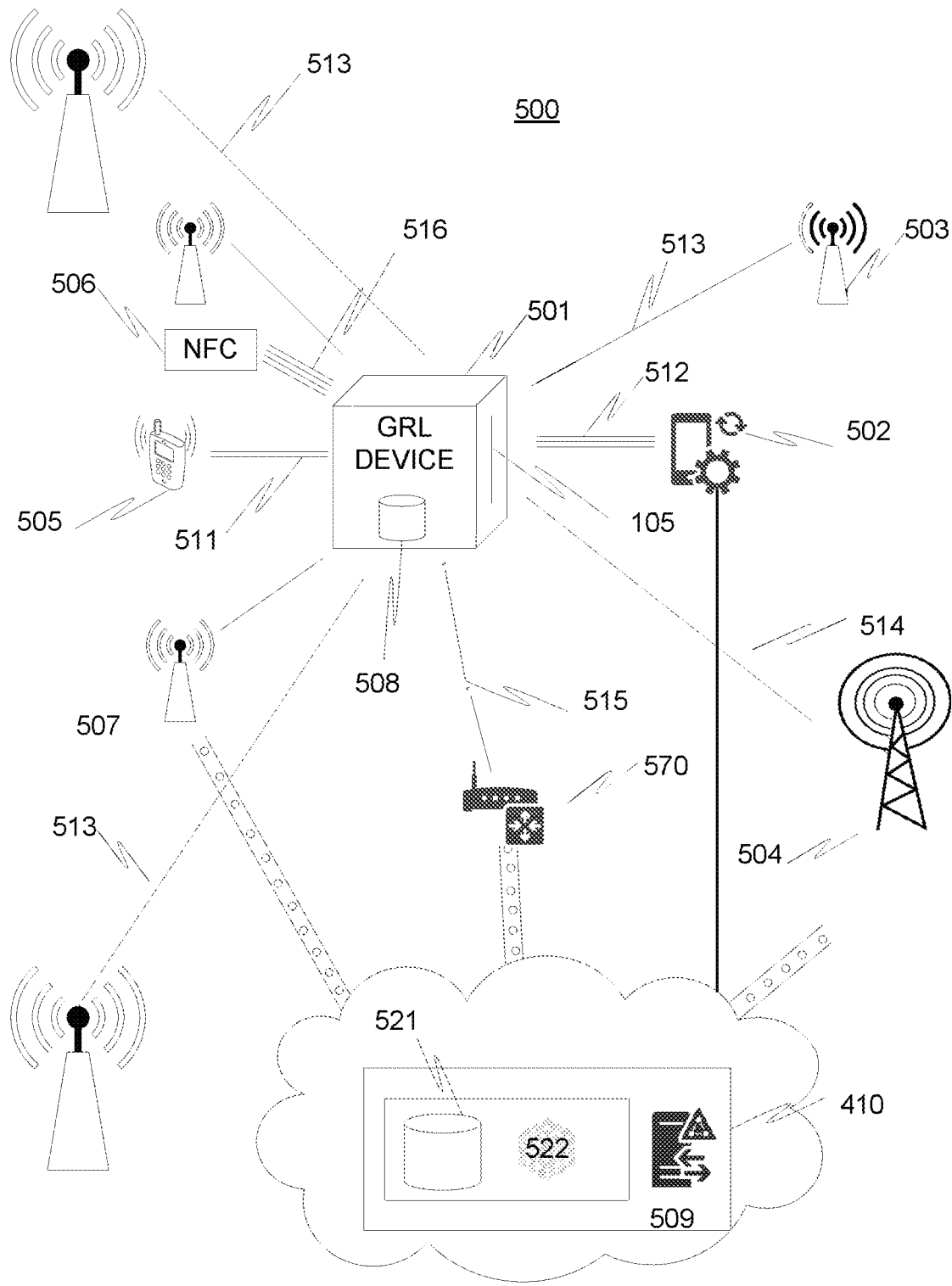
FIG. 5 illustrates the method and apparatus of the GRL System apparatus for processing radio signals with a miniature atomic clock.

Referring now to FIG. 05, schematic diagram illustrates some of the exemplary embodiments of GRL system 500 with a GRL Device 501 and various apparatus with which it relates and communication mediums with various RF sources for trilateration and/or triangulation. Various sources of reference signals are illustrated from which at GRL Device 501 may listen for signals. As illustrated, a single solid communication line 513 represents signals from a Cell Tower 503, a dashed line 514 represents a signal from a tall FM broadcast tower that operates typically in the 100 Megahertz band, a double line 511 represents signals from a GRL transmitter 505, a triple line 512 represents Bluetooth 502 from a base GRL Station or Smart Gateway, such as a Smartphone, a quadruple line 516 represents signals from a NFC 506 device and a dash dot dash line 515 represents signals from a Wi-Fi transmitter 570 the Wi-Fi transmitter may include a GRL Base Station that transmits logic as well as electromagnetic power capable of being received as power by a GRL Device 501. As discussed herein, electromagnetic power may be received by a GRL Device 501 and managed to provide operational power to the GRL Device 501.

Typically, Cell Towers 503 and the FM Broadcast towers 504 have a range broadcast and station identifier NNNN signal that a GRL Device 501 needs to enable it to Self-Locate. A GRL Device may store a Transmitter Location Database 521 in a Local Profile 411 and/or stored in a Data Storage 108. Transmitter Location Database 521 will include precise transmission coordinates that may be used in logic performing trilateration calculations. Results of completed location calculations may be stored in a location in a Log file 108A.

In the event that a GRL Device 501 is unable to calculate location data based upon transmissions from Cell Towers 503 and 504, the GRL Device may supplement its data source by requesting a location from a very nearby NFC device 506 (near field communications) or a slightly further Bluetooth device 502. Each of these devices may respond with a current location data with an authentication code as well as coordinate accuracy value. In some implementations, a GRL Device location may be calculated relative to a NFC device 506 and/or a Bluetooth device 502 without reference to a location relative to more permanent reference points.

A GRL Device that has a RF connection to either the Public internet via Wi-Fi router station 570 or FM tower 504 or a connection to another GRL Device such as via a Wi-Fi Router Station 570 which may include one or more of: a or Wi-Fi GRL Base, Cell tower 503, and a Bluetooth 502 enabled GRL Device may request an update to receive a current Transmitter Location Database 521. In some implementations, a database 521 may also include one or more of: locations and definitions of geospatial domains, geo-fence data, user data, encryption data, profile data or other data relevant to various deployments of the GRL Device 501.

In another aspect of the present disclosure, a server 509 in logical communication with the GRL Device 501, such as via a Wi-Fi Router station 570, may receive timing and location data from a Data Storage 508 in a GRL Device 501. The Server 509 may also logically compare a time and location to parameters specific to the GRL Device 501 and determine whether the GRL Device 501 is within an authorized Spatial Domain. The server 509 may also receive sensor data and logically determine whether the GRL Device has experienced environmental conditions that within the scope of parameters designated for the GRL Device 501.

Communications mediums and protocols may comply with industry protocols and standards or be specific to a deployment of a GRL Device. For example, commercial and public use may adhere to the Internet Protocol, cellular communications protocols, open source protocols, proprietary protocols or other publically available medium. Military, police, or other authority may operate according to standards reserved for use by such organizations. User Created (submissions like people tagging maps with KML and systems uploading KML, and services like OpenStreet-Map from local governments with ESRI SHP files are also within the scope of the present disclosure.

Data aggregated and stored in databases 521-522 may include location data, sensor data, and data generated by GRL Devices, such as for example, records of members of a Collective, location references encountered (including cellular, FM, Wi-Fi, Bluetooth, Near Field etc.) spatial domain data, user data, transfer of ownership data and other data referred to in this disclosure.

Figure 5A:
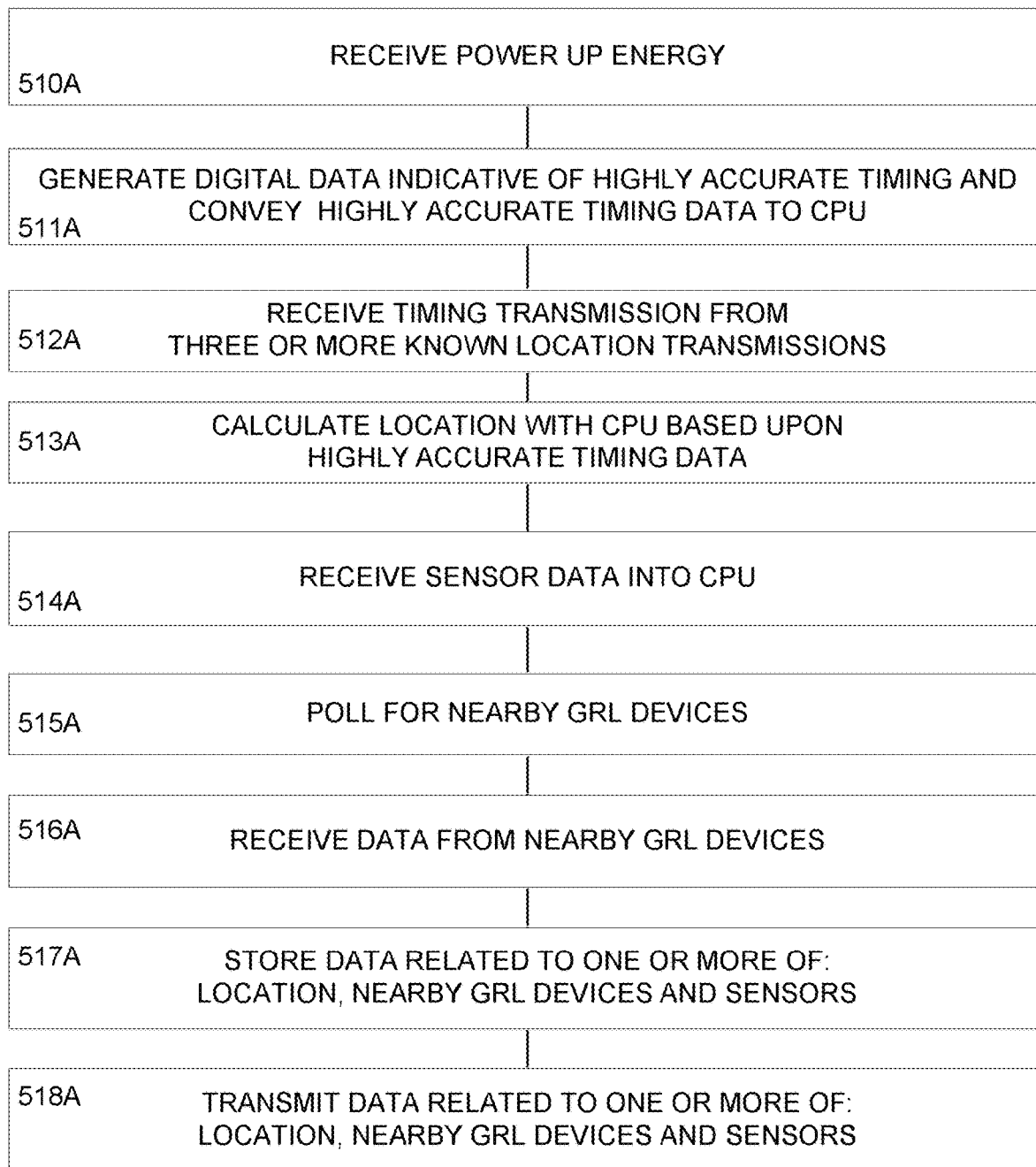
FIGS. 5A-C illustrates process steps that may be implemented with the GRL System apparatus for processing radio signals with a miniature atomic clock.

Referring now to FIG. 5A, process steps that may be implemented according to some aspects of the present invention are listed. At step 510A, a GRL Device receives power up energy necessary to operate a GRL Device. The power up energy may be received for example via one or more of: an energy storage device, such as a battery or a capacitor; and an energy receiver, such as an antenna or a coil.

At step 511A, the GRL Device generates digital data indicative of a highly accurate time calculation and convey the highly accurate timing generated to a CPU included in the GRL Device. The highly accurate time calculation may be represented, for example as digital data and conveyed via one or more data packets. It is also within the scope of the invention to have the time calculation stored in a digital data storage.

At step 512A, the GRL Device may receive a transmission from three or more Reference Points sources, such as, for example, a cellular transmission tower with a set location and typically an atomic clock grade timing device. The transmission received from the Reference Points will include data with a description of a highly accurate time calculation generated at the cellular tower, or other Reference Point source. The data with a description of a highly accurate time calculation generated at the cellular tower, or other Reference Point source will made available to one or both of the CPU or other executable logic device, and a memory storage.

At step 513A, the GRL Device, the CPU or other logic device may execute logic commands to calculate a location of the GRL Device based upon the time calculation made by the GRL Device and the three or more time calculations received from reference location sources. The location may be calculated according to triangulation methodologies. Exemplary triangulation is essentially based upon referencing a speed of radio signals to determine a distance and location from a known reference. An unknown point is calculated by identifying a distance to three to four known points. The known points can be where the antennas for a reference location are positioned. The first known point identifies the distance to the GRL Device. The second known point then narrows down the location to two points. The third known point is then used to identify an exact location of the GRL Device. Basically the concept includes determining an exact location of the GRL Device via an intersection of three lines.

At step 514A, one or more sensors associated with or incorporated into the GRL Device will generate sensor data according to the design of each particular sensor and convey the sensor data to a digital memory. In some embodiments, the sensor data will be associated with a time generated by the atomic clock and a location calculated by the CPU. Sensor data may include, by way of non-limiting example, a local temperature, a local atmospheric temperature, ambient environment moisture content, motion, ambient atmospheric components, pressure, or other measurable quantity.

At step 515A, the GRL Device may poll for nearby GRL Devices. Polling may include, for example, one or more of: Near Field Communications, Bluetooth, Wi-Fi or other wireless standard. Polling may include a transmission requesting identification of GRL Devices within the proximate area. In some embodiments, a poll will include one or more of: an identification of a GRL Device requesting the information; an authorization to request the pooled information and a Collective to which the GRL Device polling the information is included.

At step 516A, the GRL Device will receive data from one or both of nearby GRL Devices and nearby reference devices. The data may include, for example, one or more of: a UUID of a device transmitting.

At step 517A, the GRL Device receiving the data from other nearby GRL Devices may store data according to a GRL Device profile with which the GRL Device is programmed. For example, data stored by a GRL Device may include one or more of a location of the GRL Device, data received from nearby GRL Devices, sensor data, reference station data, or related data.

At step 518A, the GRL Device transmits data related to one or more of: the GRL Device location, nearby GRL Devices, sensor data, and Reference Point data. The data may be transmitted, for example to one or more of: other GRL Device, a base station, a repeater and a Data Aggregator processing center.

Figure 5B:
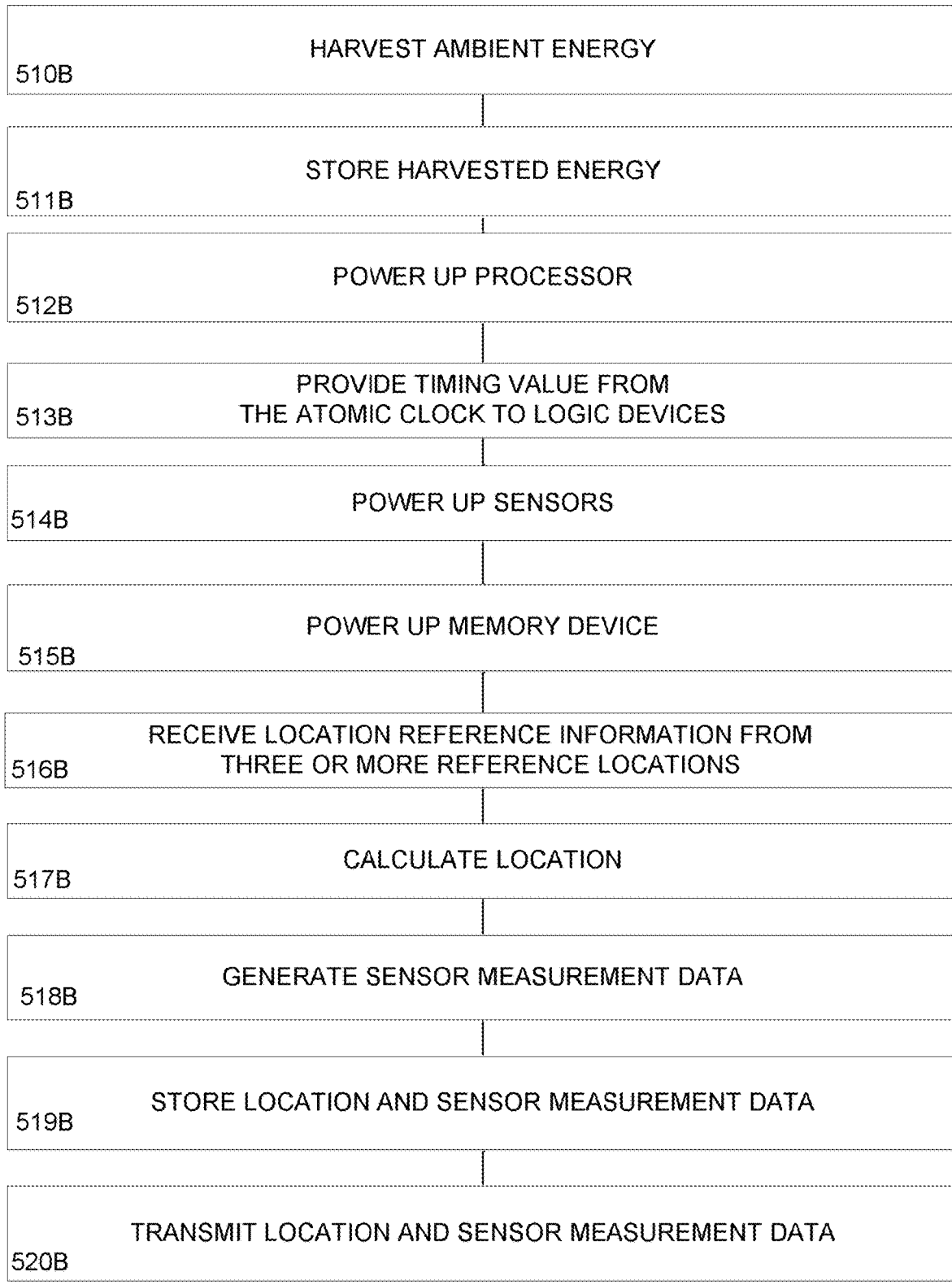

Referring now to FIG. 5B, process steps that may be implemented according to some additional aspects of the present invention are listed. At step 510B, a GRL Device harvests ambient energy from an environment proximate to the GRL Device. In various implementations, energy harvesting may include Wireless Energy Harvesting, wherein energy is received via wireless transmission, such as a conduit that does not include a physical contact with a battery, capacitor or power supply. Energy may be received via a Wireless Energy Receptor that includes a medium capable of acting as a receiver of one or both of: electrical energy and electromagnetic radiation via wireless transmission. Examples of a Wireless Energy Receptor include: an antenna, an induction coil and a wire.

Additional implementations may include energy received via induction from a device fixedly attached to a source of electromagnetic energy, such as an electrical power cord. Still other implementations may include conversion of kinetic energy, such as vibration or motion into electrical energy, such as, for example via a piezo electric device or transducer. Still other implementations include energy harvested from solar emissions and/or heat differentials. Heat differentials may include for example a thermoelectric device, such as a device that harvest electromotive force and ultimately an electric current based upon the Seebeck Effect.

In some examples, a Sensor may receive input causing a change in state of the sensor and provide one or both of detection and measurement, or a related processing of the event signal from the Event Source. Further, a location of the Sensor node relative to a location of the Event Source may be determined by the signal from the Event Source 121.

In some examples, the relative location is determined in terms of a relative distance or radial distance. A 'relative distance' or a 'radial distance' is defined as a distance between two Assets that does not take into account a direction. For example, the relative location in terms of a radial distance between the Sensor node and the Event Source may be determined by measuring a 'straight-line' distance between the Sensor node and the Event Source based on the signal strength that has known properties of strength as a function of distance. Alternatively, a location with respect to a coordinate system (e.g., latitude and longitude) may be known for the Sensor 109 and the Event Source such that the relative distance may be readily computed or otherwise published by the Event Source.

In some examples, both of a location of the Sensor node and a location of the Event Source are fixed. For example, the Sensor node may be placed or installed at a predetermined and substantially unchanging location. Similarly, the location of the Event Source may be predetermined and fixed according to a particular installation, for example. As such, the location of the Sensor node relative to the Event Source (i.e., the relative location) is also fixed. In other examples, one or both of the sensor node and the Event Source are mobile. In these examples, the relative location of the Sensor node and the Event Source may vary with time. However, even when one or both of the Sensor node and the Event Source are mobile, the relative location of the Event Source and the Sensor node is always known a priori or may be readily determined at a point in time when the Sensor node is sensing the Event Signal from the Event Source, according to the principles described herein.

For example, when both of the Event Source and the Sensor node are mobile, the locations of both the mobile Event Source and the mobile Sensor node may be measured just prior to production of the Event Signal by the Event Source and the relative location determined from the measured locations. In another example, the relative distance may be measured directly. In yet another example, the relative location may be inferred from dynamic information about the system. For example, dynamic information associated with planned paths of the mobile Event Source and the mobile Sensor node may be employed to infer or deduce respective locations therein at a time corresponding to arrival of the Event Signal.

In another example, the Sensor node has a predetermined and fixed location while the Event Source is mobile. In this example, the location of the Event Source is measured or otherwise determined to establish the relative location. In yet another example, the Sensor node is mobile and the Event Source is fixed. In this example, only the location of the mobile Sensor node just prior to the arrival of the Event Signal is measured or otherwise determined. In some examples, the radial distance between the Sensor node and Event Source is monitored dynamically and, in some examples, substantially constantly as a function of time. Hence, when the Event Source produces the Event Signal, the radial distance (i.e., the relative location) is known a priori.

In some examples, the relative location of the Sensor node and the Event Source is provided by a global position system (GPS). For example, one or both of the Sensor node and the Event Source may be equipped with GPS receivers to measure and determine their respective locations. In other examples, the location(s) are determined by another means including, but not limited to, various surveying and trilateration methodologies, interferometry and various location-determining methods based on photography. In yet other examples, the Sensor node may monitor a strength of a signal emanating from the Event Source. The radial distance from the Event Source to the Sensor node may be inferred from the monitored signal strength, for example. The emanating signal may be a calibration signal, Referring now to FIG. 5B, additional method steps that may be implemented are illustrated. At 511B, harvested energy may be stored for use by one or more of: the GRL Device, a sensor, a transmitter, a receiver, a digital storage and a highly accurate timing device.

At step 512B, the GRL Device provides power to a processor, such as a CPU sufficient to cause the CPU to execute logic commands. The logic command may be pre-programmed into the GRL Device or may be downloaded or otherwise provided to the CPU. The logic executed by the CPU may be causative to one or more of: electrical switches, gates, transistors, capacitors, crystals, integrated circuits, programmable logic devices, multiplexers, buffers, micro sequencers, memories, diodes, emitters, memristors, latches, CMOS, bipolar junction transistors, or other logical or electrical components.

At step 513B, the GRL Device provides a timing signal from a highly accurate timing device, such as an Atomic Clock to one or more logic or electrical components. In some implementations the frequency error of the timing signal may be accurate to within 1 part in $10^{12}$ up to within 1 part in $10^{14}$ (1 part in 10 to the 14th power). Other embodiments may include a timing signal accurate to at least within 1 part in 10 to the 6th power.

At step 514B, one more sensors may be provided power based upon a logical signal generated or processed by the GRL Device. In various implementations, the sensors may be incorporated as part of the GRL Device or may be in logical communication with the GRL Device. The sensors may return ready state signal to one or more logic systems in the GRL Device.

At step 515B, memory device may be powered on to a state ready to receive digital data.

At step 516B, the GRL Device may receive location reference information via wireless transmission. The location reference information may include one or more of: a location reference identification, a timing signal and a geo-location for a location reference.

At step 517B, logic executed by the GRL Device may calculate a location based upon the timing signal provided to the logic devices and the reference information received via wireless transmission.

At step 518B, the sensors make an assessment of a state of a condition proximate to or otherwise related to the GRL Device.

At step 519B, the GRL Device may store data related to the GRL Device location and sensor information as well as a time of the location determination and sensor readings.

At step 220B, the GRL Device may transmit one or both of: data descriptive of the location of the GRL Device and the sensor data. Transmission may be made via one or more of: near field communications, Wi-Fi, ultra-low power communications, a low power transceiver or other wireless capability.

Figure 5C:
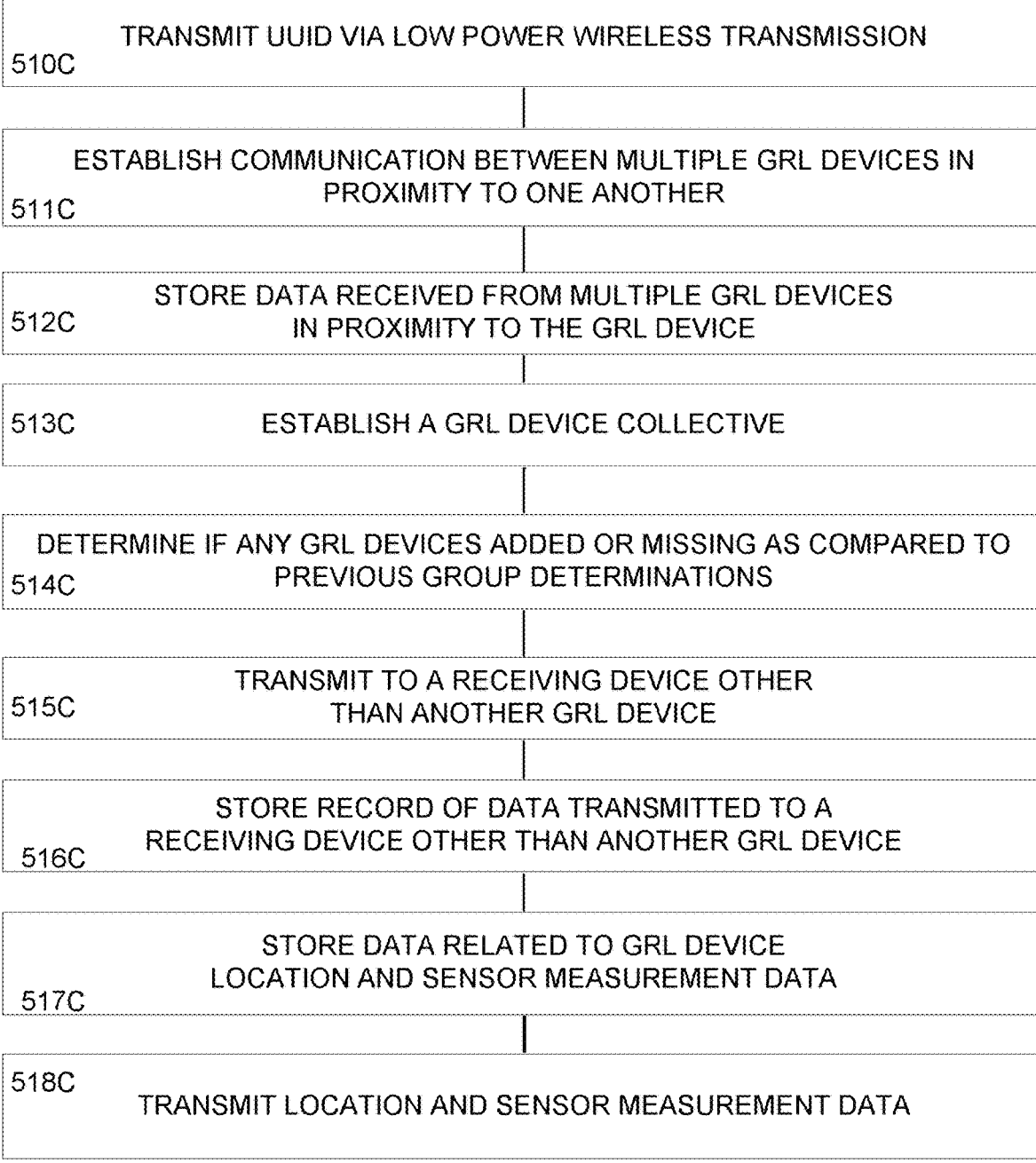

Referring now to FIG. 5C, process steps that may be implemented according to some additional aspects of the present invention are listed for forming and taking steps conducive to a GRL Device Collective. At step 510C, multiple GRL Devices may form a Collective. The Collective can track proximity of members of the Collective and also provide redundancy of sensor readings which validate sensor readings of proximate sensors which we define herein as Shared Sensors.

At 511C, a GRL Device may transmit a Universally Unique Identifier (UUID) to other GRL Devices in proximity to the transmitting GRL Device. The transmission may be accomplished for example via one or more of: near field communications, Wi-Fi, ultra-low power communications, a low power transceiver or other wireless capability At step 512C, a GRL Device may store information that was received from other GRL Devices in proximity to the transmitting GRLs.

At step 513C, multiple GRL Devices form a Collective that is defined by GRL Devices in proximity to each other, each GRL Device having a UUID associated with it.

At step 514C, one or more GRL Devices determine is any of the other GRL Devices in a Collective have been added or gone missing since a previous poll of GRL Devices in the Collective. If changes to a Collective have taken place, a GRL Device may store data indicative of the change.

At step 515C, one or more GRL Devices may transmit data indicative of a state of a Collective to a device other than another GRL Device. The device other than another GRL Device may include, by way of non-limiting example, one or more of: a GRL base station, a GRL Repeater, a Wi-Fi, a cellular network or online server.

At step 516C, one or more GRL Devices or another device or server receiving data descriptive of a GRL Device Collective, may store a record of data transmitted to a device other than a GRL Device.

At step 517C, one or more GRL Devices or another device or server may store data descriptive of a location of a GRL Device and sensor measurements made by sensors associated with or incorporated into the GRL Device.

At step 518C, a GRL Device may transmit data related to one or more GRL Devices location and sensor measurement data. Transmission may be made via Wi-Fi network, cellular network, blue tooth communications network, near field communications network or other wireless communications medium.

Figure 6:
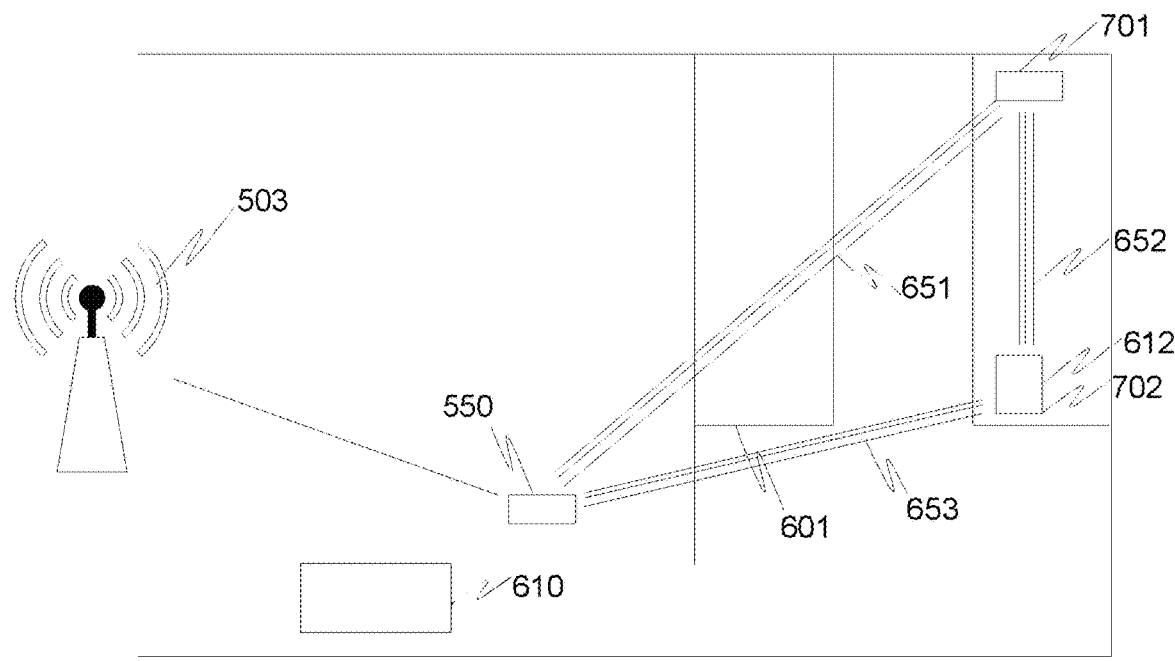
FIG. 6 illustrated the method and apparatus of a Description of Gateway App with GRLEA data delivery options.
Figure 6:
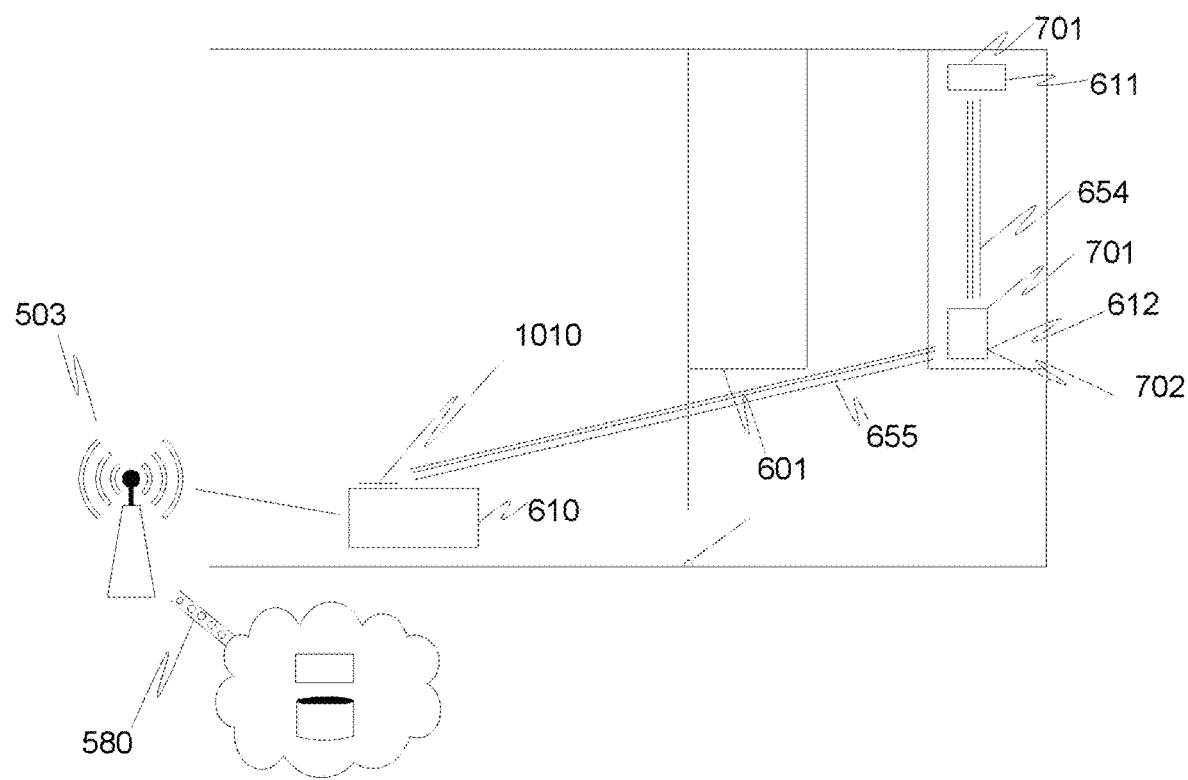

Referring now to FIG. 06, the schematic diagram illustrates some of the exemplary embodiments of the GRL Devices 100 as these relate to the communication with various RF sources such as Cell Tower 503 for trilateration. FIG. 06 illustrates several ways in which a GRLEA 701 with a Smart Gateway App in position 611 may wish to transmit 651 some of its Stored Data from Data Storage via Smart Gateway App via a Smartphone 550 and then onto to the Internet via Cell Tower 503.

In the top illustration, a Smartphone 550 with a Smart Gateway App is in Listening Mode, but it is not responding due to the structure 601 blocking the signal of 651. A similar GRLEA 702 in position 612 is in position to reach the Smartphone 550 as shown with Bluetooth 653 signal. The GRLEA 701 in position 611 is publishing a signal 654 that reaches the GRLEA 702 in position 612. Thus, the GRLEA 701 can now know that it can utilize the GRLEA 702 as a Smart Gateway to deliver its Stored Data via Bluetooth 652 to Bluetooth 653 to Smartphone 550. The communication can continue over a Cellular Data connection to a Cell tower 503 (which may be one of several types of Reference Points) and then onward to the Data Aggregator over the public Internet.

In the bottom illustration, there is no Smartphone 550 available. However, there is a GRLE Generic Computerized Asset 610 with a GRLE Product Label. The GRLEA 701 is publishing a signal 654 that reaches the GRLEA 702 in position 612. Consequently, the GRLEA 701 now knows that it can utilize the GRLEA 702 as a Smart Gateway App to deliver its Stored Data via q signal 654 such as Bluetooth then relaying 655 it to the Generic Computerized Asset 610. The communication of the Stored Data continues onward over a cell tower signal and then travels via WAN 580 to the Data Aggregator over the public Internet. In this way any GRLEA 701, 702 or any Smartphone 550 running a Smart Gateway App publishes its capabilities to Authenticate with UUID and Location Data Hash then store and securely forward its data on behalf of another GRLEA 701, 702.

In some embodiments, a GRL Device that may have limited RF communications capabilities may utilize a low power transceiver such as Bluetooth to receive location data from a GRL Device equipped Asset such as a Smartphone with a Smart Gateway App that is broadcasting its own trilateration based location data. The limited RF GRL Device Asset can store this information in its Log file. When a limited RF GRL Device Asset is in the presence of many location broadcasting GRL Devices, many possible algorithms can be defined to decide what is the most accurate and appropriate Location Data to store in its local Log file 108A.

Location broadcasting GRL Device Assets can act as Authenticated mobile beacons (Reference Points) with Location Data for GRL Devices that are Receive only (ones that do not include the optional Transmitter). The GRL Device may use a low cost Optional Module 130 to interface to other devices to share data from Storage 108 or the Log 108A.

Certain GRL Enabled Assets such as Smartphones or other mobile devices may include application software that provides traditional communications gateway functions for limited radio frequency enabled Assets. For example, a limited capability RF enabled Asset may respond to a request generated by a Smartphone application to publish its Log 108A The communication may be accomplished by a variety of modalities as mentioned in this application. Once GRL Device Assets have established a connection with an appropriate authorization as determined by the settings of a Local Profile 411 in one or more Assets, the Smartphone GRL Device Asset may relay Log 108A and other Data Storage 108 to a Data Aggregator 461.

Figure 7:
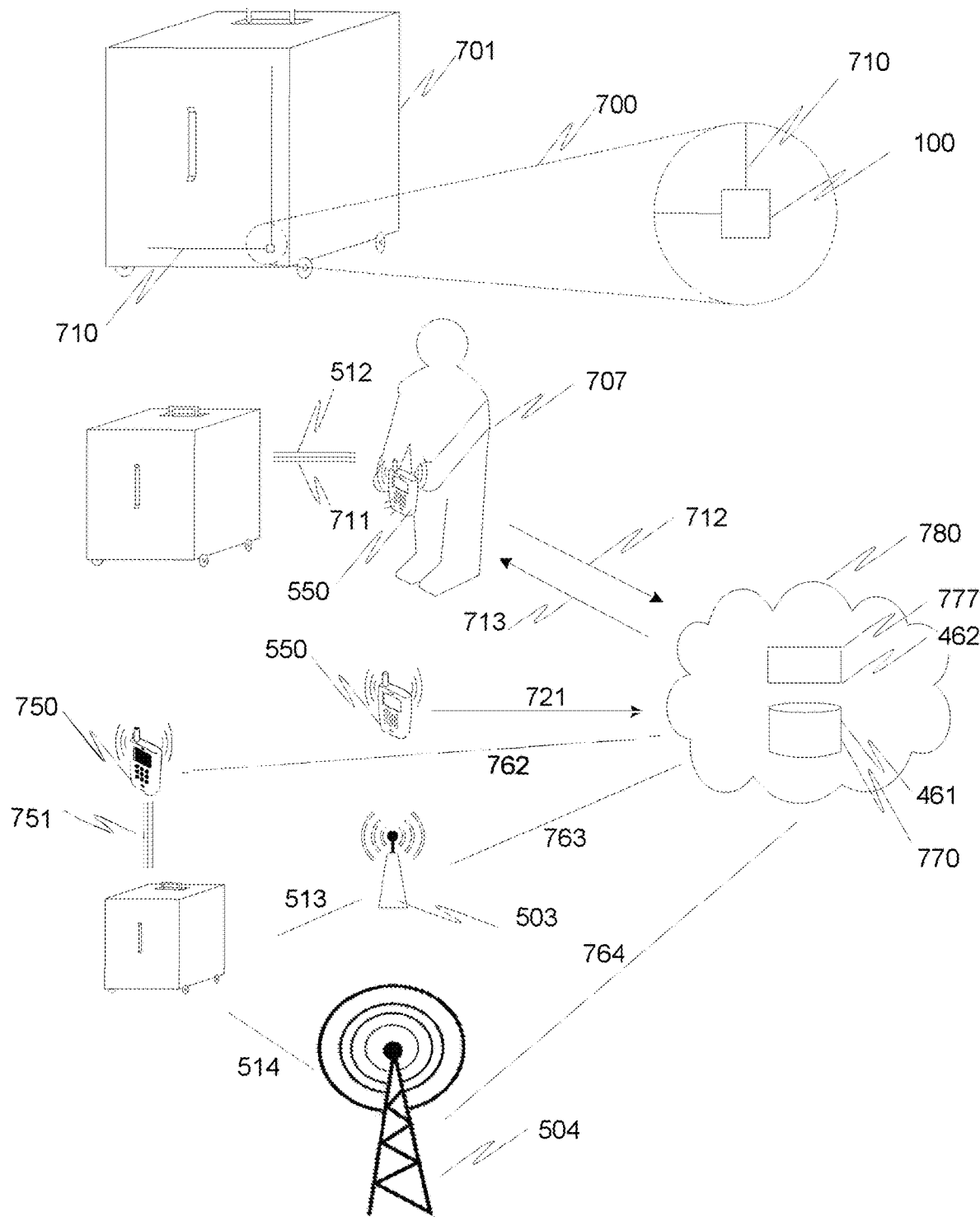
FIG. 7 illustrates the method and apparatus How to Find an Asset with GRLs and GRL systems.

Referring now to FIG. 7, the schematic diagram illustrates some of the exemplary embodiments of the GRL Devices regarding the ability to find Assets that are GRL enabled aka (GRLEAs). As illustrated FIG. 7 embodies several easily recognized configurations with large variances of key components such as size of CPU, size of battery, radio power output and frequency. This is intended to illustrate the broad set of possible uses of the GRL Device as a Self-Locating technology.

This example illustrates a GRLE Suitcase 701 with a Long Range Antenna 710 installed and the Zoom view 700 shows the GRL Device 100 with the Long Range Antenna 710 attached that provides the long distance communication with lower frequency communications.

The process starts with an Owner 707 using their Smartphone 550 using the Smart Gateway App in Registration Mode and communicating with the GRL Device 100 in the GRLE Suitcase 701 via Bluetooth 711 Once the Owner 707 has configured for Bluetooth paring 512 the GRLE Suitcase 701 and provided its "Home" Spatial Domain and ownership profile, the data is sent 712 to the Data Aggregator 461 running a Find It Server App 777 on the Data Processor Server and the Registration Data of Owner 707 info is stored in the Data Aggregator Database 770 within the internet cloud 780.

At some point in the future the Owner 707 reports on their Smartphone 550 via Smart Gateway App transmission 721 that the GRL Enabled Suitcase 701 is missing. The Find It Server 777 can broadcast over networks via 762, 763 and 764 to signal any person who or system that is running a Smart Gateway App conveniently called Crowd Find It 750 via a cell signal broadcast 513 or via a low-frequency signal 514. Once the Suitcase 701 is reached with the appropriate command sequence to respond, it will send a message back to the conveniently named Crowd Find It Server 777 with its current and historical location data. The conveniently named "Crowd Find It" Server 777 then notifies the Owner 707 via a message 713 to the Owner's Smartphone 550.

The person whose Smartphone's Smart Gateway App "Crowd Find It" 750 that received the signal from the Database 770 with the UUID of the Missing GRLE Suitcase 701 recognizes it when it is within range and can poll it 751 finding the match. The Long Range Antenna 710 of the GRLE Suitcase 701 enables the ability to find GRLE Suitcases 701 that may be outside the range of a particular Reference Point such as a cell phone tower 503. In this case the GLR Enabled Suitcase could use its Long Range Antenna to reach via 514 a tall FM Broadcast tower 504 to then reach the Crowd Find It server 777 via 764.

Figure 8:
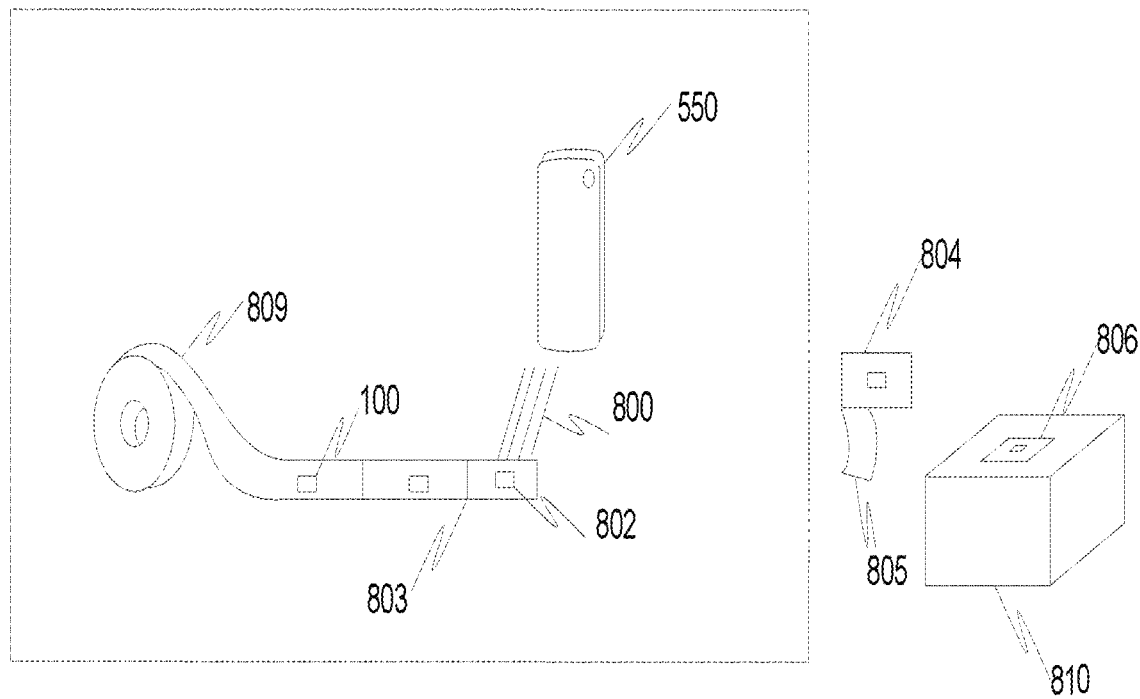
FIG. 8 illustrates method and apparatus of a GRL Query App to Activate UI on GRLEA with MFO.
Figure 8:
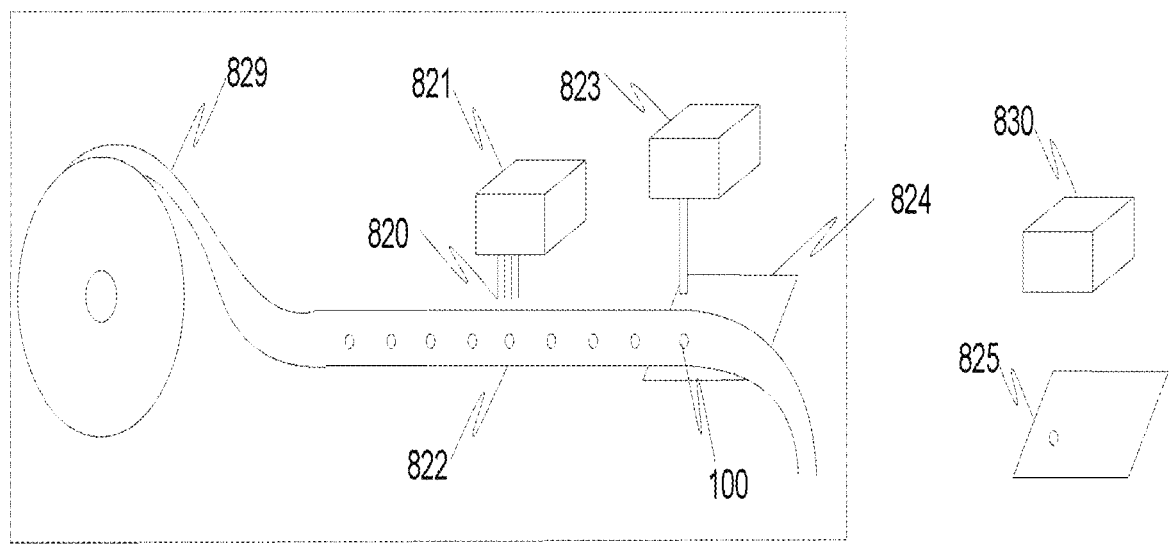

By way of example the FIG. 08 in the invention now illustrates a preprinted Label Reel 809 containing a set of GRL Devices 100 in the process of being Registered into ready to operate as GRL Enabled Labels such as 804. The GRLE Labels 802 are separated by tear strips at the seam 803 between adjacent preprinted labels on the Label Reel 809. As they are peeled off the Label Reel 809 in a home environment that is a registered Spatial Domain 1640 such as a home office or small final assembly facility, a Smartphone 550 transmits the Smart Gateway App appropriate and Authenticated programming commands over NFC 800 to provide unique registration data to the individual GRL Device 100 on the Label 804. The programmed GRLE Label is peeled off at the removable adhesive back 805 before being Affixed 806 to a box 810 prepared for shipment.

The invention now illustrates on the bottom half of the FIG. 08. A Chip Reel 829 containing a set of GRL Devices 100 along a substrate material 822 in the process of being incorporated into Motherboards 824, 825. The GRL Devices 100 move into the range of a Programming Robot 821 which transmits the Smart Gateway App appropriate and Authenticated programming commands over NFC 820 to provide unique data to the individual GRL Device 100 passing through its conveyor. The next step features a picking and placement Robot 823 which moves the individual GRL Device 100 to a Motherboard 824 which now includes GRL Device capability. The finished GRLE Motherboard 825 is packaged into a finished box 830 as production is completed.

Figure 9:
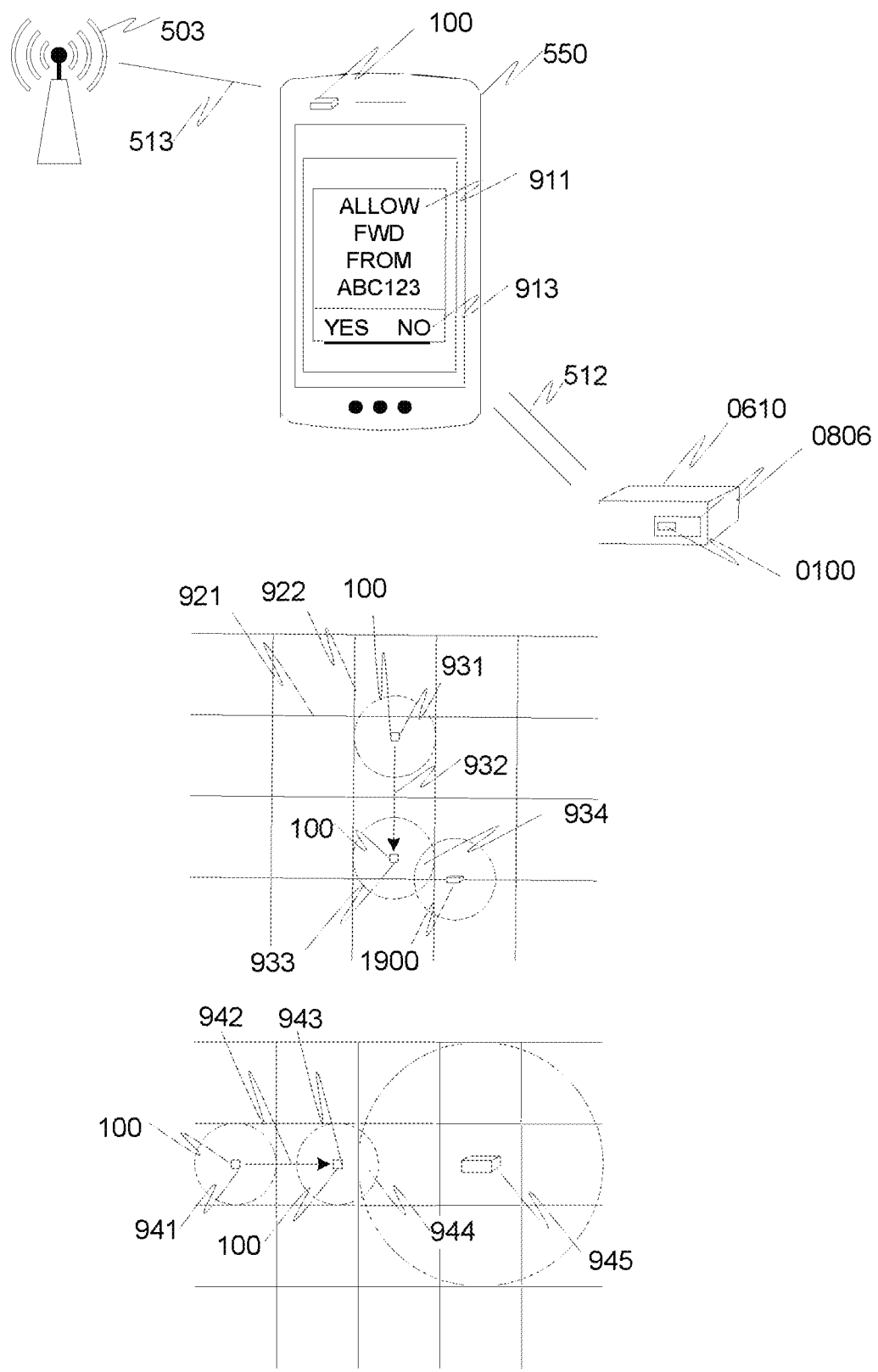
FIG. 9 illustrates a methods and apparatus for a GRL Device Smart Gateway app to communicate with nearby GRL Devices and their Enabled Assets.

By way of example FIG. 9 shows a novel method of providing transport of data from one GRL Device to an Internet Server or any other computing resource via a DCN where the DCN is not in range, and the two GRL Enabled Assets 550, 610 each have Local Profile Data Value Settings that require the distance to another GRL Device to be within the sum of the Radius of their known position to respond to published request to initiate communications. In this example, the Smart Gateway App running on both 550 and 610 described herein are illustrated an overhead chart showing 10 meter gridlines 921, 922, a GRL Device 100 within an Affixed Label 806 located in position 931 on the chart inside a Generic Computerized Asset 610 while in Listening Mode detected via Bluetooth 512 a GRL Device 100 in a Smartphone 550 at position 933. As the User of the Smartphone 550 walks 932 toward the GRLEA 0100 to position 933, the sum of the radii of the two GRL Devices 934 are shown to overlap illustrating that the Smart Gateway App 911 could now be authorized to Interrupt the User and since the Local Profile of the GRL Device 100 in the Smartphone 550 has a Local Profile Data Value Setting that requires User permission to allow itself to be used as a GRL Device Smart Gateway. Once the User touches Yes or No 913 the Communications Session between the GRL Devices can initiate an Authenticated session.

As another example, to further illustrate the sum of the radius concept, a short range 5 Meter radius setting of the Smartphone's 550 GRL Device 100 is in position 941 and as the User NNNN walks 942 from position 943, it encounters and overlaps the GRLEA 0100 at position 945 with a longer range 15 Meter radius setting which is based on indoor Self-Location coordinates not RSS values. The range values as discussed herein are arbitrary and only for illustration purposes. The actual values for RSS can cause the range of Data Values to vary widely based on RF used and the power radiated by the transmitter and the sensitivity of the receiver.

The calculations are relatively simple to implement this functionality using well-known open source geospatial data such as GDAL/OGR. The GRL Device 100 with its precise Self Locating capability calculates its own position in GPS coordinates, and it is in Listening Mode which enables contacting the other GRLEA 0100 inside the Generic Computerized Asset 610 which publishes its position on the grid as 945.

As another example, to further illustrate the sum of the radius concept, a short range 5 Meter setting of Smartphones 550 GRL Device 100 is in position 941 and as the User walks 942 from position 941 to 943, it encounters and overlaps the GRL Device at position 945 with a longer range 15 Meter setting. The range values as discussed herein are arbitrary and are for illustration purposes only. The actual values for the range Data Values can vary widely based on RF used and the power radiated by the transmitter and the sensitivity of the receiver.

The calculations are relatively simple to implement this functionality using well-known open source geospatial such as GDAL/OGR. The GRL Device 100 with its precise Self Locating NNNN capability calculates its own position in GPS coordinates and it is in Listening Mode NNN to the other GRL Device 100 inside the Generic Computerized Asset 610 in which is publishing its Authenticated position on the grid as 945.

Figure 10:
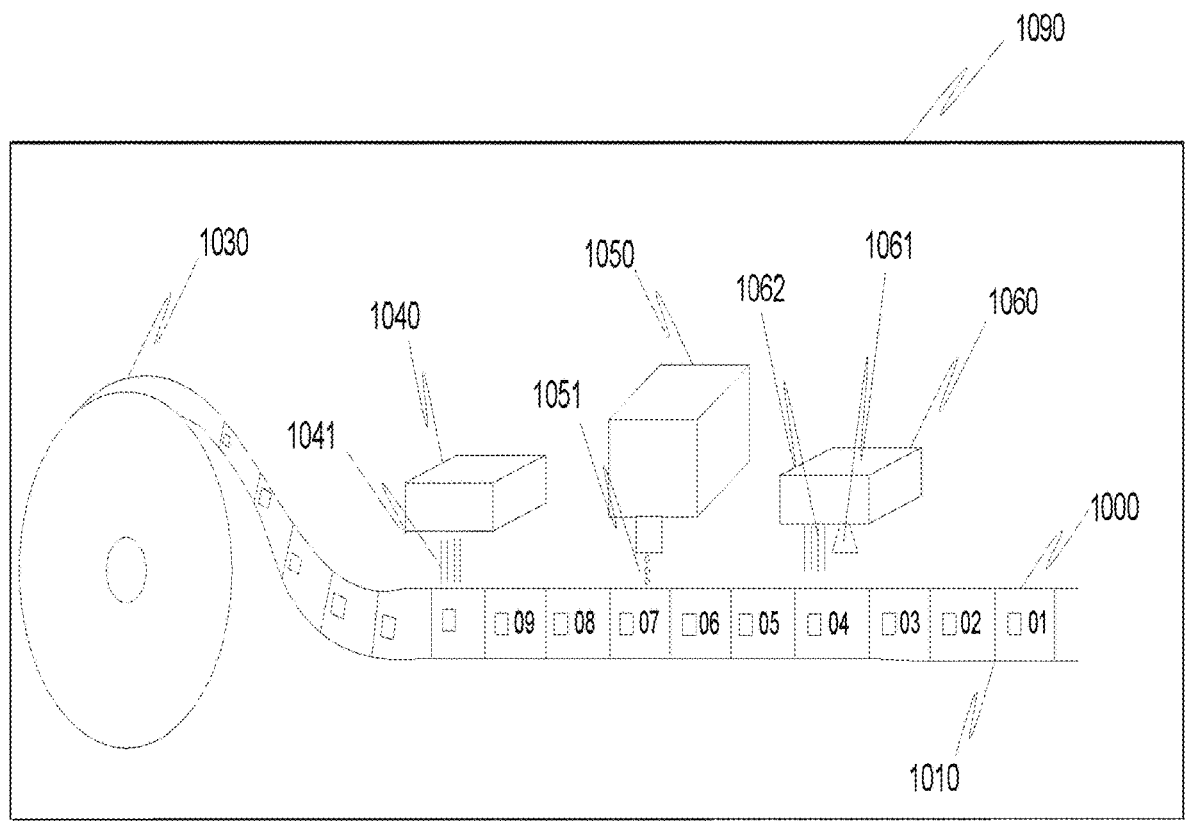
FIG. 10 illustrates a method and apparatus process for labeling and verifying GRL Devices with materials to enable visual inspection of unique numbers, letters and patterns that correspond to the UUID in the GRL Device.

By way of example the FIG. 10 in the invention now illustrates a Reel 1030 containing a set of GRL Devices 100 in the process of being incorporated into complete GRLE Labels 1000. The GRLE Labels 1000 are separated by notched Tear Strips 1010 to make it easy for a personal User to manually separate. As they are peeled off the reel into an assembly area, a radiofrequency based GRLEA with a Smart Gateway App running a conveniently named Programming Station 1040 transmits the programming commands over NFC 1041 to provide Authenticated unique data to the individual GRL Device 100 passing through the Authenticated Spatial Domain 1090. The GRLE Labels 1000 were previously programmed at a Geofence Manufacturing Zone (not shown as it is in a different Spatial Domain located far away). The GRLE Labels can only accept Local Profile programming at the Spatial Domain of the Facility 1090. The next step features an inkjet printer 1050 which applies 1051 ink identification such as product serial numbers, a UUID serial number and other essential information that match the particular GRL Device 100. Next, the printed labels move through the production line to reach a quality control station 1060 which views the printed information via an OCR camera 1061 and additionally reads the associated Local Profile Data via NFC 1062 to confirm completion and accuracy of the printed GRLE Labels 1000 that match the Local Profile Data Values in the GRL Device 100 prepared at the verified Spatial Domain location.

Figure 11:
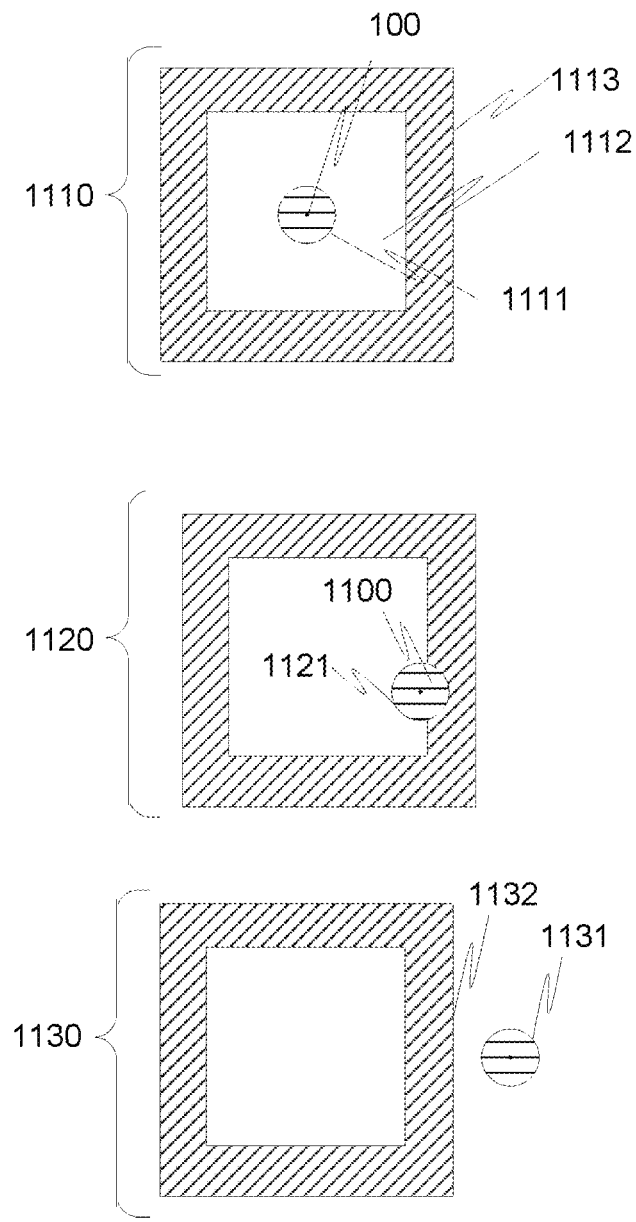
FIG. 11 illustrates the method and apparatus Spatial Domain based events with GRLEAs.

By way of example, this FIG. 11 illustrates a novel way to determine if an Event has occurred based on Self Locating GRLEAs that are interacting with Geofenced areas that have Zones of Uncertainty.

FIG. 11 illustrates views of a rectangular Geofenced Area across three time points 1110, 1120, 1130. A single GRL Device 100 exists and Self-Determines its location at different locations relative to the Geofenced Area across these time points 1110, 1120, and 1130. An outer perimeter 1113 exists beyond the inside area 1112 of the Geofenced Area. At the time point 1110, the GRL Device 100 has a zone of uncertainty 1111 that is completely within the inside area 1112 of the Geofenced Area. At the time point 1130, the GRL Device 100 has a zone of uncertainty 1131 completely beyond the outer perimeter 1132 of the Geofenced Area. At the time point 1120, the GRL Device 100 has a zone of uncertainty 1121 intersecting the region between the outer perimeter 1113 and the inside area 1112 of the Geofenced Area. This represents a situation where it isn't possible to determine whether the GRL Device 100 is inside or outside the Geofenced Area. Entering the situation within the time point 1120 from the status of either time point 1110 or time point 1130 represents the generation of an Event indicating the crossing of the border of the Geofenced Area. Zones may be defined in two or three dimensions. In some embodiments, a zone may be defined for a predetermined period of time, essentially adding a fourth dimension. The Zone of Uncertainty may be a Data Value that can be combined with a Quality Seal to allow for transactions to Events to occur when there is uncertainty of location by either the GRL Device or the organization that is maintaining the Spatial Domain that created the Geofence.

Figure 12:
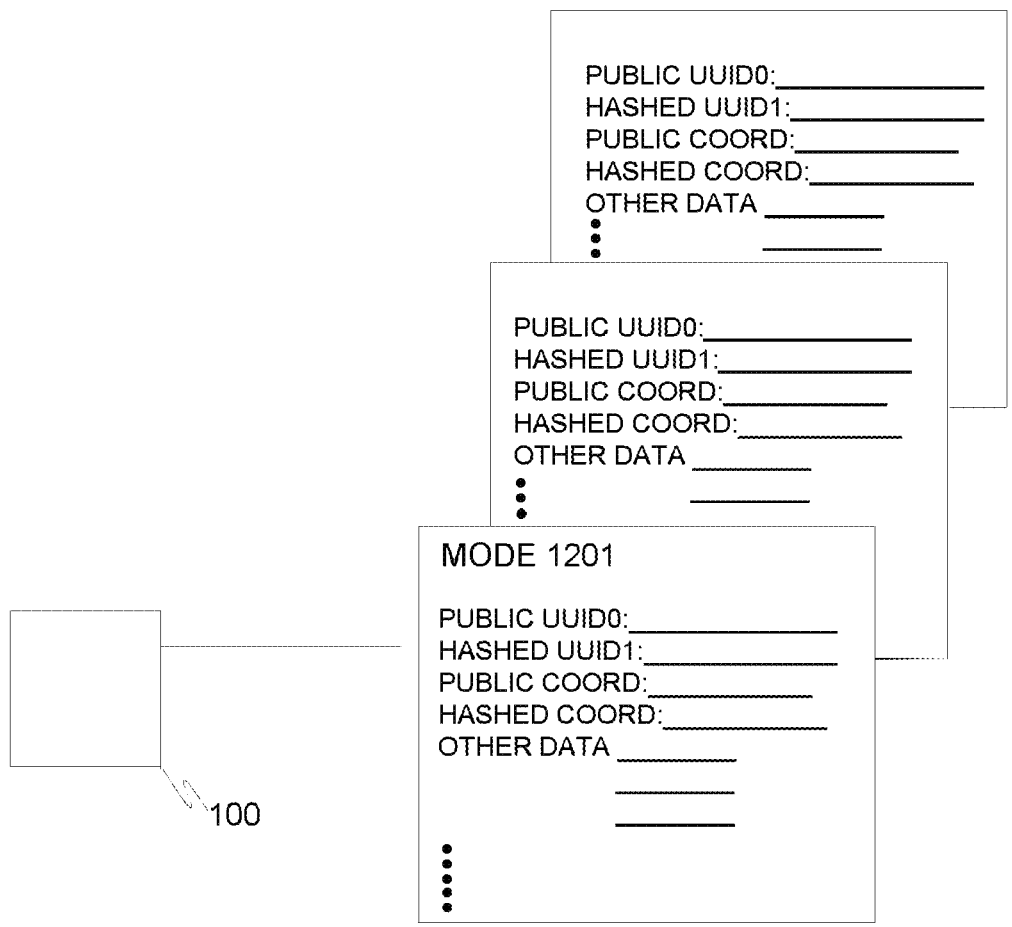
FIG. 12 illustrates the methods and apparatus of Self Locating GRLEA determining Spatial Domain Events.

By way of example in FIG. 12 GRL Device 100 has a Sensor that receives input that logic determines to be an Event from an outside source. An example is a thermal energy sensor receiving input indicative of an external temperature exceeding a value entered into a local profile. Logic determines that the sensor input constitutes an event. The GRL Transmitter transmits over Bluetooth a set of data related to its Mode in this scenario node 1201 it publishes a minimum of sets (i.e. 4 sets) of information of public UUID hashed UUID public and hashed Local Self-Determined coordinate data based on its internal trilateration with the miniature atomic clock. Based on the modes as determined by the Local Profile, the GRL Devices will publish the some information including Authenticated Location Data and unique identifiers (UUIDs) in any other appropriate data in this way the published information became can be Authenticated with both the public UUID as well as its location in both public disclosure and hashed where it can be Authenticated.

Figure 13:
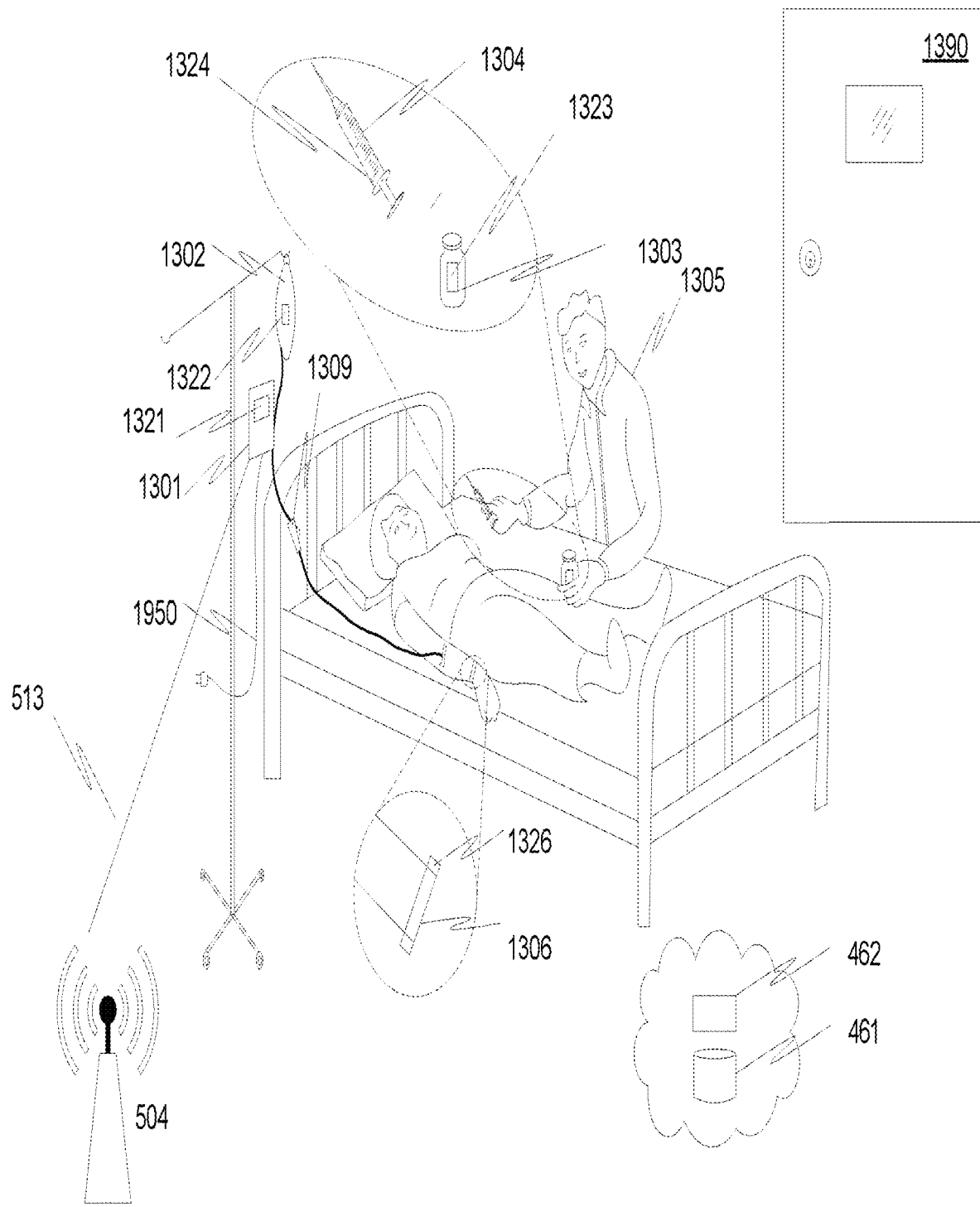
FIG. 13 illustrates the method and apparatus of a scenario of a Collective apparatus comprised of GRL Devices that and its collaborative methods working with other Devices and People that can communicate with it.

By way of example as shown in FIG. 13 in some implementations, GRLEAs that are candidates to join a Collective may be both a Listen Mode that enables hearing broadcasts of other GRLEAs and some may be in a Limited Share Broadcast Mode where they provide only identifier information such as a UUID and a Status code from their Local Profile. GRLEAs can join with each other into a Collective that can then execute useful functions and processes in a concerted fashion relaying trustworthy data to each other. When the GRLEAs detect others, they will recognize using their Local Profile whether they can participate and join into a GRLEA Collective. Criteria for joining a Collective is based on these GRLEAs being able to determine that they are within a Geofence region called Hospital Room 1390 and can be Authenticated with an appropriate Quality Seal. In this example, a Nurse 1305 enters Room 1390 and checks the patient's Bracelet 1306 that includes a GRLE label 1326. The Nurse 1305 is carrying a GRLE Medicine Vial 1303 that has a GRL Device label 1323 that includes a quantity sensor and then transfers the Meds into a syringe 1304 that has a GRL Device label 1324 that detects movement of the plunger. The Nurse 1305 can insert the Meds into the IV Valve 1309. The Internet connected IV Infusion Monitor 1301 has a GRLE Label 1321 that monitors the settings and reports. The Fluid bag 1302 also includes a GRLE Label 1322 that provides content data to the Collective. The data of the Event is transmitted via the IV Infusion Monitor 1301 to a Reference Point tower and then via Bluetooth 512 on to a Data Aggregators such as the Hospital data center via an in range Cell tower 503 using an encrypted data format.

FIG. 13 illustrates the novel method by which GRLEAs may automatically form a Collective to complete a useful task that is fully automated, convenient and secure while providing additional information to improve the logistical efficiency and lower risks of errors in care. 1) GRLEA devices have Local Profiles with qualification criteria to join the Collective 2) The GRLEA devices are in Listen Mode and Limited Broadcast Mode 3) the GRLEA have determined from Self Location that they are in the same Geofence that had been established in the Aggregator Database administered by the Hospital Data Center.

Figure 14:
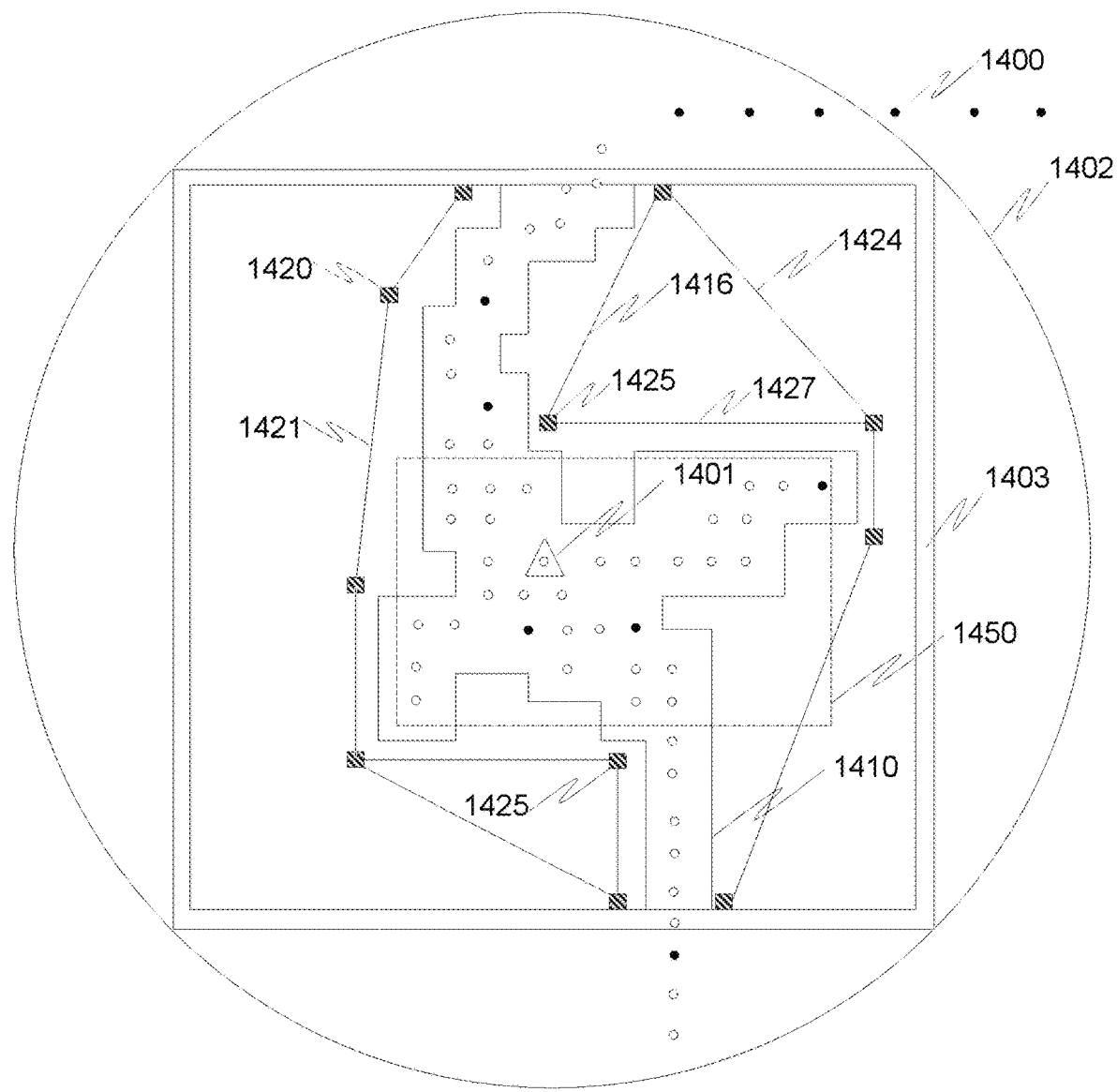
FIG. 14 illustrates method and apparatus for the Automated Creation of Geofences from Aggregated Data from GRLEA published locations.

By way of example this FIG. 14 illustrates a process by which an automatic method of creating a Geofence from a certain point based on the historical movement points called Popcorn Dots 1400 on a grid and reporting of a location sensing device such as a GRL. In this example at a known indoor position 1401 indicated by a triangle. A GRL Device 1401 Self Determined its location and generates a radius 1402 that the User defined in the GRL Device 1401 Local Profile Data Values. The User rand a conveniently name Perimeter Finding Algorithm creates a rectangle within the inscribe circle as to where the calculations of frequency of Popcorn Dots are tracked and illustrated as Popcorn Dots 1403. The Perimeter Finding Algorithm then inscribe with the thick black line 1410 wherein algorithm determines the Data Value based on the actual pattern of movement of Popcorn Dots. In a next step of the algorithm another process creates a perimeter with no concave in areas 1421, 1424 to create a Geofence which Data Values are defined by the large rectangular boxes 1420 has an additional feature a rectangular box can be placed in 1425 to allow four concave Data Values of for particular size indicated by the lines 1416 and 1427. The dashed lines of 1450 represent the perimeter of the interior structure (a home) where the data points were captured.

In this way an individual can easily and automatically define areas where they normally move while at home. Once the Geofence perimeter is defined, they can then be automatically be notified when any GRLEA that is configured to remain within the Spatial Domain conveniently called Home. If that Geofence is penetrated, the creator of the Home Spatial Domain will be alerted via the GRL Device transmitter.

The Geofence Perimeter 1421 defined by the Algorithm created points 1420 can evolve over time and can be joined with other Geofence perimeters.

The ability for a GRL Device to capture Authenticated Self Location Coordinates indoors and outside combined with Authenticated UUID Data Polling of any GRL Enabled Asset creates the ability for a single GRLEA or a Collective of GRLEAs to deliver and share set of Authenticated Location Popcorn Dots to a Aggregated Database in Data Aggregator 461. This database can then run a program that develops a set of 2D and 3D polygons that represent the areas of movement of GRLEAs along with the time and sensor data. The Aggregator Database that can store the Local Profile Data 108 from GRL Devices can be processed with well-known techniques such as SQL Queries running on a Data Processor 462 to provide Derived Data for a myriad of uses.

For example: a purse that has been GRLE can actively update its location information over time to learn the Spatial Domains where it has been and the perimeters of the Geofences when it leaved a defined Spatial Domain. As the GRLE Purse moves from home to work to school to stores, it will build a profile of known locations. This information can be shared to its Collective, for example a Smartphone running the Smart Gateway App with the conveniently named Personal Goods Collective App Another example: a Police Officer who has the a Smartphone with a Smart Gateway App conveniently named "Authorized Pinger" can be in a Mode where it looks for GRLE Evidence Containers to be alerted automatically if the Evidence Container leaves the known set of paths from the Police Substation and the Route to the Central Evidence warehouse and to the other Affiliated Spatial Domains such as the Forensic Lab. The Evidence manager can use his movements over a period of time that could be minutes to days to build a set of Popcorn Dots.

Finally the fact that GRLEAs can be the source of Derived Data with ALDOSA, nearly every person and organization and machine can now count on and comfortably interact with and rely on the security and privacy of the information about the Asset(s) that have been GRL Enabled.

Figure 15:
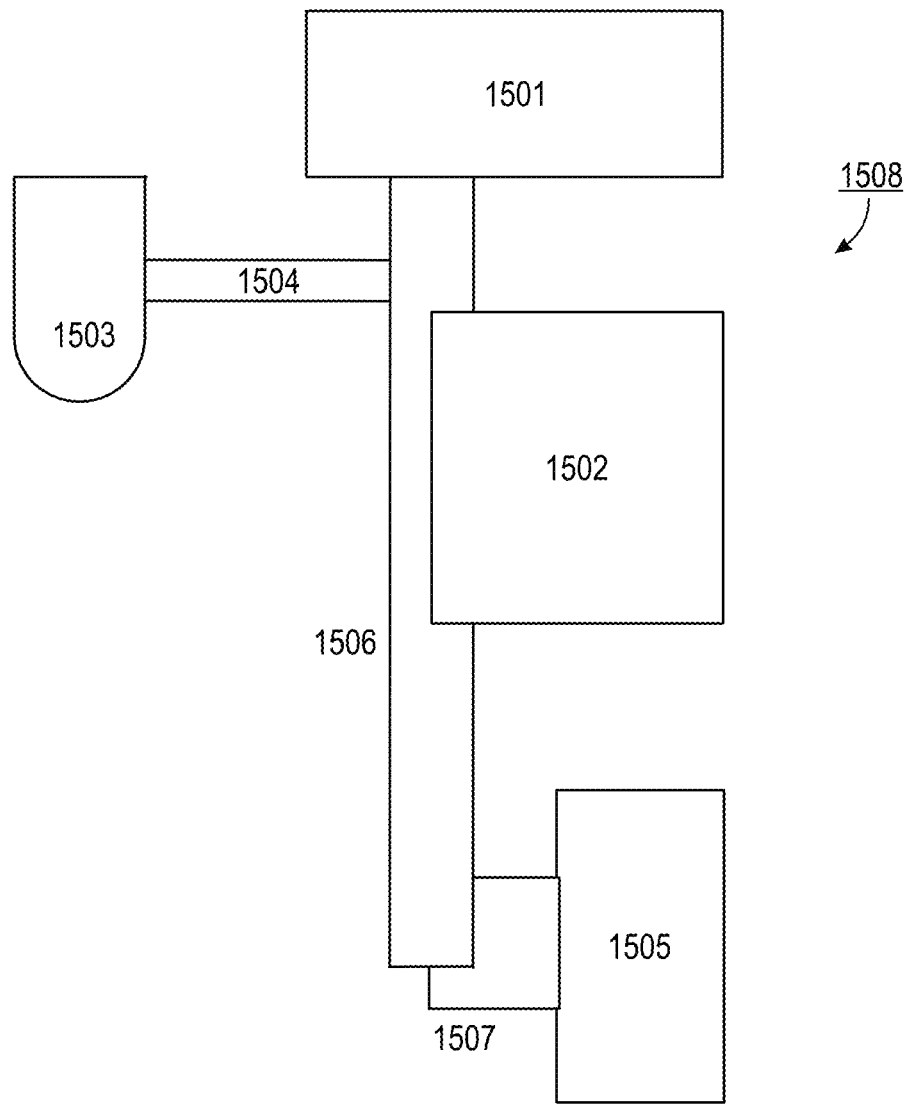
FIG. 15 illustrates the method and apparatus of joining Spatial Domains to create a larger Spatial Domain Combination.

Referring now to FIG. 15, a bock diagram illustrates a process by which multiple spatial domains 1501-1507 may be combined to form a more complex domain. As illustrated, each respective domain 1501-1507 comprises a shape of a relatively complex polygon. The combined shapes 1501-1507 form a more complex polygon 1508.

Accordingly, a Data Aggregator may create or receive a Spatial Domain that is represented by a complex polygon. The Spatial Domain may be used by one or more of: a Smart Gateway App; a Server App and a GRL Device App. A GRL Device App may be generated using one or more Open Source programs listed elsewhere in this disclosure. A generated GRL Device App may be used to create a Spatial Domain that may be viewed or edited by a processor, such as those processors included in a GRL Device Smart Gateway App, a Smartphone, a Data Processor that is hosting a web App or other device capable of executing code incorporating Open Source and other custom programs.

An Assembled Spatial Domain may be named and subsequently referenced by authorized devices. In some implementations, an Assembled Spatial Domain may include combinations of Spatial Domains created by GRL Devices that share one or more Spatial Domains. For example, GRL Devices in a same Collective may share defined spatial domains. In another example, GRL Devices that have an appropriate Quality Seal or which originate from a Data Aggregator may provide Spatial Domains in multiple formats from multiple source. One example includes Spatial Domains based upon information contained in Open Source SHP files for roads and highways around the world.

In another aspect, Spatial Domains may be defined that include, or link to, additional data such normally called Layers in the geospatial industry. In some embodiment the Popcorn Dots (see FIG. 14) represent locations that the GRL Device has included in an updated Local Profile Data Values. The updates may include, for example, intended destination points and routes in a travel plan while an Asset associated with the GRL Device are under Common Ownership. Accordingly, in some implementations, a GRL Device can be Self Aware and a shipment of an Asset associated with Self Aware GRL Device can be ascertained to be consistently within its complex Spatial Domain. A GRL Device may also automatically Publish that it is been within or outside of a perimeter of its Assembled Spatial Domain.

Figure 16:
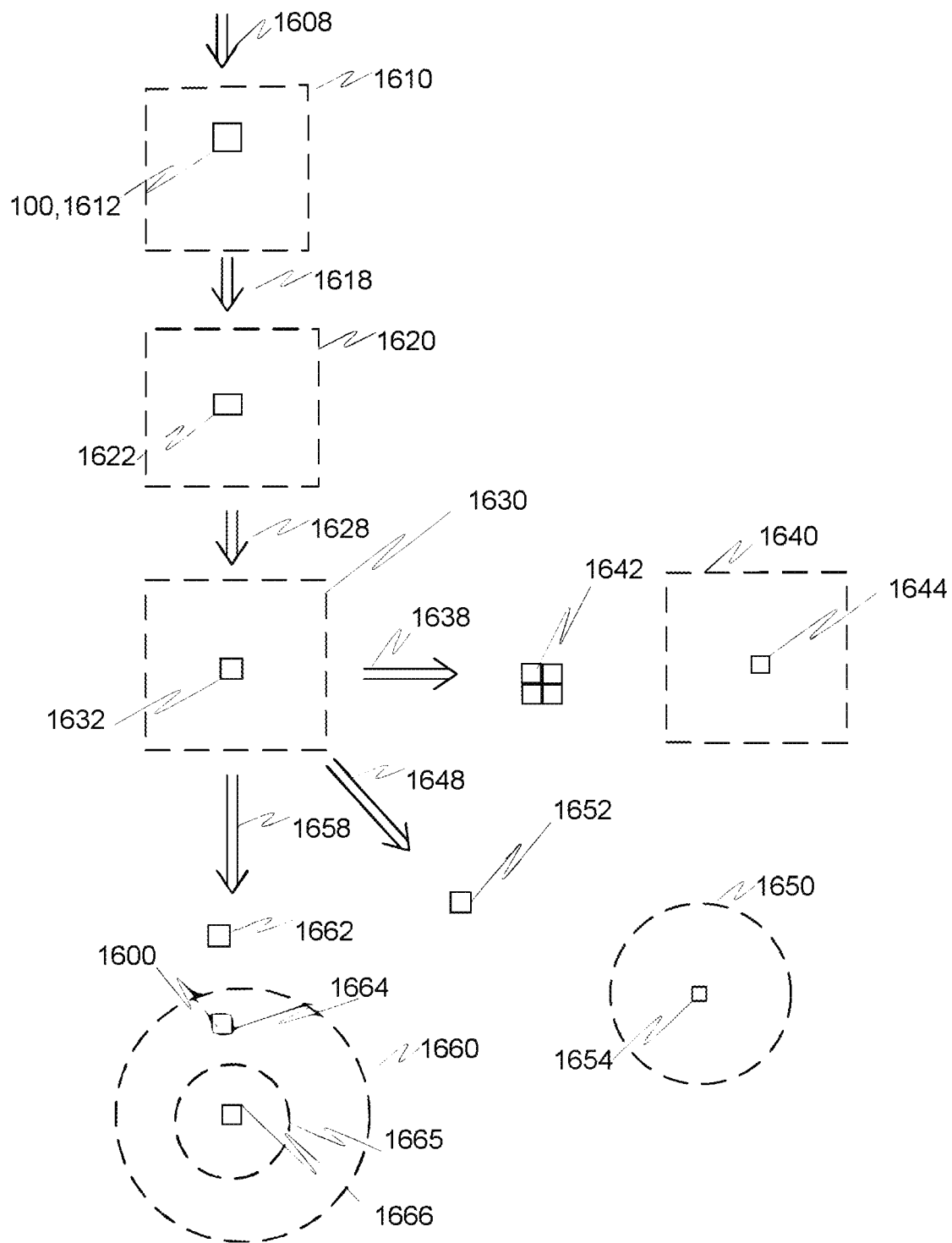
FIG. 16 illustrates methods and apparatus involved in Spatial Domain enabled authentication.

By way of example the FIG. 16 illustrates the process by which a manufactured GRL Device 100 may get through several stages of programming based on its Self-Awareness of location and configuration for various types of programming. A GRL Device 100 that has been manufactured is delivered 1608 to a Spatial Domain 1610 for initial programming. Once it receives the some Local Profile Data Values including Reference Points Database which includes Spatial Domains 1620 and 1630 as valid. The DGRL Device will accept this data since it can Self-Locate and Authenticate that it located at 1612, the valid programming area 1610.

The GRL Device 100 is moved 1618 to a second programming location 1620 where is can accept additional Local Profile data 1622. The GRL Device 100 is now sent 1628 to the Distribution Point 1630 where the GRL Device 100 may change ownership to a variety of Users who have the ability to set their own profiles 1632. In the case of a GRL Device 100 sent in direction 1658 to an Owner of a GRL Device 1662, that user may configure the GRL Device 1600 to alert 1664 when it determines it is near 1660 a Geofence area 1665 such as a border control location that will query it for normally private data that can be published. When that device is within the Spatial Domains 1665 Geofence area the GRL Device at position 1666 will publish private data to the Authenticated authority for that is located within the perimeter of Spatial Domain 1665. In this way any Owner of a GRL Device 100 will be able to configure its ability to alert the Owner if it is near a position where private data may be accessed.

The GRL Device 100 may also be sent in direction 1648 by means of shipping to reach a home location's Spatial Domain 1650. When the GRL Device 100 is within the home Spatial Domain 1650 of the Owner, its Status can be reprogrammed 1654 to engage new privacy settings based on the preferences of the home owner.

The GRL Device 100 may also be sent in direction 1638 as part of a large shipment 1642 to a retail location's Spatial Domain 1640. When the GRL Device 100 has arrived there and its delivery is confirmed, its Ownership Status can be reprogrammed 1644 to that of unsold merchandise available for purchase.

Figure 17:
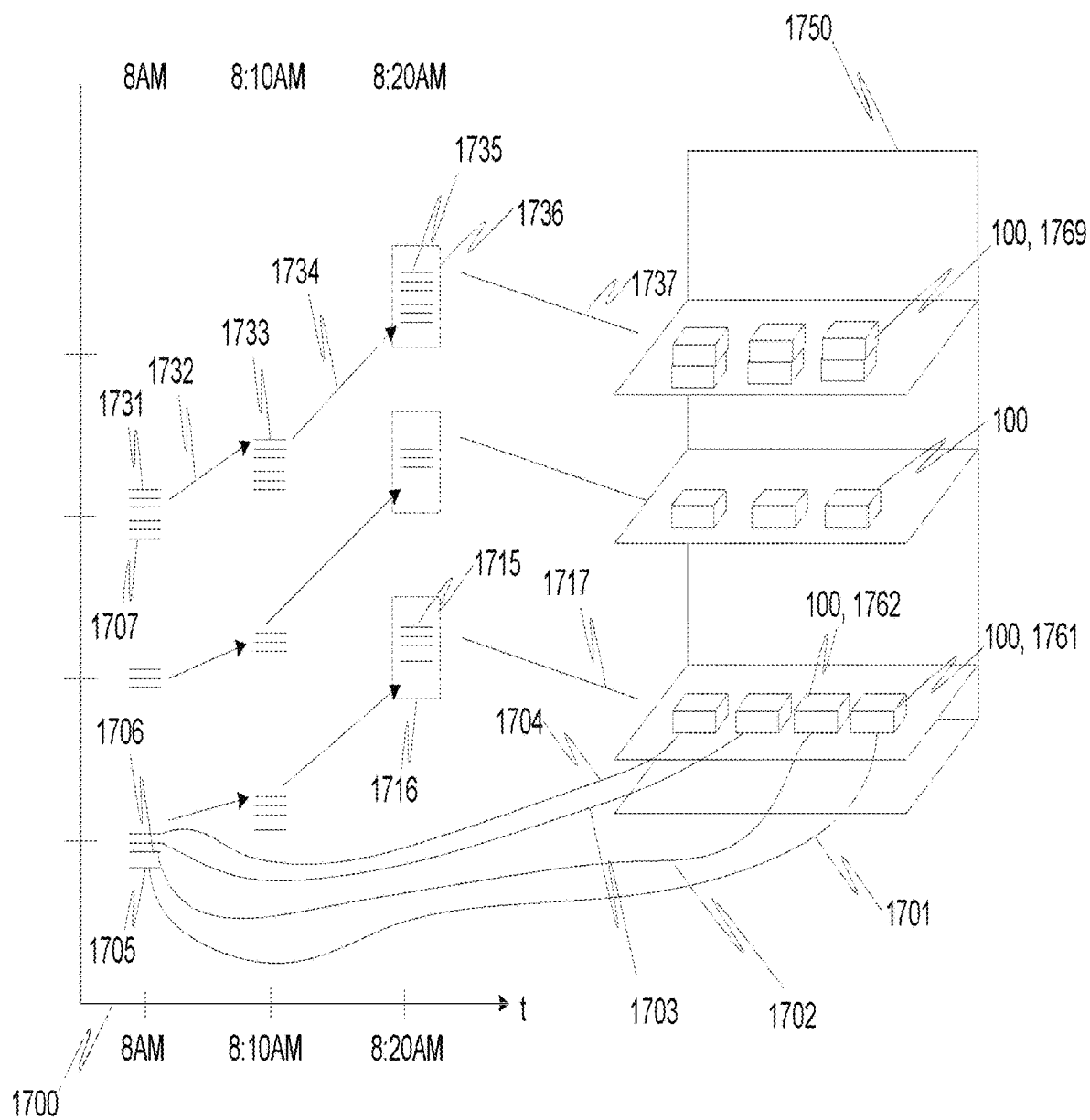
FIG. 17 illustrates methods and apparatus for Collective Relative Vertical Location by Comparing Air Pressure.

FIG. 17 illustrates on the right inside a set of three shelves containing boxes with GRL Devices 100 that also feature very accurate air pressure sensors inside. Air pressure at any one altitude changes throughout the day as temperature and weather variations leads to barometric changes.

The chart 1700 on the left illustrates air pressure corresponding to relative vertical location as the vertical axis while the passage of time is indicated by the horizontal axis with three time elements of 8:00 AM 8:10 AM and 8:20 AM. At a particular time, an individual reading 1705 from one sensor is associated 1701 with a particular product 1761. A nearby reading 1706 from another sensor is associated 1702 with an adjacent product 1762 at the same height occupying the same row of a particular store shelf 1750. Other individual readings which cluster closely together with these correspond 1703, 1704 to additional products on the same row of the store shelf at the same time.

As time passes, readings are taken at regular intervals by a Smart Gateway App conveniently names Collective Air Pressure Readings which take advantage of the sensitive sensors that can detect the adjustment of the collected data in the light of variations in air pressure over time at a given altitude. The clusters of close together readings taken by GRL Device sensors working in a Collective such as products on the same row of a store shelf 1750 will drift 1732 as time passes. The data are analyzed to identify which groups 1731, 1733 correspond to stationary products at the same altitude whose GRL Device sensors detect transient changes in air pressure with time changes 1732, 1734. The clusters 1716, 1736 of data points 1715, 1735 will have the same number of data points as there are associated products on the corresponding 1717 bottom row, 1737 top row of the store shelf 1750. Tracking these associations for GRL Devices 1705, 1706 over time with 1701, 1702, 1703 allows for the identification of the location of GRL Device 100 1761 &1762 as being on the bottom shelf. This enables products over time to learn their shelf height position comparing the data from the Collective of GRL Device Sensors as well as their altitude on varying rows of a store shelf 1750.

The algorithm of an Air Pressure Correlator App is illustrated by the boxed readings of 1734 and 1716 showing the determination of GRL Device as being either on the top or bottom shelf. This apparatus and method could be applied across many GRL Devices equipped to join Collectives and share air pressure data indoors and outside.

The end result is by enabling GRL Devices to share readings and process results from nearby devices at the same time of the day, vertical dimensions can be ascertained. This apparatus and method will allow for accurate altitude determination by any device that can listen compare accurate air pressure data in a building or campus wide area.

Figure 18:
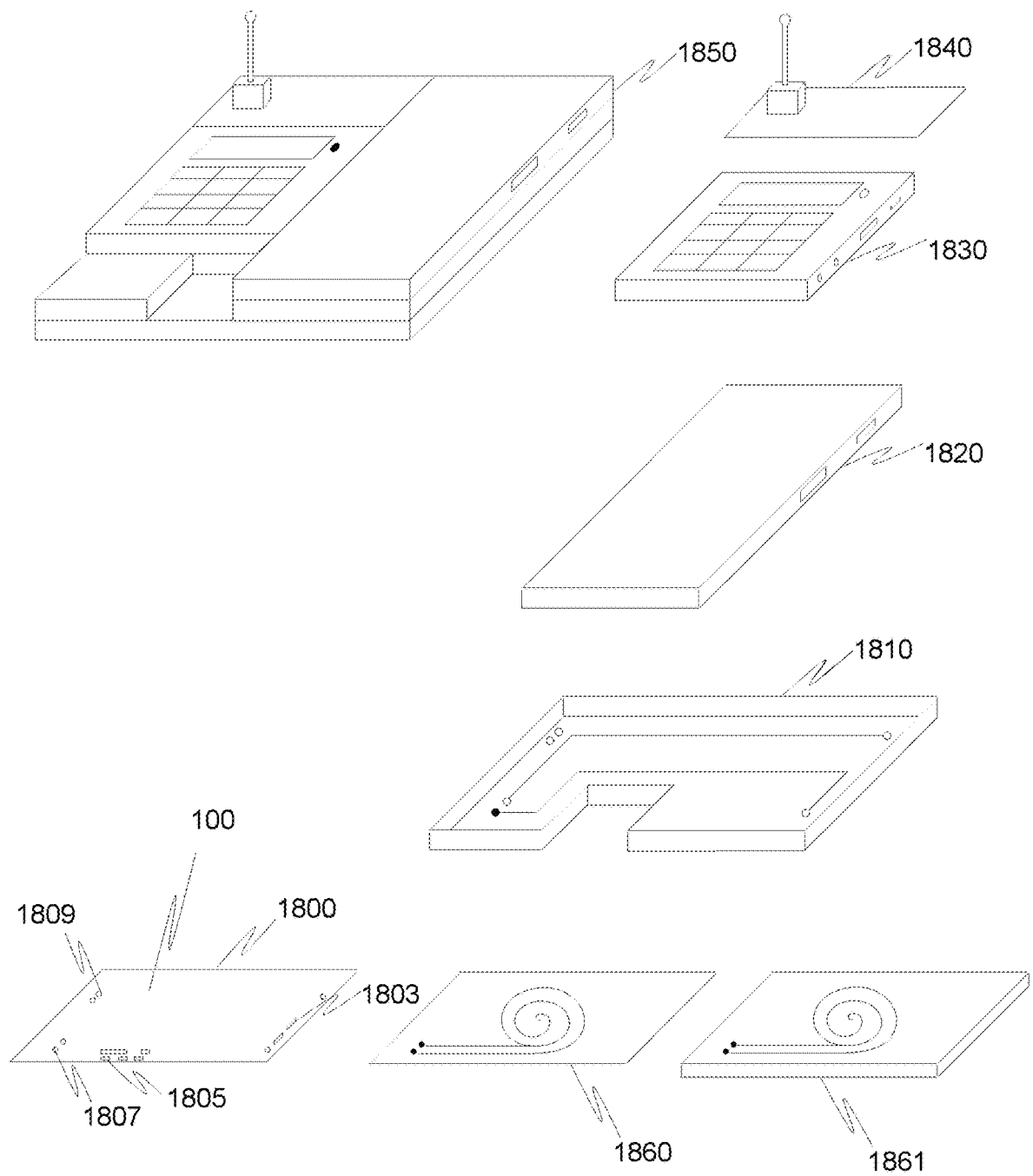
FIG. 18 illustrates methods and apparatus to enable GRL Devices with more capabilities with Multi-Function Overlays and Attachments.

FIG. 18 illustrates GRL Device with multi-function overlays, MFO's. The base GRL Device is illustrated in 1800 in this example the GRL Device has multiple electrical and other physical contact points and fixed locations, one is the signal timer for the Atomic Clock 1809 and three of the data connectors for receiving Authenticated Location Data as well as other Local Profile information 1803. The GRL Device has sensor ports at 1805. Connectors for additional power are at 1807. Internal connectors for Power Pads 1807 in the example of adding a multi-function overlay 1860 which is an induction coil pound enables a GRL Device to be charged or powered through a magnetic field and combined into 1861.

A set of multi-function add-ons are illustrated as 1810, 1820, 1830, and 1840. The units are shown in a vertical alignment so under placed on top of each other is illustrated and 1850.

A power pad re-aligner is shown in 1810 to allow a Computer 1820 to be placed on top and then have a Key Pad and Display being placed to the left with a Long Range Antenna 1840 being placed over the Power Pads 1807.

In this way a GRL Device 100 can be enhanced to support a wide variety of useful applications that require additional interfaces, additional power, and additional communication with amplifiers and antennas or UI options for Authenticated Location information.

Figure 19:
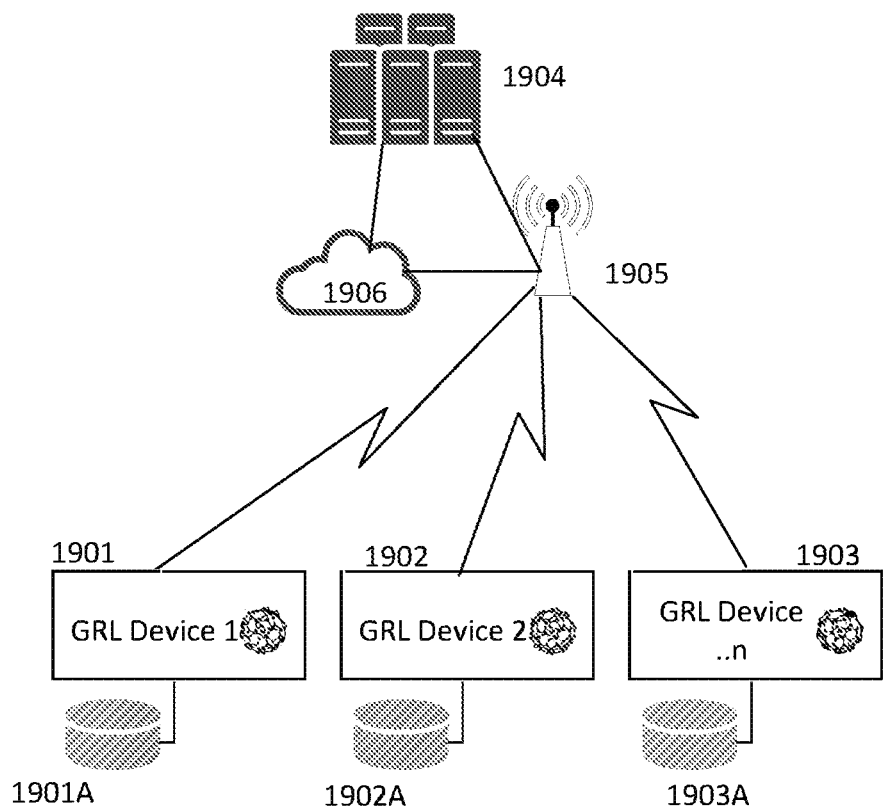
FIG. 19 illustrates methods and apparatus for Use of Atomic Clock Synchronized Atomic Clocks for Short Range Communication Enhancements.

FIG. 19 illustrates a method by which wireless GRL Devices 1901-1903 communicate with atomic clock based timing for efficient utilization of available bandwidth and to minimize collisions between a large number of transmitters and receivers.

Without organized timing, polling of large numbers of devices will result in chaotic transmissions and receiving of data. According to some aspects of the present disclosure, highly accurate timing devices, such as a miniature atomic clock, allow for very precise timing of transmissions of data and receipt of data from the GRL Devices 1901-1903.

A server 1904 may generate communication that are stored as GRL Profiles 1901A-1903A in logical communication with, or as part of the GRL Devices 1901-1903. The GRL Profiles 1901A-1903A may be transmitted to the GRL Devices 1901-1903 via wireless communicators 1905. The GRL Device Local Profiles 1901A-1903A may also be updated and sent to the GRL Devices 1901-1903 via wireless communicators 1905. The wireless communicator 1905 may receive data via a communications network 1906.

Included in the GRL Device Local Profiles is a schedule of when a device should wake up and transmit calculated location data and UUID identification data. In some embodiments, other data, such as senor data and Collective Shared Sensor data may also be transmitted.

In a similar manner, a GRL Profile may include a schedule for the GRL Device to receive transmissions. According to the present disclosure, the atomic clock allows for very precise timing accurate to within billionths of a second. The schedules for transmitting and receiving therefore may accommodate hundreds of thousands of devices in close proximity to transmit and receive while minimizing collision of transmitting and receiving timeframes. The server may track multiple profiles and generate a unique schedule of synchronized transmission and receiving times.

A uniquely coded timing interval that is based on the Local Profile Data Values in the GRL Devices will enable many similar Assets in close proximity such as on a shelf or in a warehouse, people in a crowd, a shipping container or other dense collection of Assets, to transmit data and eliminate data collisions while operating within extreme low power requirements. An example might be sequential power up and transmission in a round robin pattern other patterns are also within the scope of the invention.

Figure 20:
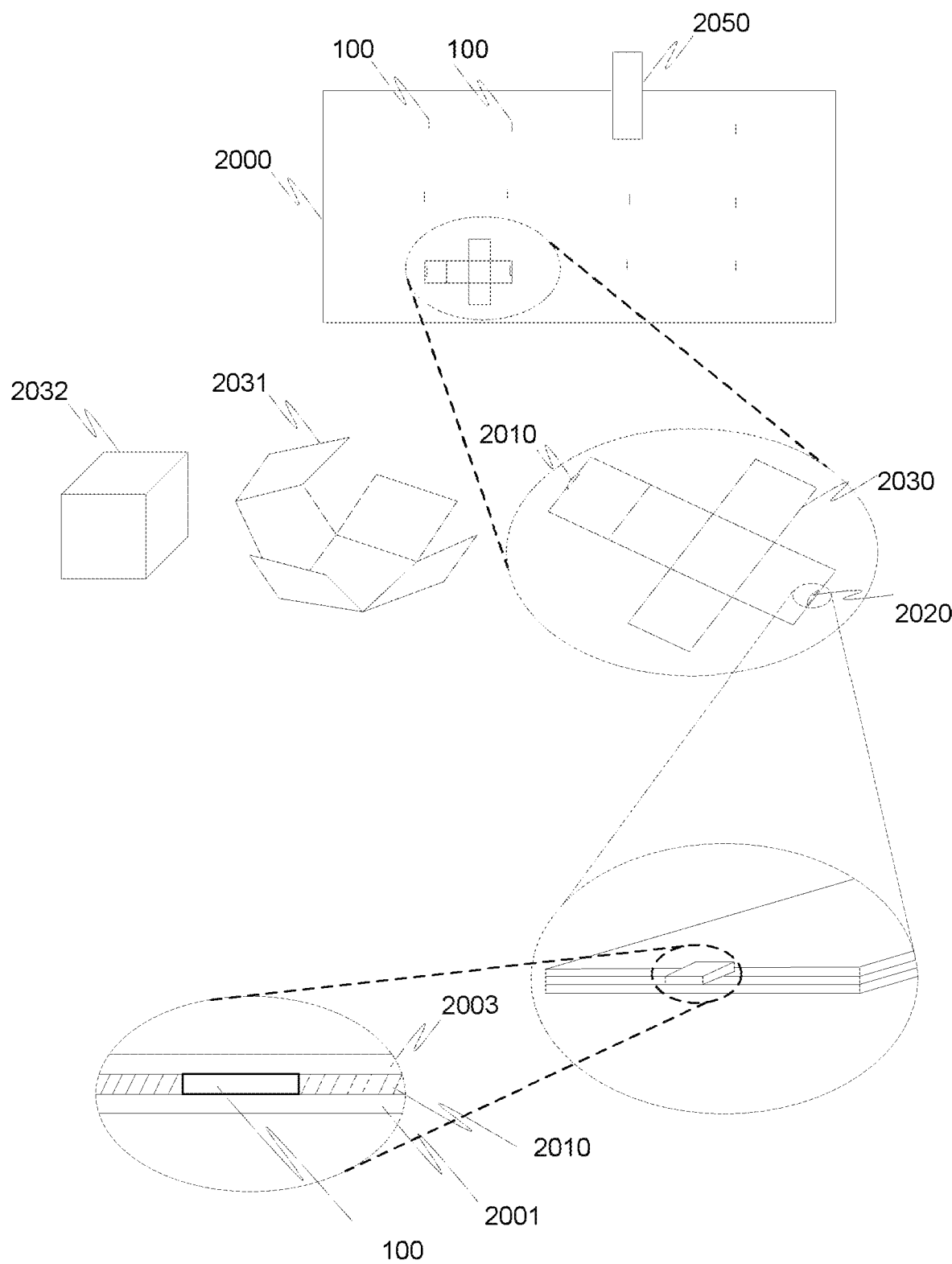
FIG. 20 illustrates methods and apparatus to place GRL Devices within and upon layers of flat materials.

FIG. 20 illustrates a process for positioning GRL Devices 100 within a sheet of material 2000 used in packaging in advance of sectioning out individual box units. A first layer 2001 of the material is constructed. The GRL Device 100 is added amid additional filler 2010 material that forms the core of the multilayer packaging material. Above this, a separate layer 2003 of the material is added. This perspective represents a close up side view of the bulk multilayer material. In a cross-sectional view of the bulk multilayer packaging material such as cardboard, two outer layers 2001, 2003 shield the inner GRL Device 100 and adjacent filler 2010.

The bulk material 2000 contains GRL Devices 100 at regularly interspersed intervals suitable for the dimensions of the foldable box patterns to be cut out of the bulk material 2000 by a die cutter machine 2050 in a manner that includes two GRL Devices 100 per box pattern 2030. After a box pattern 2030 is sectioned out of the bulk multilayer material by a die cutter machine 2050, the resulting opposite edges 2010, 2020 each contain a GRL Device 100. This flat shape 2031 can then be folded into a completed box 2032 in three dimensions. The result is shipping boxes can have GRL Devices embedded in the material providing value to product manufacturers and their supply chain.

Figure 21:
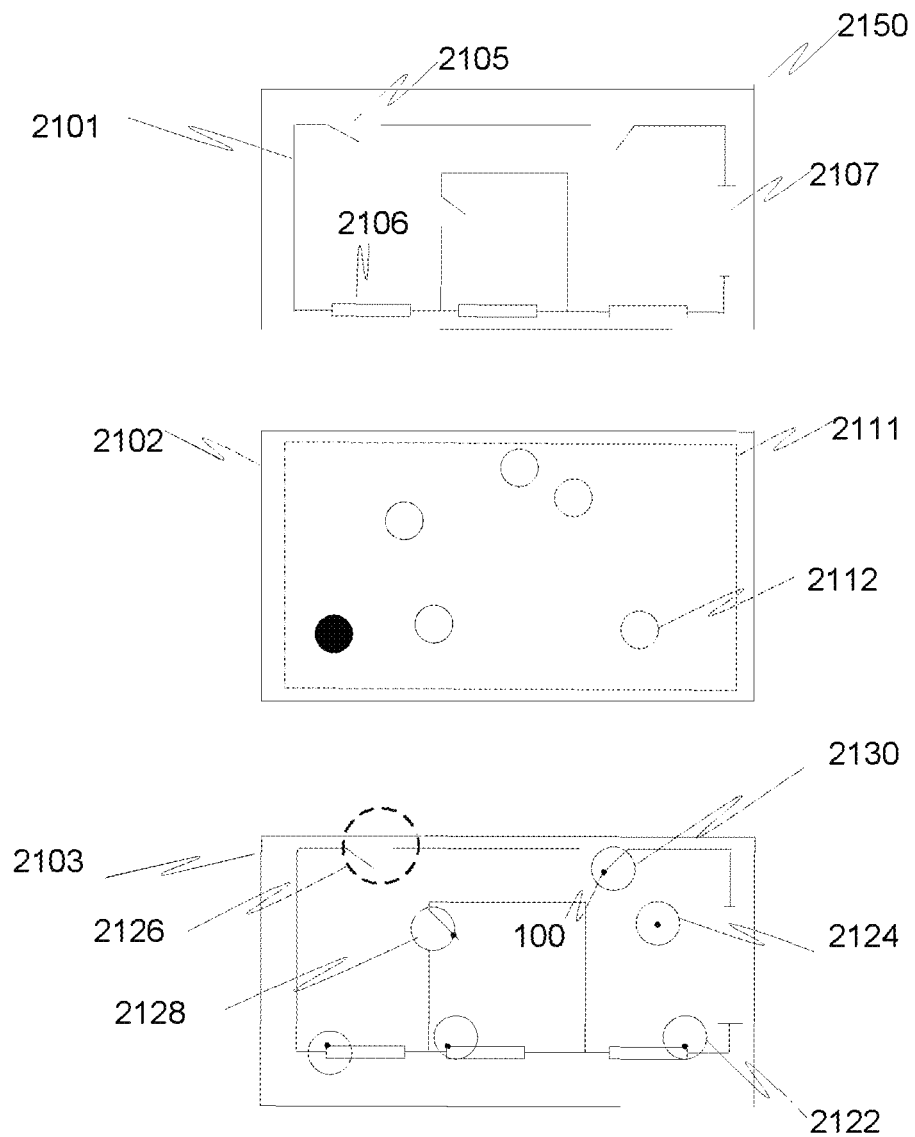
FIG. 21 illustrates methods and apparatus to illustrate the deployment of GRL Devices in a structure.

By way of example the FIG. 21 in the invention now illustrates a method for verifying the correct spatial placement of GRL Devices 100 at various locations and easily determining if there are obviously missing GRL Devices highlighted by the dashed ring 2126 by viewing on a floorplan and surrounding outdoor areas. The data contained within a floorplan 2101 on a Survey 2150 includes the positions of doors 2105, windows 2106, and a garage door 2107. This same region 2102 also contains the reported locations of several GRL Devices 100 within a confidence range (a Zone of Uncertainty) of possible positions 2112 based on the precision of Location Data. These exist within a defined area 2111 corresponding to a building's floorplan 2101.

When the data from the floorplan 2101 and the reported locations 2112 of several GRL Devices 100 are combined as two layers in any one of many geospatial applications, a new perspective 2103 results. This enables the easy and rapid correct identification of GRL Devices placed on a specific doors for example 2122, 2128, and 2130. In another instance, a GRL Device placed on an opened garage door is correctly located at 2124. In another instance, a GRL Device placed on a window is correctly located at 2122. This combined perspective 2103 also enables the easy identification of a missing GRL Device at the location of a door 2126.

Figure 22:
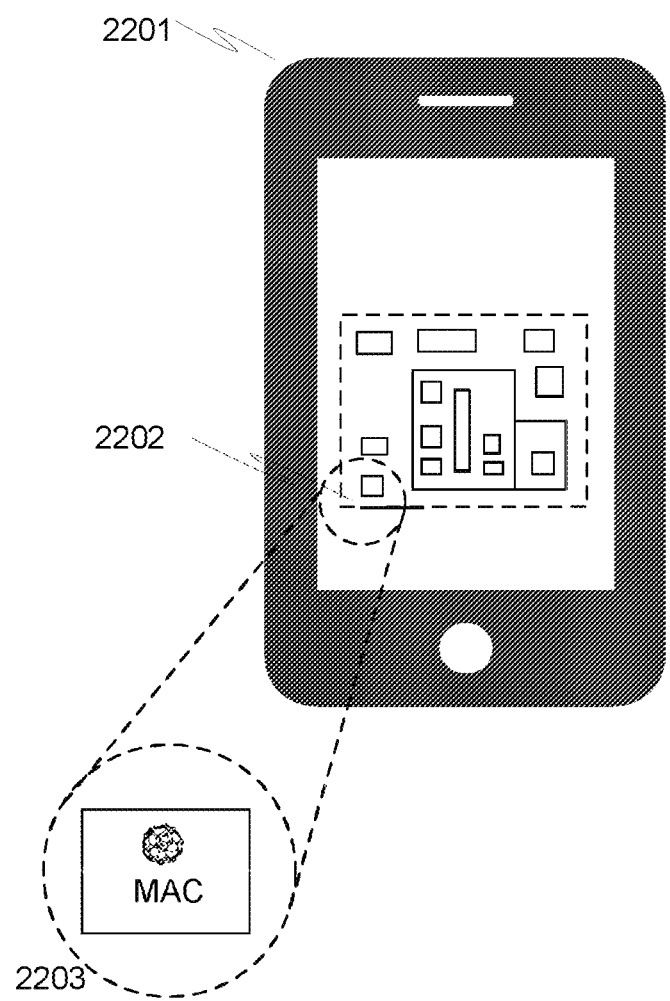
FIG. 22 illustrates methods and apparatus to add a MAC to a Smartphone to create GRL Device.

Referring now to FIG. 22, in some implementations a Smart Gateway App may be based upon a Smartphone device 2201. A Smartphone device 2201 will typically include apparatus and logic to communicate via a cellular network. Communication may be based upon an accepted industry protocol. The Smartphone device may be incorporated into a handheld device (as illustrated) or incorporated into a smaller package footprint, such as, for example, wrist borne device, a ring or other footprint. In some embodiments a footprint for a Smartphone may be incorporated into a larger apparatus, such a motor vehicle or a piece of industrial equipment.

According to the teachings of the present disclosure, a timing device 2202 may be incorporated into and/or attached to a Smartphone device and be based upon a miniature atomic clock 2203, such as a clock disclosed by Professor Briggs in U.S. Pat. No. 8,217,724. The Smartphone may then generate authenticated location data for the Smartphone device 2201. The Smartphone device 2201 may also act as a Smart Gateway for associated GRL Devices (not illustrated in FIG. 22) proximate to the Smartphone device 2201.

Figure 23:
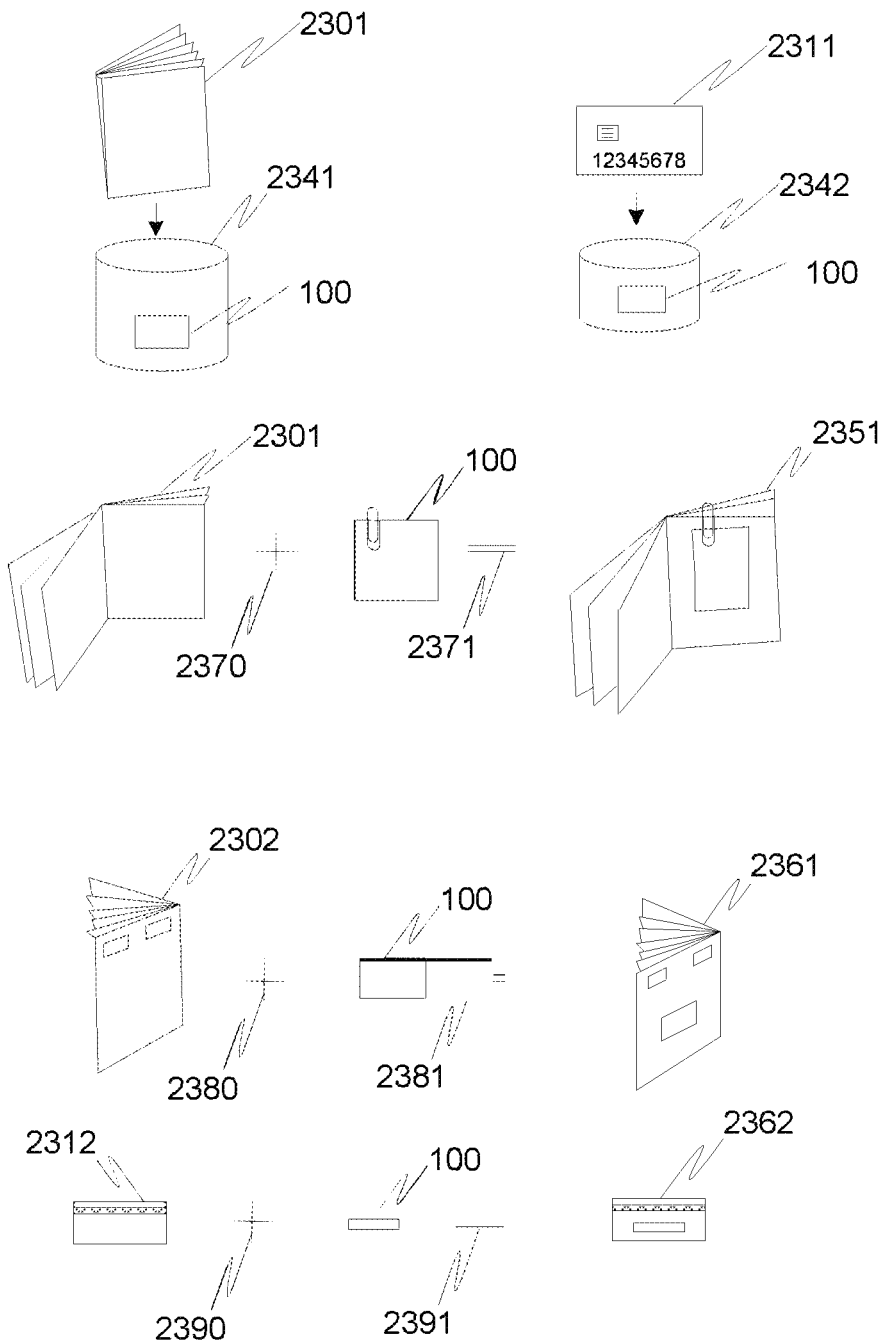
FIG. 23 illustrates methods and apparatus to Affix and Register a GRL Device to Personal Identification Asset.

FIG. 23 illustrates several apparatus designs to link a GRL Device to personal identification assets. In one instance, a government-issued ID such as a passport 2301 is physically combined with a sleeve or protective cover 2341 that features an embedded GRL Device 100 so as to link the passport to the capabilities of the GRL Device 100 and its associated UUID. In another instance, a personal identification card or debit/credit card 2311 is physically combined with a sleeve or protective cover 2342 that features an embedded GRL Device 100 so as to link the card to the capabilities of the GRL Device and its associated UUID. In another instance, a government-issued ID such as a passport 2301 is attached 2370 to a GRL Device 100 to produce 2371 a combined form of identification 2351 that includes the capabilities of the GRL Device and its associated UUID within the passport by means of a paperclip or other means of physical linkage. This allows pairing of the device UUID with identity documents for physical convenience while creating the ability to have the authenticated location data indoors and outdoors be tracked by the issuing government.

In another instance, a GRL Device 100 is physically affixed 2380 by an adhesive or other means to a government-issued ID such as a passport 2302 to produce 2381 a combined form of identification 2361 that includes the capabilities of the GRL Device and its associated UUID. In another instance, a GRL Device 100 is physically affixed 2390 by an adhesive or other means to a personal identification card or debit/credit card 2312 to produce 2391 a combined form of identification 2362 that includes the capabilities of the GRL Device and its associated UUID in a manner that is linked to the card. In each of the above cases in FIG. 23 a government official may require the GRL Device 100 to form a Collective with a Smart Gateway App conveniently called Track Me for whereby visitors to foreign countries may be required to frequently report their position as determined by the Authenticated Location Data and Authenticated Hashed UUID of the GRL Device 100 using the Visitors Smartphone data service.

Figure 24:
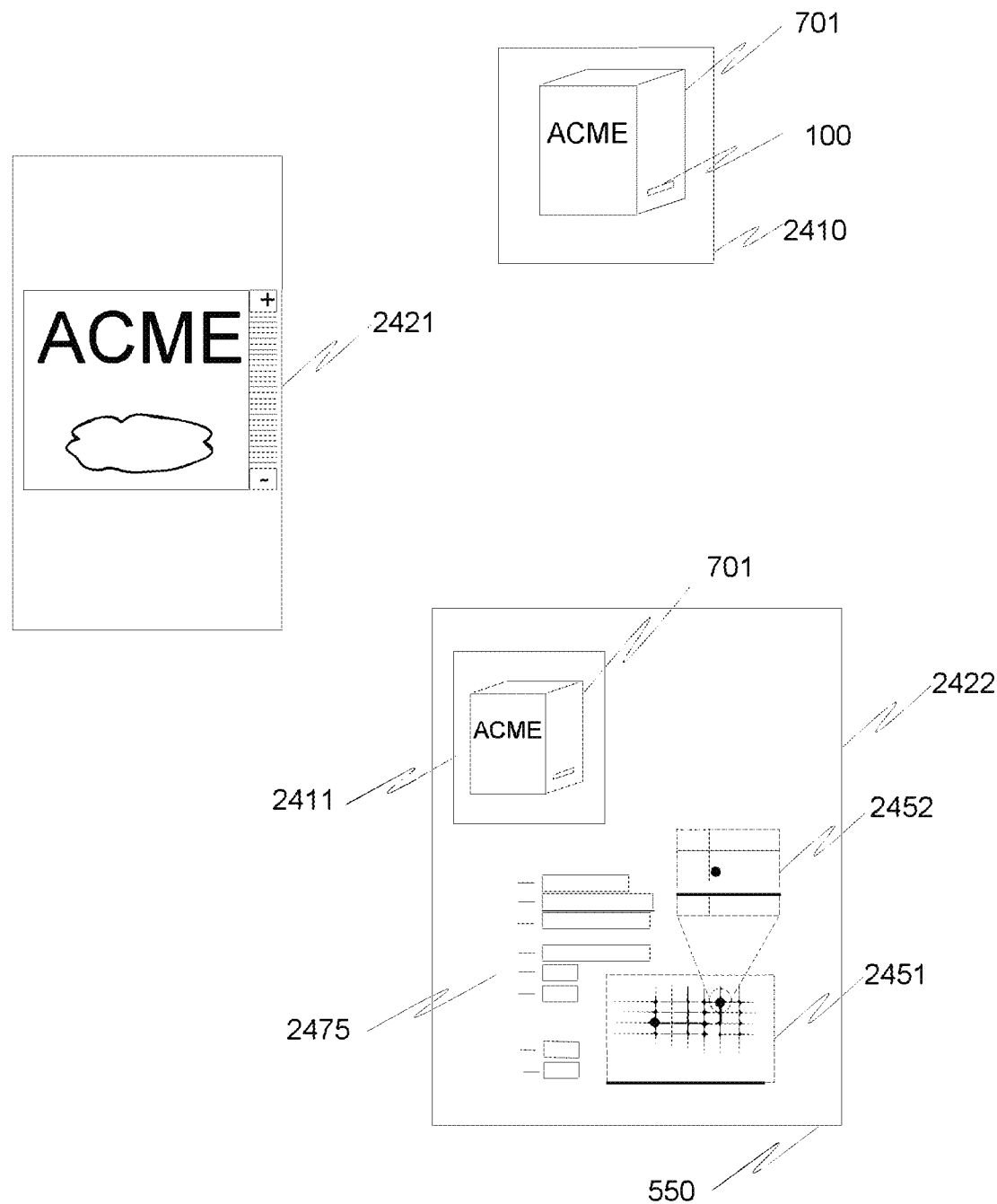
FIG. 24 illustrates methods and apparatus to enable a Smart Gateway device with a UI to visually inspect and authenticate the data within a GRLEA.

FIG. 24 illustrates the ability to do a visual query of a GRLEA. In this example any Smartphone 550 running a Smart Gateway App conveniently named Where Have You Been at 2421 displays the GRLEA Acme Product 701 the user is seeking to locate. A reference image 2410 with a wide field of view displays the desired product 701 which has its own GRL Device 100. The Smartphone 550 knows its own location, where its camera is pointed and even the whereabouts of the identified GRLEA Acme Product 2411. Using range and bearing information, the Smartphone 550 uses its Smart Gateway App Where Have You Been 2421 to provide directions to the GRLEA Acme Product 701. The view of the application shown on the lower right 2422 integrates the information about the GRLEA Acme Product itself in the upper left area 2411 as well as the Published Local Profile Data fields in the lower left 2475. This view of the application shown on the lower right also includes information about the Data Values of the particular product as well as its movement across streets on the lower right 2451, and buildings 2452 identifying the past locations through the present location of the particular product.

Figure 25:
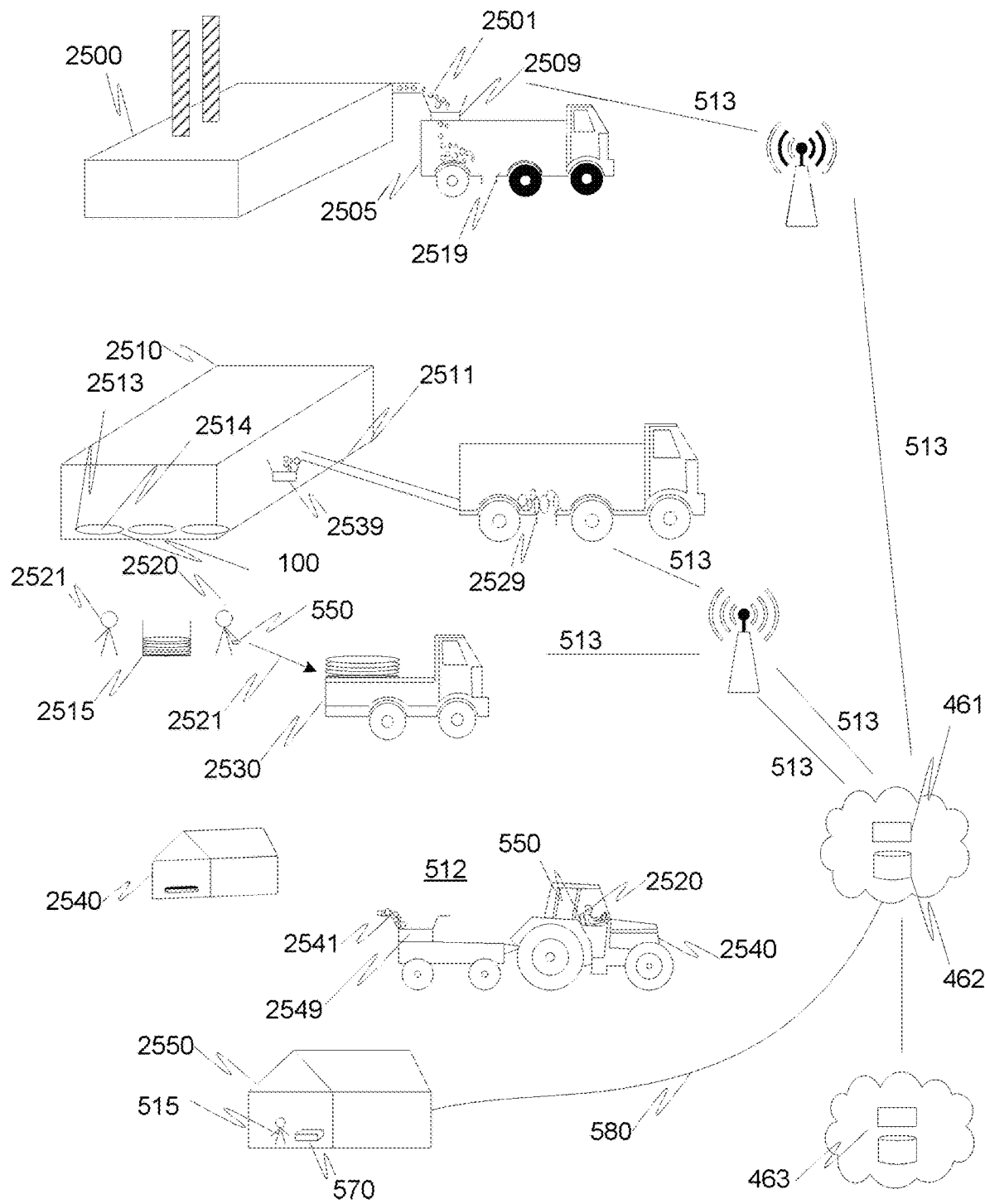
FIG. 25 illustrates methods and apparatus to track the manufacturing, delivery and distribution of pourable materials.

By way of example the FIG. 25 illustrates a set of novel apparatuses that enable the precise tracking and delivery of Pourable Materials to known locations. In this example a Manufacturing Plant 2500 is creating Pourable Materials such as, in this case, Fertilizer 2501 that is being deposited into a Tractor Trailer 2505. As it enters the Tractor Trailer 2505 from the Manufacturer's Funnel Measuring Device 2509, an included a GRL Device 100 broadcasts 513 the quantity of Materials 2501 delivered to the Trailer 2505 to inform 513 a Data Aggregator 461 and Data Processor 462. The Pourable Materials are transported to a Packaging Warehouse 2510 where the Trailer's Funnel Measuring Device 2519 at the tractor trailer's bottom dump 2529 broadcasts 513 the quantity of material delivered 2511 to the Packing Warehouse 2510 to a Data Aggregator 461 and Data Processor 462. The Packing Warehouse Funnel 2539 also measures and broadcasts 513 the quantity of material delivered 2511 to the Packing Warehouse 2510 to a Data Aggregator 461 and Data Processor 462. The Data Aggregator 461 and the Data Processor 462 can then confirm and correlate the three LPM (Liquid or Pourable Materials) transfer points. The Packing Warehouse 2510 then puts GRL Devices 2514 onto each Sealed Bag 2513 which contains a GRL Device 100 on its seam. The Warehouse Manager 2521 transfers a Pallet 2515 of Sealed Bags to the Farmer 2520 who both loads 2521 onto his Truck 2530 and broadcasts 513 via the Farmer's Smartphone 550 the quantity of material delivered 2511 to the Packing Warehouse 2510 to a Data Aggregator 461 and Data Processor 462. The Sealed Bags 2515 are stored in the Barn 2540. A Sealed Bag is dispensed 2541 onto the Spreader Funnel Measuring Device 2549 which includes a GRL Device 100. Both the Sealed Bag 2541 and the Spreader Funnel Measuring Device 2549 broadcast via Bluetooth 512 the Events to the Farmer's 2520 Smartphone 550 that is equipped with a GRL Device Smart Gateway App. As the Farm Tractor 2540 drives through the fields, the Spreader Funnel Measuring Device 2549 stores and transmits the precise location of distribution of the discrete quantities of Pourable Material. When the Farmer enters a building 2550 and the Farmer's 2520 Smartphone 550 is in range of a DCN (illustrated as Wi-Fi dot dash line 515 protocol to a Cable Modem Wi-Fi Box 570 connected over a WAN 580), it then broadcasts the precise location of distribution of the discrete quantities of Pourable Material to the Data Aggregator 461 and Data Processor 462.

This example illustrates the ability to have unified and verifiable information as to the creation, movement, processing, delivery and usage of a wide variety of materials that was previously unavailable where each step includes precise and verifiable location data as to the transfer event. This apparatus illustrating bottom dumps and Funnels 2509, 2519, 2529, 2539 and 2549 can be replaced with any form of a measurement device designed to handle physical materials of various forms that can be poured.

Figure 26:
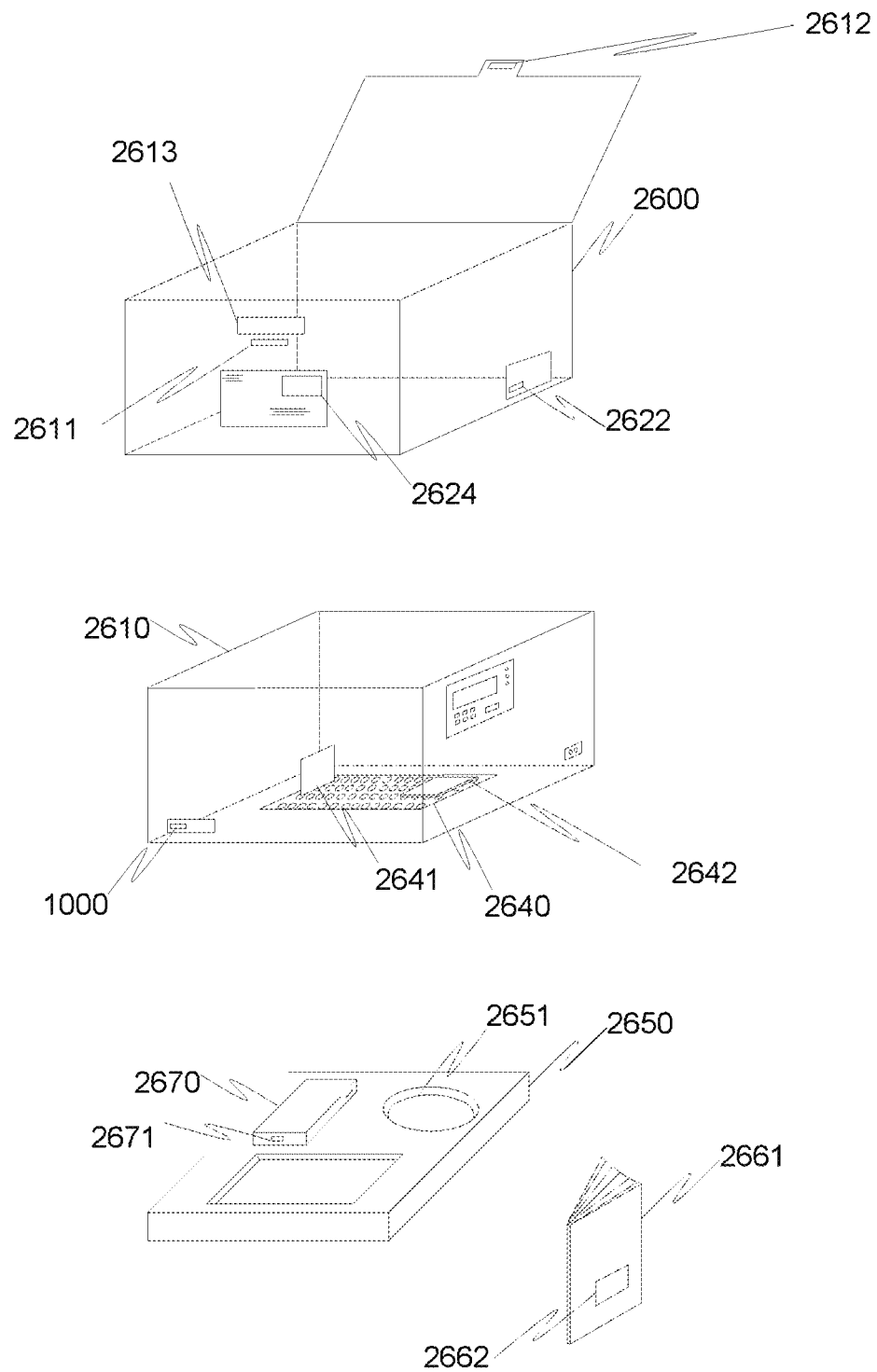
FIG. 26 illustrates methods and apparatus of Collective Apparatus as installed within an Enabled Asset.

By way of example FIG. 26 illustrates a set of novel apparatuses that enable the complete, long term tracking of the components of as well as the long term analysis and quality control of a product. FIG. 26 shows a Generic Shipping Box 2600 that contains a Generic Computerized Asset with all the various GRL Devices 2612, 2613, 2622, 2624 that could be Affixed and then configured into a Collective. This FIG. will illustrate several new and novel capabilities that arise from ability of each Unit of the Collective to communicate and publish its UUID and Location data in any of several modes of encryptions, several modes of authentication, several response modes and several timing modes for example. Various modalities have been described elsewhere in this patent. The following description will illustrate how the Assets illustrated in this FIG. 26 can serve useful functions for a very broad set of potential Products that comprise multiple Assets that are designed or put together to offer useful functionality.

The process illustrated shows the final assembly of subset of components within a common Generic Computerized Asset 610. A User Manual 2661 is printed and a GRL Device as a Customer Support Registration Label 2662 is Affixed. This is placed in the Accessories Box 2650 along with the Generic Remote Control Asset 2670 that is paired with the Generic Computerized Asset 610. The illustration shows the Power Cord Cavity 2651 where the mass produced GRLE Power Cord 1950 had been removed to be plugged into the Generic Computerized Asset 610 for each GRLEA to be Assimilated into a Pair Collective. This enables the Generic Computerized Asset 610 to easily communicate with any GRL Device that is running a Smart Gateway App.

A printed circuit board (PCB) manufacturer produced the Motherboard 2640 and it included a GRL Device 2642 mounted on the Motherboard 2640 that was Assimilated into a Pair Collective when a GRLEA daughter board 2641 was added. This Collective Pairing enabled new and useful automatic configuration of the two computers with the sharing of their previously unshared Local Profiles. The Generic Computerized Asset 610 internal GRLEAs are further Assimilated into a Collective with the addition of the GRLE Label 1000 as well as the 2662 and 2671. These are placed in the Generic Shipping Box 2600 which includes an exterior GRLE Label 2622 which obtains the Serial Number data from the interior GRLEAs (2642, 2641, 1950, 2662 and 2671) when they are actively creating the Collective. Some GRL Devices in the Collective can configure their Local Profiles to provide the appropriate Authenticated Location and UUID/Serial number and other information to government authorities for taxing and import regulations.

The novel apparatus as described herein enables the delivery of authenticated information as to where an Asset (in this example a Consumer Electronics product) was opened. In addition if the User has a Smart Gateway App it could auto register the product. The entire set of GRLEAs in this FIG. 26 comprise a Product Collective. The Generic Shipping Box 2600 includes a Paired Collective of GRLE box tab 2612, 2613 that locates and connects via NFC to its GRLE Intra Layer Device 2611 when they are in proximity which is detected with a magnetic sensor (the flap is closed). Once that occurs, the Local Profiles are updated and when the box is opened the 2612 alerts the 2621 which records and stores the Event in the Log. Upon powering up the Generic Computerized Asset 610, the 2671 could be configured to activate and poll the Collective's GRL Devices and delivers the Shared Sensor data to the DCN according to its Local Profile.

Figure 27:
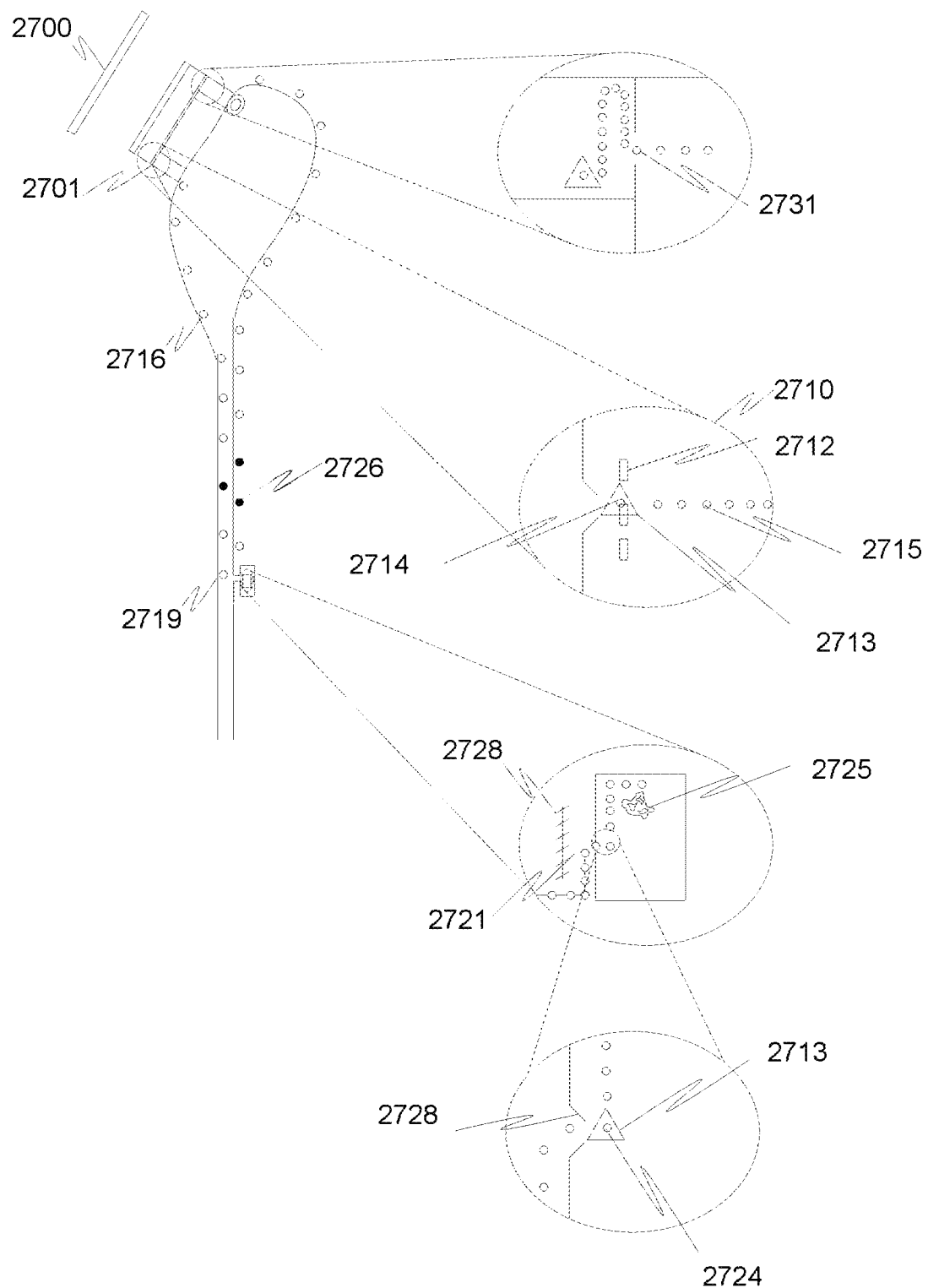
FIG. 27 illustrates methods and apparatus to determine the Who, When, What and Where of a GRLEA on a map and in an Aggregated Database.

FIG. 27 illustrates several novel apparatus that provide useful information to government authorities, militaries, police, employers and other organizations that wish to track the exact movements of individuals with a technology that can be easily carried on a person, last for months, communicate nearly constantly, use such low power that it can rely on Energy Harvesters.

The FIG. 27 illustrates a scene where a Person flies into a country at an Airport 2700 and reaches Immigration Area 2701 as shown in a zoomed view in 2710 as they walk thru the entrance to Immigration Checkpoint 2714, they have a choice of Immigration Officer Booths 2712 at that point they are presented with a Passport Pouch (note item example of sleeve or protective cover 2341) that is Registered 2713 at the Checkpoint 2714. The Person is instructed to maintain the Passport Pouch on or with their personal effects at all times and keep it in range of their Smartphone which may have a Smart Gateway App installed to communicate with the GRL Enabled Passport Pouch. The Person walks toward their destination as illustrated with Popcorn Dots 2715. The spacing between the dots on 2716 and 2726 shows the speed of movement based on a fixed time frame of location polling in the Local Profiles for the Passport Pouch.

The Person leaves Immigration 2716 and moves to their destination 2719 where they Park 2721 in the Lot 2728 and go inside at 2728 where the Reception Area 2724 Polls 2713 the Passport Pouch. The Person stays for a while in a meeting at 2725 as illustrated as a single large lumpy Popcorn Dot 2725 that is based on the variances in measurement of precise location. The Person heads back to the airport 2726 and arrives at Departures 2731 where he presents his Passport Pouch and Passport to the Immigration Officer at Checkpoint 2727 where the historical travel information stored in the Passport Pouch is polled by the Smart Gateway App conveniently named Authorized Pinger App for delivery to DCN and Data Aggregator Database.

This apparatus and various form factors of GRLEA for Identification and Tracking can be used for many useful indoor and outside environments with home, commercial, industrial, military and governmental applications to name a few.

Figure 28:
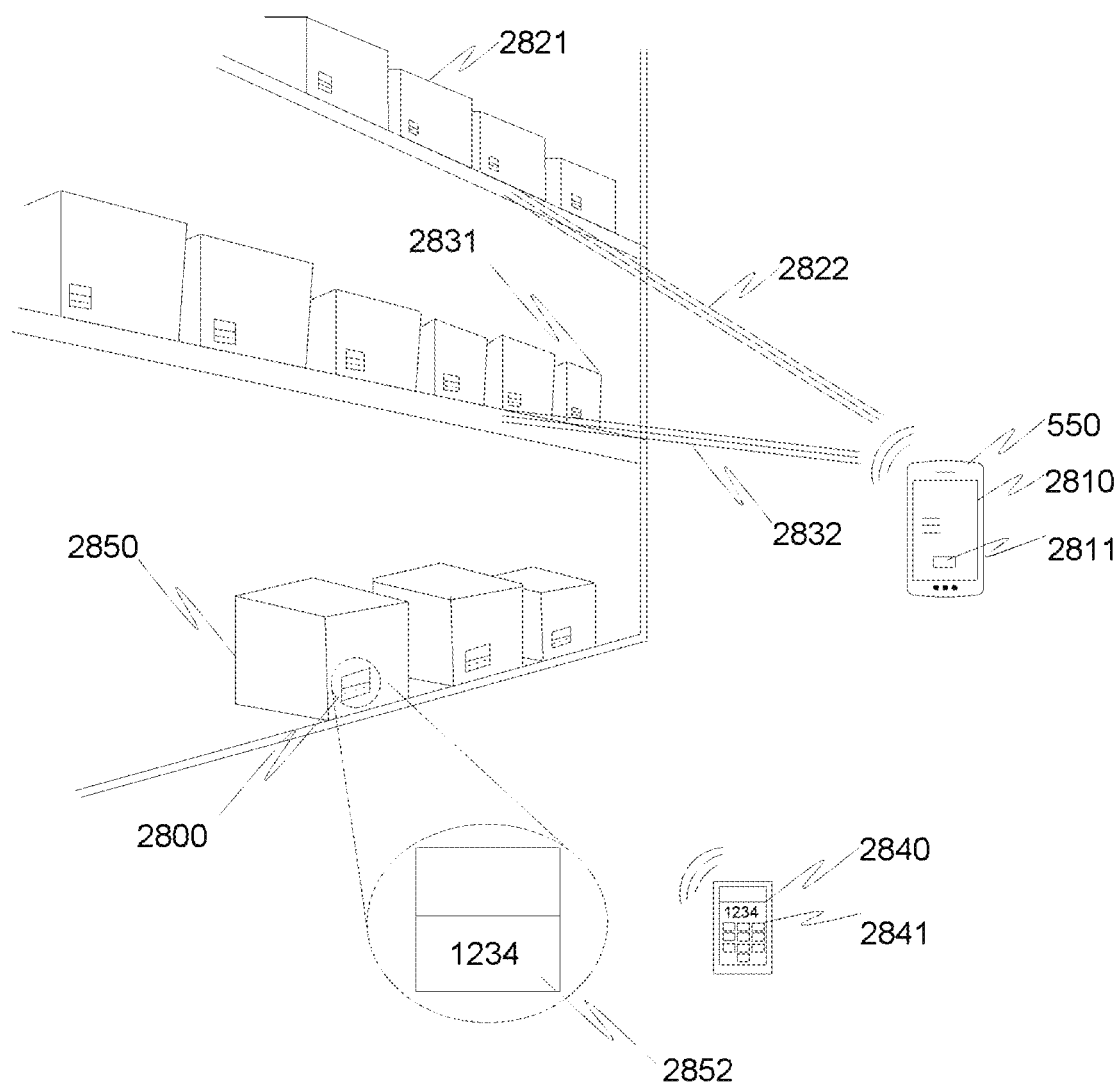
FIG. 28 illustrates methods and apparatus for activating a UI on a GRLEA from a Smart Gateway device.

FIG. 28 illustrates a novel process by which a user carrying a Smartphone 550 with a Smart Gateway App running the conveniently named Show Me Where You Are 2810 can press a button 2811 to request a set of GRLEA Loaves of bread 2821, 2831 that include Multi-Function Overlay use to respond to a particular query. In this case, the Smartphone 550 generates flashing signals going out to the shelf of the top two shelves bread that have a MFOs (for example 1830, 1840 etc.) on top which can flash or display a human readable image. Two respondents 2821, 2831 say "we are going out of date in the next few days" by means of signals 2822, 2832 and thus the buyer can get a discount for example on loaves of bread 2821, 2831. In this way any discount shopper can query GRLEA products for potential special offers.

This same innovative process could help find inventory items 2850 with a wide variety of criteria that may not provide a convenient user interface (a flashing light) but simply provide location data so the end user could see on their screen range and bearing this assumes the 550 is a Smartphone Smart Gateway App conveniently named Make Me Flash 2810.

In the bottom half of the diagram, the bottom shelf is a destination for a shopper whose Smartphone running Smart Gateway App conveniently named Check My Status 2840 with a keypad 2841 indicates a need to find a box 4350NNNN with serial number 1234 indicated. Alternately, as in 2852, the GRL Device with a screen on the product tag 2800 lights up to help a shopper verify that the particular Product Box 2850 is eligible for a special purchase offer.

Figure 29:
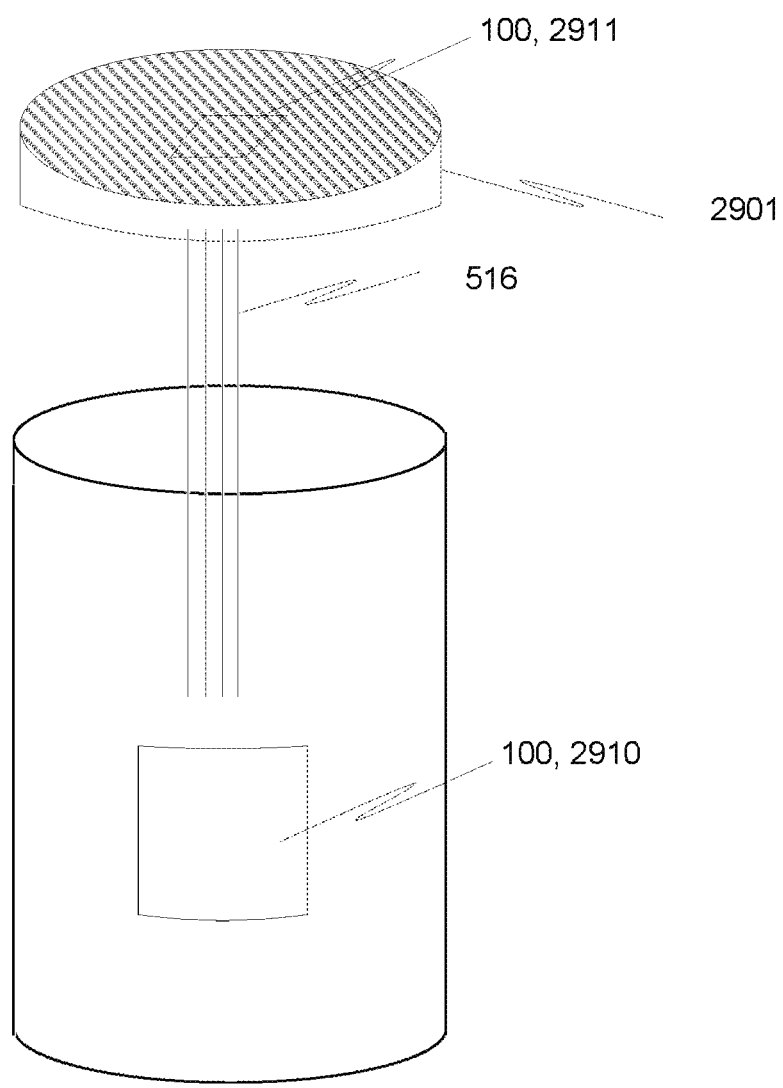
FIG. 29 illustrates methods and apparatus for determining and recording when a GRLEA and its Collective GRLEA have an Event.

FIG. 29 illustrates how a Paired Collective can provide essential information to a Smart Gateway App and it includes an apparatus to monitor a perishable food product. On the inner side of the lid 2901, an air pressure sensor 2911 is present. When the product is first opened, the GRL Device 100 in the lid communicates with a GRL Device in item 2910 when activated by the change in air pressure. This informs the GRL Device in item 2910 that the temperature of the perishable food product must be monitored to prevent spoilage. This GRL Device in item 2910 can be queried by Bluetooth or NFC interaction as line 516 via a Smartphone to report the time since opening, the temperature history, and other factors to report on the freshness and suitability for consumption of the perishable food product inner contents. The GRL Device 100 stores a local profile which includes the parameters for the software to make decisions as to whether to notify a user to take action regarding the proper storage of the product or to report that the product is no longer suitable for consumption.

Glossary

"Affix" as used herein means to fixedly attach a first item to a second item, such as, for example, to a GRL Device may be Affixed to an Asset to be tracked.

"Affixer" as used herein means an apparatus or person that undertakes the actions required to Affix a GRL Device to an Asset.

"Affixing In" as used herein means to fixedly attach a first item within the boundaries of a second item, such as, for example, to a GRL Device may be Affixed In an Asset by incorporating the GRL Device within the package extremities of the Asset to be tracked.

"Affixing Vehicle" as used herein means an intervening item other than components of a GRL Device and an Asset that is utilized to Affix a GRL Device to an Asset. Examples of Affixing Vehicles include, by way of non-limiting example: a Glue, stable, tape, nail, screw, insert, fit (as in a puzzle), sticker, rivet, fasten, chain, hang, tie, magnetic, latch, sew, buckle, shrink wrap, clasp, zip. Examples of Affixing include but are not limited to: incorporating within a package material, glue, epoxy, melt into, screw mount, bolt, rivet, bag, jar, container, box, crate, pallet, cargo container and surround with polymer.

"Affixing On" as used herein means to fixedly attach a first item on an exterior boundary of a second item, such as, for example, a GRL Device may be Affixed On an Asset by incorporating the GRL Device onto a package extremity of the Asset to be tracked. Examples include but are not limited to: glue, staple, sticker, tape over, hammer in, magnetically latch, and mount in between or underneath another Asset.

"ALDOSA" Authenticated Location Data On Serialized Asset(s) This acronym represents a broadly useful capability of the invention whereby Assets that are GRL Enabled can capture and deliver information from GRLEAs that can be relied upon for a variety of needs of people and organizations of all types. The ALDOSA represents a Quality Seal of the Authenticated Data that is created by GRLEAs and may be utilized by a Person, an Organization or a System.

"ALDOSAS" is the Authenticated Location Data On Serialized Asset(s) Sensor(s) This is the above described data with the corresponding processed and Sensor Data captured directly or indirectly from GRLEAs that may be operating as a Collective.

"App" as used here in represents any software program that may run on a GRL Device, on a Smart Gateway (such as a Smartphone, Tablet, Wearable etc.) or a Server such as a (Authentication Server, Data Aggregator Server, Data Processing Server etc.)

"Asset" as used herein refers to an object, article, device, plant, organism (person, or animal) or thing that may be tracked by or Affixed to a GRL Device as described in this disclosure. (See also "Fixed Assets", "Paired Assets", "Pourable Materials")

"Asset Collective" as used herein is a set of grouped Assets that are determined to be in close proximity to each other. A Collective may have a need to interact and share information that enables the proper completion of a logical function.

"Assimilation" as used herein represents the process by which a Master of a Collective may accept new GRL Devices to join the named Collective.

"Assimilated" of "Assimilated Mode" as used herein represents the Mode of a GRLEA when it joins a Collective as a Slave or it operating as the Master.

"Authenticated" as used herein shall mean using cryptographic techniques to prove that the information from a GRL Device is true and genuine or it is truthfully relaying information from another source such as the Asset to which it may be Affixed. In some embodiments Authentication may additionally be based upon a device UUID and a determined location.

"Authenticated Affixing" as used herein means to Affix a GRL Device to an Asset in via an authorized process (Affixed In or Affixed On), In some implementations, Authenticated Affixing may include a UUID associated with quantifiable variables associated with the Affixing process.

"Authenticated Location" as used herein shall mean a location determination based upon a device that can determine its location with a highly accurate clock that can calculate time delay of arrival from a known transmission point, a Reference Point. The location determination may also include other algorithms such as ones that utilized Received Signal Strength, Angle of Arrival etc. It may also include Data Values containing coordinate points from a known Reference Point and other authenticated sources (a data transmission that include cryptographically verifiable location data from an identifiable source such as another GRL Device. The Location Data can be Authenticated by combining the GRL Device's determined location with the cryptographically protected Local Data such as its private key and its UUID and it may include its Spatial Domain where it was Registered and then processing that combined data with a well-known Hashing technique delivering a hashed value that can be Authenticated by a Certificate Authority.

"Biometric Identifiers" as used herein shall mean a biological measurement or observance with a significant degree of differentiation from other biological organisms.

"Broadcast Mode" as used herein represents a GRL Device that may be publishing a message that may include its UUID and Location Data as well as other Data Values in ways that any other GRL Device or apparatus is configured to detect the message.

"Care Custody and Control" as used herein refers to the keeping, guarding, care, watch, inspection, preservation, or security of an Asset, and carries with it the idea of the thing being within the immediate personal care and control of the legal entity to whose custody the Asset is subjected. Typical Assets that are rented where there is change in care custody and control include but are not limited to: —Transportation: Cars, Trucks, Buses, Bicycles, Boats (yachts, kayaks, canoes, sailboats, etc.), Planes, Hot air balloons, Blimps, Trailers etc.; —Construction Equipment: Chainsaws, Jackhammers, Mixers, Dump Trucks, Front End Loaders, Cherry Pickers, Cranes, etc.; —Specialty Equipment: Laboratory Equipment, Farming Equipment, Manufacturing Equipment etc.

"Collective" as used herein represents a set of one or more GRL Devices that have been configured in their Local Profile to be able to Assimilate with one or more other GRL Devices. A collective may be one or more GRL Devices Affixed to one or more Assets. Assets that may not have a GRL Device Affixed to it could be considered part of a Collective if the Master is aware of the presence of that Asset. (See also "Asset Collective", "Assimilation", Assimilated, "GRL Device Collective", "GRLEA Collective", "Paired Collective", "Product Collective", and "Virtual Collective")

"Database" as used herein means one or more an organized collection of data. It may include a collection of schemas, tables, queries, reports and views as well as other data objects.

"Data Aggregator" as used herein means an application or application that aggregates related, frequently updated content from various Internet sources and consolidates it for storage indexing and retrieval. A Data Aggregator may also include a web application that draws together syndicated content from various online sources and it may also include, an organization involved in compiling information from detailed databases on individuals and selling that information to others. It may also include data from a set of GRL Devices and their Sensor Data.

"Data Aggregator Database" as used herein means the Data stored by Data Aggregators and may reside on a multiplicity of servers in various locations.

"Data Values" as used herein can include information accessed by the GRL system or generated by components of the GRL system, including the GRL Device. (Data Values can be any data element such as common known as a Field or it can be Record which is typically a set of Fields from one or more Tables in a Database. In many cases the Data Values can comprise a heterogeneous group of data structures such as a Log file, a Database, data stored in ROM, etc. (In some related documents, including the priority document, a Data Value may sometimes be referred to as a Parameter)

"Derived Data" as used herein means GRL Device Data linked to other sources like mapping DB s to create unified information regarding Spatial Domains "Digital Communications Network (DCN)": as used herein includes a medium for communicating digital data exemplary DCN's include, but are not limited to: the public Internet, a cellular network, a virtual private network; and wireless communication transceivers such as, for example, one or more of: infrared, radio, visual, auditory or other transceiver using technology that can connect to the Internet.

"Event" as used herein shall mean a change of one or more conditions materially affecting a state of an Asset. It may involve a change in the Data Values of a Local Profile (See also "Transaction Event"

"Energy Harvesters" as used herein shall mean a device that converts energy ambient and or external to the device into electrical energy that may be directed to a particular use. Functionalities that may be used to convert ambient energy into electrical energy may include, by way of non-limiting example: Kinetic energy, wind energy, salinity gradients, electromagnetic induction, Piezoelectric, Thermoelectric, Pyroelectric, Acoustic, Photovoltaic, Radio Frequency, Photonic harvesting, Thermal harvesting, Vibrational harvesting or other movement harvesting "Field" as used herein in the context of Data represents List of Fields/Attributes for a table, Part number, UPC code, SKU #, Location coordinates, frame of reference, 2D, 3D, Values of Sensors Security Levels, required length and type of passwords, size of secret key, valid characters in a key, key pair size, "Fixed Assets" as used herein shall mean an Asset attached to a non-moving anchor point.

"Geofence" as used herein means a defined boundary associated with a Spatial Domain. A Geofence may be described in terms of a polygon of 2D (planar) or 3D (volumetric) coordinates defining a physical space. As with a Spatial Domain, a physical space associated with a Geofence may be fixed or transitory.

"Geofenced" as used herein refers to a state of a GRL Device or GRL System when it is configured to have an Event triggered when a specified GRL Device breaches a perimeter of a Geofence.

A "Geofence" is a virtual perimeter for a real-world geographic area. A Geofence could be created by calculations such as a radius around a point location or from measuring moving of an Asset and recording coordinate points, or a Geofence can be a predefined set of boundaries from a third party source such as a SHP layer, like property lines, school campus or neighborhood boundaries to name a few.

"GRL" as used herein means an abbreviation for Global Resource Locator

"Global Resource Location" is a service offering representing the calculation of location for an Asset that has a GRL Device attached to it.

"GRL Antenna" as used herein means an electrically conductive medium capable of acting as a transducer to at least one or: a) convert radio-frequency (RF) fields into alternating current; and b) convert alternating current into radio frequency. In receiving mode, the antenna intercepts RF energy and delivers electrical current to an electronic component in the GRL Device. In transmission mode, the antenna generates an RF field based upon electrical current it receives from components of the GRL Device.

"GRL Device", as used herein refers to a device utilizing highly accurate miniature internal time generation and Global Resource Locator System components to precisely Self-Locate and deliver Authenticated Location Data. (in some related documents, including the priority document, a GRL Device may sometimes be referred to as a Resocator).

"GRL Device Collective" or "Collective" as used herein represents is a set of GRL Devices that are in logical communication with each other to provide with each other at least a GRL Device identifier such as a UUID along with one or more of: Location Data, Quality Seal, Sensor data, and Local Profile data.

"GRL Enabled" or "GRLE" as used herein represents means any asset that has a GRL Device Affixed to it. Generally GRL Enabled can be used to described Assets that may be worthy or desirous of tracking, sensing etc. in an area (such as GRL Enabling all Cases and Pallets and Cartons in a storeroom) or in a class of goods (such as a container which may include many types of assets being transported through a supply chain being GRLE Pallets)

"GRLE" as used herein represents a prefix term to specifically describe any Asset that has been enabled to function with a GRL Device. GRL Enabled Asset, examples include GRLE drone, a GRLE pallet, a GRLE Smartphone, GRLE dog collar, GRLE Suitcase, GRLE Weapon and GRLE Passport.

"GRLEA Broadcasters" as used herein is a GRLEA unit transmitting data.

"GRL Enabled Asset" or "GRLEA" as used herein refers to apparatus and functionality of a GRL Device and or GRL Service that has been affixed to an Asset.

"GRL Smart Gateway" as used herein shall mean circuitry or other technology that enables a GRL Device to provide logical communication with a DCN.

"GRL Device Smart Gateway App" as used herein shall mean executable code that when executed provides logical communications between a DCN and a GRL Device. Logical Communication includes transmission and receipt of digital or analog data.

"GRL Sensor" as used herein represents the data that may come from a device built into a GRL Device that measures some environmental value, or it may include Sensor data from which a GRL Device is affixed or it may include Sensor data that comes from a Collective. It may also include mechanisms that deliver data captured or derived from the Assets to which a GRL Device is Affixed.

"GRL Service" as used herein refers to functionality performed by a GRL System. A location positioning system, wherein a location may be determined at least in part by utilizing a GRL Device that can accurately Self-Locate. The positioning system includes among other things a database of radio transmission towers that have known locations (GPS coordinates) as well as radio frequency and unique identifier information called Reference Points. In addition a GRL Service may utilize application programs and databases to provide information regarding one or more GRL Device locations and various Domains and Domain Status environments. Operationally a GRL Service may include one or more sets of information associated with a GRL Device via one or more of: captured data, calculated data, received data or transmitted data to or from a GRL Device that is stored within the GRL Device itself.

"GRL System" as used herein refers to apparatus and functionality used to implement the Global Resource Locator Service.

"Hashed Value" or "Hash" as used herein is a map of a determined value. In various implementations, the determined value may be a fixed value or an arbitrary value.

"IoT Internet of Things" as used herein means the network of physical Assets that contain embedded technology to sense and communicate one or both of their internal states and the external environment.

"Limited Share Broadcast Mode" as used herein means a GRL Device will use its Quality Seal Data Values and the Quality Seal Data Values of a Requester.

"Listening Mode" as used herein is the common use of most receivers with the difference in that a GRL Device may at the same time be in a Quiet Mode whereby it does not respond to normal signaling protocols.

"Local Profile" as used herein means a set of Data Values that can be applied to a single GRL Device and or a group of homogeneous GRL Devices. One or more of the Data Values can be added to the SSD, changed in the SSD or deleted from the SSD 153 or Storage 108 included in a GRL Device.

"Location" as used herein represents any place on above or under the earth surface represented by a set of 2D or #D Coordinates that have been defined by a company or organization such as GPS, State Plane or any of dozens of published methods of referencing a physical point. A Location may include an approximation of a location with a level of precision that may be measured in relative to another Asset (such as: lower shelf, behind etc.) or may also include fixed values (such as one meter). The location may include its own reference position within a Spatial Domain such as a "top left corner of a store room"

"Location Aware" means any GRL Device that can Self Locate.

"Log" as used herein represents records of events that occur in an operating system or by an App that may be running or as active by another device in communication with a GRL Device. This Log is typically stored in a Log file or set of Local Profile Data Value with the information captured, calculated, processed, received and stored on a GRL Device or a Computer that may aggregate data 461 from one or more GRL Devices and any asset that may physically move or communicate with GRL Devices "Long Range Antenna" as used herein means antennas that are capable of transmitting data kilometers at lower frequencies typically found in the range of a few kilohertz to a few hundred megahertz. The common consumer radio FM bands of 88 to 107 use Long Range Antennas where antenna length is in the one meter range. The common HAM Radio operators work in lower frequency bands of 4 MHz and 7 MHz with antennas that can measure several to dozens of meters in length.

"Miniature Atomic Clock" or "MAC" as used herein refers to an atomic clock comprising miniaturized components, such as, for example those described in the U.S. Pat. No. 8,217,724, the contents of which are relied upon incorporated herein by reference. Miniature Atomic Clocks may be based, for example, upon Fullerene technology, including Buckyballs or other technology that utilizes electronic transition frequency as a frequency standard. The electronic transition frequency may include, for example microwave, ultraviolet, infrared or visual light spectrum wavelengths.

"Modes" as used herein represent a set of computer system states or conditions that an App or Apps may be in on a GRL Device or on a Smart Gateway or Smart Gateway App. Multiple Modes may be found in one or more Apps as listed in this patent and the list of Modes as described in this patent is meant to illustrate a few potential functionalities and is not intended to be exhaustive. Each Mode may have different configurations and behaviors based on Local Profile of a GRL Device or based on participation in a Collective. In many cases a Mode may represent one or more Data Values in the Local Profile of a GRL Device. There will be a variety of modes that represent the normal operations of a micro controller or computer or mesh network they are not discussed in this disclosure. The present disclosure provides novel Modes that can be securely implemented with the ALDOSA and ALDOSAS capabilities. (See also Assimilated Mode, Limited Share Broadcast Mode, Listening Mode, Quiet Mode, Registration Mode, and Rescue Mode)

"Organization" as used herein in the context of a group means any group of people united by some "factor" agency, military, church, club, association, company, etc.

"Paired Asset" as used herein refers to two Assets that may naturally be found together for some useful purpose such as a Car and Keys, T V and Remote, Wallet and Smartphone, Smartphone and Charger, Pairs (of shoes, earrings, gloves, etc.).

"Paired Collective" as used herein represents any two GRLE Assets that have been Assimilated by their Owner to become a Collective of two discrete GRL Devices such as Paired Assets.

"Pinged" as used herein represents the act of a communication device trying to reach a GRL Device to communicate.

"Popcorn Dots" as used herein represents the point locations on a map typically separated by a consistent time interval of some asset that knows, publishes or is detected as to its location.

"Poured Materials" or "Pourable Materials" as used herein refers to any type of physical material (an Asset) that may be dispensed in a flow, or otherwise poured onto a conveyor belt, or be delivered via gravity from one container to another where the product may be of a liquid or solid of similar size and shape. A Poured Material may include one or both of a liquid or a solid that is commonly poured or carried on a conveyor. Examples of liquids that may be a Poured Material include but are not limited to: gasoline, milk, water and aqueous solutions. Materials that may be considered Poured Materials, include food items (tomatoes, oranges, cucumbers, fish, alcoholic beverages, milk, food commodities, industrial materials, fertilizer, coal, mining materials etc. and processed materials.

"Product Collective" as used herein represents the combination of a set of GRL Devices that have been Affixed to components used in the delivery of a product and that have been or will be Assimilated into a single product that sold or given a SKU or serial number or bar code that a common man would normally equate to a product delivery.

"Profiler" or "Profiler Database" as used herein means a database and associated logic that stores, adds, changes and deletes various tables, fields and Data Values for one or more Local Profiles. The Profiler Database may include, for example, other GRL Devices Local Profile Data Values in proximity to a GRL Device as defined by one or more Spatial Domains, or any other GRL Device published Local Profiles Data Values or other related data. In some examples, a Profiler may be made available over a digital communication network.

"Quality Seal": The Quality Seal represents a published data set of values based on cryptographic techniques to provide trustworthy levels for reporting a quality indication of metadata being delivered. Examples of data that may be associated with a Quality Seal include: GRL Device UUIDs, Affixed Asset serial numbers, GRL Device Data Values that may include GRL Device and its Affixed Asset Location Data, GRL Device Sensor Data GRL, Device Affixed Asset Sensor or other data relayed by the GRL Device, GRL Device Log files with historical Location Data, data processed by Smart Gateway Apps that was relayed by GRL Device as well as chain of trust information relating to the location of Spatial Domains where Registration occurred, etc.

"Quiet Mode" as used herein refers to the capability of a GRL Device to only respond and transmit a detectable signal when it receives and Authenticates a Quality Seal message.

"Registration Mode" as used herein involves the creation of a GRL Device that includes the provisioning of a unique UUID and private key in a designated location that is verified trilateration of signals from Reference Points "Requester" as used herein refers to any technology that is sending a signal that corresponds to set of instructions that ask a GRL Device to respond "Rescue Mode" as used herein when a GRL Device decodes and authenticates a legitimate Rescue Message from an Owner it will then transmit its UUID and other Data Values in response to a request.

"RF" as used herein means Radio Frequency

"Received Signal Strength" as used herein is an indicator of a magnitude of power of a received signal. It may be based a power of a transmitter, obstacles between the transmitter and a receiver, a distance between the transmitter and receiver and a quality of the receivers antenna and amplifier circuits. Received Signal Strength may be used for location estimation algorithms and is prone to wide variances of accuracy.

"Reference Points" as used herein means the geographic locations of transmitters that provide data to enable trilateration calculations. Reference Point as used herein means a code number that is part of a broadcast signal from a radio tower where the transmission source can be determined without a directional antenna.

"Self-Determine Its Location" as used herein, Its refers to a GRL Device that has determined its location.

"Self-Locate" as used herein means the ability of a GRL Device to determine its location by listening to radio signals from known transmitters (Reference Points) and determining its position by trilateration calculations. A GRL Device may also supplement process of location determination with additional data such as Received Signal Strength and other well-known techniques for location determination.

"Self-Locating" as used herein means execution of functionality to use an internal timing device to perform location derivation using trilateration, and in some implementations to additionally use Supplemental Location Data from other GRL Devices.

"Sensors" as used herein refers to an electronic or electromechanical device that represents a physical property in terms of one or both of: an analog electrical signal and a digital electrical signal. Processing Sensors A Sensor may include information that was related such as sensing an event like an email message that is interpreted or an event like a processing of a voice command that was lexicographically converted by another system into an electronic transaction that ("turn down the volume or stop") (See also, GRL Device Sensors", "Sensor Data Values", "Shared Sensors")

"Shared Sensors" as used herein represents the ability of a Collective to share data from GRL Device Sensors or GRL Device Affixed Asset Sensors or GRL Device Affixed Asset data delivered between them.

"Sleep Mode" as used herein is a common mode of many embedded systems, where the device may respond upon demand to a signal. The Quite Mode is a Sleep Mode with selective wake up capability based on Quality Seal data from an ALDOSA.

"Smart Gateway" as used herein means a mechanism capable of operating according to protocols required to transmit and receive data across a DCN. The Smart Gateway is also "smart" in that it is able to execute application software to provide a variety of functions that interact with local and remote devices. (in some related documents, including the priority document, a Smart Gateway may sometimes be referred to as a CNAD or Communications Network Access Device). By way of non-limiting example, a Smart Gateway may be Smartphone, a Tablet, a Wi-Fi Router, a GRL Device, and a Personal Computer.

"Smart Gateway Mode" as used herein means a GRL Device placed in an operational state enabling it to respond to a request to open a communication session with GRL Devices and DCN.

"Smart Gateway App" as used herein represents logic that can provide the functionality as described in various contexts related to the movement of data from a GRL Device to another Asset.

"Spatial Domain(s)" as used herein refers to a set of coordinates (fixed coordinate may include: GPS, a fixed location on or above the earth represented with Latitude/Longitude coordinates and altitude) or relative coordinates (relative coordinates may include: a moving Spatial Domain such as a pallet on a transport vehicle). Fixed coordinates and relative coordinates may be uniquely named, defined as a contiguous set of vectors forming an enclosed area such as, for example, a circle (as in property lines) or spherical area (such as a 3D shape) or is commonly known by such as inside a building or inside a box or inside a store room. For example, for a product, Spatial Domains may comprise a shipping container, an airplane cargo hold, a port, a truck 202, a box car, a store, a box 204, a warehouse building 203, a retail store interior 440, a retail store shelf 442, a retail store point of sale 443, a retail storeroom 441, a retailer shelf 441, a storage closet 451, a locker 452, a pantry, a refrigerator, a shelf and any area named and designed by people or systems where physical products may reside.

"Status" as used herein means one or both of a physical and logical state of a GRL Device. A Status may incorporate one or both of: details relating to an Asset to which it is Affixed and Data Values included in a GRL Device Local Profile.

"Status Condition" as used herein means a variable external to a GRL Device that is capable of changing a Status of a GRL Device.

"Supplemental Location Data" as used herein shall mean additional data from Reference Points such as signal strength from mapped RF (i.e. Wi-Fi) Transmitters to enable improved GRL System performance.

"Table" as used herein when discussing data means the common use of a database table that contains a set of Fields which contain discrete data values. In this Tables can be created by Events "Transaction Event" as used herein shall mean an Event wherein the condition materially affecting the state of on Asset includes a change in custody of the Asset.

"Trilateration" as used herein, refers to the process of determining absolute or relative locations of points by measurement of distances, using the geometry of spheres, circles and/or triangles.

"Triangulation" as used herein includes a process of determining a location of a point by measuring angles to it from known points at either end of a fixed baseline, rather than measuring distances to the point directly (trilateration). The point can then be fixed as the third point of a triangle with one known side and two known angles.

"Virtual Collective" as used herein represents the act of Assimilating one or more GRL Devices into a collective where you may not have direct communication with the GRL Device to complete the process of forming a Collective. For example: A company may tag all inventory in a Pallet as having been put into a new Collective and that Collective may have a set of new Data Values to be updated by the Collective Master. In this way a Collective Master that may not be in wireless communication range can have all of the appropriate Data Values for the Slaves to be compliant with the request for updated Data Values. In this way there is no resistance to the Assimilation because the updating of the Local Profile Data Values were completed in an Authenticated Spatial Domain. Then the location in which the Assimilation can occur can be built into the Quality Seal for both the Master and the Slaves of the Virtual Collective.

"Universally Unique Identifier" or "UUID" as used herein means a number used to uniquely identify some object or entity on the Internet. Depending on the specific mechanisms used, a UUID is either guaranteed to be different or is, at least, extremely likely to be different from any other UUID generated. In preferred embodiments, a UUID includes a 128 bit number.

"Users": as used herein includes a person or intelligent system who interacts with any GRL Device or GRLEA. Users may include one or more of: Active Users; System User; and a Person (as a User)

"User Groups": as used herein represents any list of people that are involved in at least one of: a common purpose, common membership and common emotional commitment.

"Wireless Energy Harvesting" as used herein means receiving electrical or electromagnetic energy via a conduit that does not include a physical contact with a battery, capacitor or power supply.

"Wireless Energy Receptor" as used herein means a medium capable of acting as a receiver of one or both of: electrical energy and electromagnetic radiation via wireless transmission. Examples of a Wireless Energy Receptor include: an antenna, an induction coil and a wire.

EXAMPLES

GRL Devices add a new type of IOT Location Sensor to a set of Asset types commonly called IoTs Internet of Things. This can be accomplished by adding a MAC to an existing Motherboard or PCB Printed Circuit Board that has all the required remaining components as taught in FIG. 01. Once an IoT device has the GRL Device capabilities as defined in this filing, its value and utility for providing additional Authenticated Location information is greatly enhanced.

In the application of tracking a person within a national boundary, upon entry into a foreign country, a foreign national can be required to carry their passport with them during their stay in the foreign country. A GRL Device may be attached to the passport and an Atomic Clock, or other high precision timing device, included in the GRL Device may be used to provide very accurate, low power location of the passport and hence the foreign national admitted within the national borders.

In addition, the ability of a first GRL Device to be self-aware of its location enables the first GRL Device to transmit its location to other GRL Devices located proximate to the first GRL Device. In this manner each GRL Device may be made aware of and record other GRL Devices proximate to each other. Such location awareness allows a record of which foreign nationals are proximate to other foreign nationals during their stay within the boundaries of foreign nation. In a similar fashion, personnel wearing security badges within a secure area be self-aware of their location and proximity to other persons within the secure area.

With sensitive air pressure sensors built into GRL Device sensors, relative and absolute altitude information could be made available to owners of Assets. This will enable a wide variety y of useful applications where specific floors and shelf positions of Assets could be determined and recorded for use by a Data Aggregator.

Another potential use of the GRL Device is to enable several GRL Devices to form a novel type of mesh network whereby the members of the Collective have the ability to communicate and collaborate with ALDOSA capabilities. This will enable the various members of a Collective to securely share information between them where some GRL Devices may have superior communications capabilities to a Digital Communications Network "DCN" such as the Internet, while others may share Sensor Data. The disclosure provides teachings for a few of a myriad of potential applications in FIGS. 4, 5, 6, 9, 13, 17, 23 and 29.

A potential use of Collectives could involve the automatic creation of a Collective via a GRL Device that has a Local Profile with Data Values configured to be a Master. For example: a GRL Device recognizes from other GRL Devices that are in Broadcast Mode that there are number of other GRL Devices that have been in the same Spatial Domain for a set period of time as defined in a Local Profile Data Value and it then can initiate another GRL Device App that causes a Collective to be created. This will provide convenience for a wide variety of users in both consumer, business and government applications.

One potential use of the GRL Device is to provide the ability to track Pourable Materials. A GRL Device may be Affixed to containers, pumps, hoppers and conveyors of potentially dangerous substances so that the container can Self-Determine Its Location and can automatically begin transmitting changes of its location if it senses movement or a change in its Status, penetration of a Geofence, or the removal of a container from a location through communication with a base unit. Further implementations of the GRL Device in this capacity include tagging a container, such as a bag that contains the common fertilizer ammonium nitrate, with a GRL Device in order to transmit information about whether or not the bag is stolen or not where it's supposed to be. This could, in turn, activate an alarm, similar to an amber alert, which allows all transmitters/receivers to activate an electronic search for the bag. Furthermore, a long antenna may be incorporated into the bag to further increase the communications and energy harvesting capabilities of the GRL Device.

In addition, GRL Devices may also be used to provide GRL Services, which refers to using a GRL location positioning system and at least one GRL Device that can accurately Self-Locate in order to provide certain services. The GRL System includes, among other things, a database of radio transmission towers (Reference Points) that have known locations (GPS coordinates) as well as radio frequency and unique identifier information. Working with this system, a GRL Service may utilize application programs and databases to provide information regarding one or more GRL Device locations and various Spatial Domains and Status environments. Operationally, a GRL Service may include one or more sets of information associated with a GRL Device via one or more of: captured data, calculated data, received data or transmitted data to or from a GRL Device that is stored within the GRL Device itself. Methods include tracking a geospatial location of the GRL Device and its Affixed Asset or legal entity associated with the GRL Device. Our Location Sensor is based on the use of an ultra-low power and miniature atomic clock that in combination with processor and other components illustrated in FIG. 1 can perform Self-Location via trilateration of reference radio signals. Furthermore, The Global Resource Locator service may interact with the GRL Device and use initially preexisting radio communications towers (Reference Points) where the transmission location is precisely known with GPS coordinates as well as a Reference Point to determine which tower is sending out an atomic clocked managed timing signal, wherein the GRL Device may receive transmissions from additional sources supplementing Reference Points. Transmission types may include, by way of non-limiting example, one or more of: radio, visible and non-visible light, and auditory, non-auditory sounds as well as concentrations of molecular airborne molecules and other properties with known or estimated locations. Transmission signals be used by an automated controller program to perform trilateration and triangulation algorithms and processes. Some trilateration processes may reference an internal database of transmitter locations and an internal atomic clock.

The Global Resource Locator service may interact with the GRL Device and use preexisting radio communications towers (Reference Points) where the transmission location is precisely known with GPS coordinates as well as a Reference Point to determine which tower is sending out an atomic clocked managed timing signal, wherein the GRL Device may receive transmissions from additional sources. Transmission types may include, by way of non-limiting example, one or more of: radio, visible and non-visible light, and auditory and non-auditory sound. Transmission signals be used by an automated controller to perform triangulation processes. Some triangulation processes may reference an internal database of transmitter locations and an internal atomic clock.

Another use of GRL Devices includes accurately locating, identifying, and tracking physical Assets and the data contained within or accessible to the Assets. A GRL Device may be one or both of fixedly attached to an Asset or inserted within an Asset, or which may be built into or attached to a second Asset. The GRL Device may include a receiver and a trilateration mechanism and may be included in a product, organism, produce, or component of a logistics chain. Accordingly, the enablement of low cost, low power, "Self-Location" capability to be added to "things". This invention relates to Assets to differentiate from the current definition of Things as in the Internet of Things. The Internet is not required to interoperate Assets and can simply be as broad as nearly any physical Asset as defined in the patent.

GRL Devices and supporting methods and apparatus may be used for accurately locating, identifying, and tracking physical Assets and data contained within the Assets. A GRL Device may be one or both of fixedly attached to an Asset or inserted within an Asset, or which may be built into or attached to a second Asset. The GRL Device may include a receiver and a trilateration mechanism and may be included in a product, organism, produce, or component of a logistics chain.

The provisioning of Spatial Domains automatically as shown in FIG. 14 that enable easy provisioning of Transaction Events with a Smart Gateway App.

This technique could work for commercial applications (check out at a store, and with ad hoc locations like farmer markets/art shows, and food distribution points).

Also, what was illustrated was one very simple technique of creating a perimeter from a set of points a PHOSITA in the world of mapping and 3D visualization systems have many ways of creating polygons that create contiguous planes or volumes.

A GRL Device initial Local Profile can be configured with the Reference Points and Spatial Domain coordinates so that it can receive additional Local Profile Data Values only in a specified Spatial Domain. This enables several valuable processes to occur including but not limited to Authenticated Affixing whereby a GRL Device that has been Affixed to an Asset will be able to provide assurances to the Owner or user of an Asset that it is indeed authentic and the information that the GRL Device can provide about the Asset is trustworthy. Authenticated modifications to the Local Profiles related to the Serialized Asset based on the UUID of the GRL Device can provide the ability for a Smart Gateway App to deliver Authenticated Data Values from the GRL Device to any requestor, that is requesting access to one or both of Data and logic stored on the GRL Device.

Another use of the GRL Device will be to use its ALDOSA capability along with a Quality Seal that provides levels of trust along with the Location Data and Authentication. These levels of trust can be based on the Trilateration, Received Signal Strength and Location Data provided by Reference Points (each with their own Quality Seals) such as (fixed (towers) and mobile (for example nearby Smartphones walking by OR a robot in a warehouse with a Smart Gateway publishing its precise location from its dead reckoning OR a Collective that has via Assimilation derived a superior set of position data that the Master is Publishing.)

The end result is the Quality Seal can include Temporal Accuracy (at this time+/− Sec, Min, Hour, Day I was here (in GPS, State Plane, Other Coordinate Mapping System) and my accuracy was +/−1 mm, 1 m, 10 m, 100 m, 1 km with this confidence interval OR I was inside this Spatial Domain or within X meters of the perimeter of the Spatial Domain.

The enhanced location determination via Atomic Clock level accurate Trilateration calculations can provide indoor and outdoor accuracy to enable definitive Asset location from its hashed UUID/Public Key.

Data stored on the GRL Device may include a level of Authentication associated with a Chain of Trust as well as an Asset Type it the GRL Device is purportedly Affixed. The data may also include when the GRL Device became Affixed to the Asset. How it was Affixed and who the Affixer was. In addition, if a GRL Device is "Reset", the GRL Device may store a record of a Smart Gateway App that Reset the GRL Device as well as a time record of the Reset and how the Smart Gateway App was executed and a time of execution of the Reset.

The Quality Seal will include Chain of Trust information that enables the receiver to authenticate any transaction with a Certificate Authority Type of Biometric data applied to the creation of the Transaction by the User when they started the Reset on the App. Reset is one of my "clean up" Modes that I am working on now for insertion on Friday. It applies to lower value GRL Devices where convenience is critical for market adoption versus GRL Devices headed to the medical marketplace.

In addition a Virtual Collective of a manufacturer and distributor could be created by one party, such as drug manufacturer and then seal the carton of drugs that were sent to a distributor where it was put into a pallet and a nurse in rural area that has Internet connection could easily determine that the ALDOSA is indeed Authentic. She would see the Location in which the case of drugs was manufactured by one member of the Collective and then later boxed into a pallet by another member of the Collective was indeed at a set of known Spatial Domains as determined by the GRL Devices built into the carton packaging and the pallet container where the trilateration calculations were completed by accessing a Authenticated set of Reference Points.

The above example illustrated a way in which there is value and utility for a wide variety of Manufacturers, Distributors, Retailers and Consumers (Personal, Business & Government) to trust a product point and time of manufacture with various levels in the Quality Seals as verified by an independent organization such as a Certificate Authority that has managed the process of creating the original UUIDs for GRL Devices in a defined Spatial Domain.

In addition, as GRL Devices provide ALDOSA to various recipients the decisions by the Owners of the Assets can limit the Location Data they provide to a lower level set in their Quality Seal for privacy or security reasons, while at the same time providing a very high level Data Value as it relates to the UUID of the GRL Device and the serial number of the Asset to which it was Affixed.

In addition, GRL Devices may also be used in a military context in order to track diverse, highly sensitive, and risky assets globally with low cost GRL labels. Security, operational efficiency, and cost of delivery can all be dramatically improved by tracking medium and low level assets. This is evidenced by the fact that some munitions currently rely upon Chip Scale Atomic Clocks for enhanced delivery. Military supplies represent some of the most protected assets on the earth. With GRL Devices, assets stored inside hangers and in warehouses can immediately be located. Additionally, control and monitoring of these assets are of paramount concern when moving in chaotic environments. The wide range of GRL Devices and GRL Labels to track many different types of assets from food to firearms with one common platform will open the ability for quartermasters and all logistics staff to develop far more efficient peacetime operations. Another military focused use of GRL Devices includes that basic troop provisions can be traced and recovered as needed. Furthermore, GRL Devices may also be used to provide additional opportunities for improved asset tracking and location in hostile environments where GPS has been rendered inoperative.

Yet another use of a GRL Device includes embedding GRL Device within security ID badges which will allow for the tracking and monitoring of employees, visitors, and consultants within a facility in order to improve security. This technology would provide a variety of services, such as allowing industrial engineers to analyze movement patterns, preventing employee access to restricted areas as defined by Geofences, and allowing databases of employee information to only be opened in specific areas like a guard stations. This would add a new security metric, when appropriate, in addition to user names and passwords.

Another use of GRL Devices includes tracking students within school grounds, inside and outside. This may be accomplished by activating GRL Devices within identification badges or devices when on school grounds, and/or activating GRL Devices when Assets leave designated Spatial Domains. In addition, GRL Devices may help minimize theft by detecting the usage of an Asset. By enabling GRL Devices within the labels of products (Assets), this will allow notifications in the case of theft by removing an Asset from a Geofence without authorization.

In addition to other uses, GRL Devices may also be used to track the location of construction materials on site in order to prevent loss.

In some implementations, scanning may resume until an authenticated command is received again and a confirming privacy sleep signal is received. Such aspects may allow a stolen product to be tracked by publishing its Log when it is in range of a DCN in this regard, there may be a standard "override" command that can be added to standard privacy settings that a consumer could may an appropriate police organization to activate.

In addition, GRL Devices may also be used to create Spatial Domains and define Geofences by defining a set of historical movement points within an area where the Log of the Data Values is contiguous from indoor to outside.

Another use of GRL Devices includes using the Geofence application in order to record to the transfers of ownership and shipping Status of Assets through location tracking. With these devices, the Status of Assets can be updated as the Assets move through Geofences within warehouses, shipping trucks, loading zones, and so on. In addition, environmental expose may also be recorded, which, all together, will improve operations for all parties involved in this process.

Another use of GRL Devices is accelerating the checkout process. The GRL Devices within products will register the spatial movement of being placed into a cart and can transmit information to the shopper's Smart Phone App. As the cart leaves the Spatial Domain of the retailer, this will be recognized via the GRL Devices, which will activate a payment transaction through the Smart Phone App.

Another use of GRL Devices includes the tracking of an Asset's precise location and usage which can then be reported back to interested parties. For example, medicine location and usage can be tracked by embedding a GRL Device within some part of the bottle.

Another application of GRL Devices includes drug administration. By incorporating a GRL Device on a patient's arm band, a syringe, a nurse, and/or a container with a drug dose, the appropriate distribution of drug doses can be monitored. Furthermore, the proper administration of drug doses can be ensured by having GRL Devices preset to activate certain tools in the process only when in proper proximity to other tools in the process in order to ensure that the dosage is being administered to patient correctly.

Another useful embodiment of this invention will enable the short haul and long haul trucking as well as local delivery companies to improve operations with their trading partners as well as customer service by utilizing GRL Devices. GPS saves this industry billions of dollars per year and yet they have been unable to fully implement RFID tags and other tracking technologies. Several factors have historically contributed to limit widespread adoption. Our invention with its small size, low power, and open source code accelerated development will help accelerate the adoption of ALDOSA capabilities and this will resolve many market impediments. The disclosure will show how the millions of trucks using GPS for tracking will be able to cost effectively track GRL Enabled pallets, cartons, cases and individual products and their accessories as they move through various global supply chains.

Another prospective use of a GRL System includes improving delivery services by improving the benefits of drone delivery. Use of a GRL System allows, sizable energy savings by enabling a drone to deliver a package as well as provide a certainty that a package was delivered to a correct location with a record of accurate time and location of delivery. A drone delivery system provides significant energy savings and value as compared to the current fuel powered delivery vehicles.

The wide scale acceptance of online purchases has led to a dramatic increase in individual packages to be delivered rather than picked up at a retail location. Given the dramatic energy and cost savings of UAV or Drone based delivery of lightweight items instead of using multi-ton vehicles, it is inevitable that new methods of delivering Assets (products) directly and accurately to their destination indoors while providing safe and traceable security will become valuable.

United Parcel Service claims to deploy over 102,000 motor vehicles, while Federal Express deploys more than 49,000 more. Each of these vehicles not only consumes fuel, but also adds to traffic and traffic delays which in turn requires still more fuel from other vehicles on the road. UPS claims to "save" 1.5 million gallons of fuel a year by reducing idle time. They do not provide an estimate of how much fuel is used in idle time, or how much "idle time" that their delivery vehicles cause other vehicles incur. Similarly, UPS claims to save an additional 12.1 million gallons of fuel with more efficient delivery routes. This is just one carrier.

The present invention provides systems that enable highly accurate and efficient delivery via more accurate tracking of package location than any system in use today using traditional motor vehicle based delivery and through the provision of highly accurate unmanned aerial vehicle (UAV) delivery of many packages.

Some exemplary implementations of the present invention include a type of Asset that is valuable to track its precise location and even its usage over time and report this information to various interested parties while protecting the confidentiality of the Owner. In this case the asset is a medicine pill bottle label that is printed with a GRL Device embedded in the label or otherwise fixedly attached to the bottle. The GRL Device may be pre-embedded or attached with an adhesive. A bottle cap may be manufactured with another GRL Device embedded in, or fixedly attached to plastic. When a prescription is filled by a Pharmacist, an appropriate timing of use may be associated with, or encoded into, the GRL Devices and at the same time, a Local Profile of the Pill Bottle, Cap and person taking physical possession of the filled prescription may activate an application that can serve as an automatic alert if the Pill Bottle has not been physically moved within the appropriate timeframe. For example, compliance with a prescribed medication schedule may be tracked by motion of an associated medication container and/or motion of the medication container while it is in proximity of the patient for which it is prescribed, An App may be configured to allow for family members to share credentials such that a family member picking up the prescription does not need to be a family member who would be notified if a time limit is exceeded for taking a next pill. In this example, a GRL Device may include a MEMS accelerometer, wherein the accelerometer may be used to register and track motion of a medication container. An associated processor may analyze tracked motion of the medication container and determine if the motion is commensurate with extraction of a dose of the medication from the container or simple movement of the container. If motion is determined to be commensurate with an extraction of medication, then an alert time clock may be reset. A same application may provide a link to update electronic health records via a Data Aggregator which may be especially valuable for any CRO clinical research organization running trials on behalf of a pharmaceutical company.

In another aspect, a construction job site with materials that include packaging with GRL Device embedded labels may provide for an immediate and constant updating of where each and every Asset is physically located. There are a variety of ways in which the construction related asset Assets may respond to queries (such as, for example a query requesting a moisture content of a wood paneling, or the like) to provide essential material location and material condition data to a construction manager, controller, loan manager or other interested party, by running a report on a system established by a Data Reporter.

Still other aspects may relate to preferences of a school district. The present invention enables ID badges and other identification devices (Assets) that may be activated on school grounds whereby student location may be tracked in real-time with alerts being initiated when Assets leave designated Spatial Domains. In addition, motion detectors may associate human movement with student and teacher identification devices. In such embodiments, a lack of a proper identification may indicate an unauthorized person on school grounds. Likewise if a student is not in a designated area at a designated timeframe (i.e. in a designated classroom) the GRL Device enabled device may indicate the student in a location that should be followed up on.

Example of Spatial Domains and Geofences may include Shelf, Cabinet, Fenced Area, an area defined by a set of historical movement points, tunnels, elevators, caves, warehouse, barracks, cabin (of a vehicle like a car, boat, airplane, etc.), truck cab, stairwell, park, plantation, harbor, pond, river, and stream.

The invention as disclosed herein has very broad applicability. Here we summarize just some of a non-limiting list of example Assets that may benefits from having GRL Devices Affixed to them. In some implementations, an Asset may comprise an extremely wide variety of things such as an individual product or its container, such as a Smartphone, a syringe, a pill bottle and its cap, a car, a television, a sweater, a can of soup, or a box of tomatoes. In some aspects, an Asset may comprise a living organism, such as an employee, pet, or tagged wildlife or laboratory animal specimen. In some implementations, an Asset may comprise a logistics component, such as a ship, truck, pallet, container, strap, or forklift within a warehouse, storeroom, closet or pantry. Assets can be of any type and can be generally considered as products such as: Home Assets: Televisions, Computers, Furniture, Artwork, Stereo Systems, Lawn Furniture, Décor, Rugs, Lighting, Pool Tables, Personal Computers, Gaming Systems, Home Structure, Security Systems, Locks, Passcode/Identification Systems, Networking Equipment, Recreational Vehicles. Personal Assets Clothing, Jewelry, Fashion Accessories, Watches, Smartphones, Wearables, Keys, Wallets, Purses, Backpacks, Suitcases, Shoes, Boots, etc. Restaurant Assets: Cooking Equipment, Tables, Chairs, Bartending Equipment, Reservation and Order Management Systems, Inventory Control Systems Museum Assets: Paintings, Artifacts, Lighting Fixtures, Security Monitoring Devices. Real estate structures and their fixtures. Technology Assets: cellphones, cameras, wearables, lab equipment and supplies, industrial equipment, UAVs and Drones. Various Goods: Textbooks, Lego sets, Designer handbags, Christmas Trees, Camping Gear, Solar Panels. Party supplies (glasses, chairs, tables, stereos, tents). Sports and Fitness Equipment: weights, workout machines, sports balls, golf clubs, tennis racquets, riding saddles, baseball bats, helmets etc.

A non-limiting set of example Assets that commonly have a frequent change in their Care Custody and Control include but are not limited to: Rental Cars, Rental Trucks, Rental Trailers, Rental Boats, Construction Equipment, Drilling Equipment, Workman Tools, Tuxedos and Evening Gowns, Hotel rooms, Timeshare Condos. Special Occasion Wear: Tuxedos, Evening gowns, Wedding dresses, Theater and dance costumes, Halloween costumes, Couture clothing. Accommodation: Hotel rooms, University dormitories, Apartments, Houses, Hostel rooms, lodging within someone else's accommodation (e.g. Airbnb). Animals: Chickens, Livestock.

Some non-limiting examples of Collectives can include: 1) a Fluid bag, a drip controller and patient in a hospital; 2) a Consumer Electronics Asset, its shipping box, and its accessories; and 3) a rope, hand powder bag and carbineer; 4) a chain saw, chain adjuster tool, and chain oil; 5) a crane, extender, pick up claw and barrel scoop; 6) a Smartphone with Bluetooth and Bluetooth Paired Devices 7) a car key and car 8) a Smartphone and a pair of glasses. A Collective in some cases may be called product kits or packages, examples include but are not limited to: surgical kits, a product and its accessories, tool box, repair kit, installation kit. A Collective may have a set of rules based on Data Values agreed upon by the Master of the Collective.

In general, Data Values may be modified, added, changed or deleted for each individual Asset at various times. Data Values may also be accomplished by criteria or groups, such as, for example, by one or more of: product, version, sub system, sub system settings, licensee, licensor, physical location, type of location, local governmental requirement, by corporate owner policy, by individual within proximity, safety regulation, police action, governmental agency, family member preference, time, environmental variable, and combination of the above and more.

The Data Values in a GRL Device's Local Profile can contain information regarding its history of movement with its ability to Self-Locate. This type of time sequential Event information is stored in Log File. There are many well-known Log Formats. NCSA Common Log Format, NCSA Extended Log Format, W3C Extended; Sun One Web Server, IBM Tivoli Access Manager; FTP Logs; and Custom Log File Format with information defined by users. Examples of Logs may include: Authentication Log which includes a record of GRL Device authentications of a self-determined locations; Event Log includes a record of instances where predefined conditions defined as an Event are met; Location Log includes a record of GRL Device self-determined locations.

The GRL Device may include Sensors or its Affixed Asset may have Sensors and access to other systems that can then communicate with the GRL Device. Non-limiting examples of Sensors include devise that measure physical properties relating to: Acoustic, Acceleration, Air pressure, Biosensor, Chemical, Displacement, Flow, Force, Gas, Humidity, Level, Displacement, Proximity, Biosensors, Image, Pressure, Speed, Magnetic Mass, Moisture, Strain gauge Temperature, Tilt, Viscosity.

Non-limiting examples of Groups are used throughout the document to describe the natural affinity of like-minded people to work together. These Groups will most likely want to share various assets at various times including GRLEAs where the act of Enabling an Asset creates utility and value that can be shared by and enjoyed by the Group members. Not limiting examples of User Groups include: social media groups, such as LinkedIn Groups, Facebook Groups, Twitter feed members, Usenet Lists, Association Members, Buyers Clubs, Apartment Residents. User Groups can be naturally aligned by their membership in any organization that they belong to. User Group can be employees of a governmental agency or department or for profit or non-profit company, or any work group or division such as Firemen, Forensic Lab, Health Inspectors, Property Assessors, Health Inspectors, Teachers, Research Department, Marketing Team, Program Development Team etc. to name a few. A User Group can be a set of Grouped Assets. It will be natural for Groups to want to share their Assets and wish to create Collectives of their GRL Enabled Assets.

Non limiting examples of Identifiers include, but are not limited to: Biometric: DNA Matching Ear Recognition (Visual Biometric, the identification of an individual using the shape of the ear. Eyes-Iris Recognition, Retina Recognition, Face Recognition, Fingerprint Recognition, Finger/Hand Geometry Recognition, Gait/walking style, Olfactory Biometric Signature Recognition, Typing Recognition, Vein Recognition, Voice, etc.

Non-limiting examples of Status can include a variety of conditions and states of a GRL Device and the Asset that it is Affixed to such as: Legal Status: Under Jurisdiction of Police, Military, Homeowner, Apartment Complex Owner etc. Ownership Status: Uncertain, Mortgaged/Impaired. Operational Status On/Off, Working/Non Functional, In Zone, Out of Zone. Status as used herein refers to a non-location-based domain, wherein the Status of Local Profile Data Values are based upon a required Quality Seal level.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. References made to literature such as Wikipedia, are believed to be referenced from content present as of the date of filing.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Finally, the development of this invention into a functioning product and service offering may include the involvement of multiple Persons Having Ordinary Skill In The Art (PHOSITAs) in multiple industries including but not limited to atomic clocks, quantum physics, MAC manufacturing, MEMS and CMOS design and manufacturing, transceiver and antenna design, software development, embedded systems development, product packaging, relational database design, network security, cryptography, RFID systems, logistics, product packaging and user interface design.

Thus, particular embodiments of the subject matter have been described. Other embodiments are within the scope of the following claims. In some cases, the actions recited in the claims can be performed in a different order and still achieve desirable results. In addition, the processes depicted in the accompanying Figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method for tracking a physical asset using a label affixed to the physical asset, the method comprising the steps of:
   a. providing a continuous strip of labels on a reel, each label embedded with a respective Global Resource Locator (GRL) device;
   b. peeling a first label from the reel and affixing to the physical asset, thereby associating the physical asset with a unique first GRL device embedded on the first label;
   c. receiving logical communications, from multiple reference points, into a radio receiver of the unique first GRL device;
   d. determining a location of the unique first GRL device based upon the received logical communications, thereby determining a location of the physical asset;
   e. storing location data of the unique first GRL device in a log of the unique first GRL device; and
   f. transmitting, based on a predetermined schedule, the stored location data from the log to a smart gateway via a transmitter of the unique first GRL device.

2. The method of claim 1, wherein a respective GRL device comprises a clock, a processor in logical communication with the clock, a unique identifier; the radio receiver, the transmitter, and a digital storage comprising a log and software executable upon demand, the software operative with the processor to cause the respective GRL device to receive and store the logical communications from the multiple reference points.

3. The method of claim 1, additionally comprising registering the unique first GRL device with a smart gateway app prior—to or after affixing the label to the physical asset.

4. The method of claim 1, wherein the step of transmitting the stored location data further comprising encrypting the stored location data using a cryptographic technique before transmission.

5. The method of claim 1, further comprising a step of associating the unique first GRL device with a collective of GRL devices, enabling the unique first GRL device to share sensor data and location information with other GRL devices within the collective of GRL devices.

6. The method of claim 5, further comprising a step of determining that the unique first GRL device is out of a bulk box when the unique first GRL device is no longer in proximity to the collective of GRL devices or the first GRL device cannot communicate with the other GRL devices within the collective of GRL devices.

7. The method of claim 6, further comprising determining that the unique first GRL device is out of the bulk box in an unauthorized location.

8. The method of claim 6, further comprising determining that the unique first GRL device is in the bulk box in a warehouse or a building.

9. The method of claim 1, further comprising a step of updating the log in the unique first GRL device to record the physical asset's movement across predefined spatial domains, wherein updating the log is based on changes in the physical asset's location as determined by a self-locating capability of the unique first GRL device.

10. The method of claim 1, additionally comprising a step wherein the smart gateway processes a received location data to authenticate the location of the unique first GRL device using a quality seal data associated with the unique first GRL device, thereby verifying an accuracy and authenticity of the physical asset's location.

11. The method of claim 5, further comprising a step of utilizing the unique first GRL device's sensor data to trigger specific actions or alerts based on predefined conditions related to the physical asset's environment, such as one or more of:
temperature, pressure, humidity, vibration, radiation, acceleration, unauthorized movement, or entry into a restricted spatial domain.

12. The method of claim 1, additionally comprising a step of tracking location data of the unique first GRL device and integrating the tracked location data with geospatial mapping, enabling visual tracking and management of the physical asset across various spatial domains.

13. The method of claim 1, further comprising utilizing one or both of trilateration and triangulation methods based on the logical communications received from the multiple reference points to determine the location of the unique first GRL device.

14. The method of claim 1, wherein the step of affixing the label to the physical asset further comprising utilizing an affixing vehicle selected from a group consisting of glue, stable, tape, magnet, sticker or a mechanical fastener, providing diverse means for securely attaching the unique first GRL device to the physical asset.

15. The method of claim 1, wherein the smart gateway is selected from a group consisting of a smartphone, tablet, and a wearable device.

16. The method of claim 10, further comprising a step of interacting with a smart gateway app installed on the smart gateway for accessing, visualizing, and managing the received location data.

17. The method of claim 1, further comprising a step of employing a wireless energy harvesting technique to power the unique first GRL device.

18. The method of claim 1, additionally comprising a step wherein the unique first GRL device enters a quiet mode, in which it does not respond to normal signaling protocols unless it receives and authenticates a quality seal message.

19. The method of claim 1, wherein the step of peeling the first label off from the reel further comprising tearing the continuous strip of labels at a seam separating the first label and adjacent labels preprinted on the continuous strip of labels.

20. A method for tracking a physical asset using a label affixed to the physical asset, the method comprising the steps of:
a. providing a continuous strip of labels on a reel, each label embedded with a respective Global Resource Locator (GRL) device, each GRL device comprising a clock, a processor in logical communication with the clock, a unique identifier; a radio receiver, a transmitter, and a digital storage comprising a log and software executable upon demand, the software operative with the processor to cause the GRL device to receive and store logical communications from multiple reference points;
b. removing a first label from the reel and affixing to the physical asset, thereby associating the physical asset with a unique first GRL device embedded on the first label;
c. receiving the logical communications into the radio receiver of the unique first GRL device;
d. determining a location of the unique first GRL device based upon the received logical communications, thereby determining a location of the physical asset;
e. storing the location of the unique first GRL device in the log of the unique first GRL device; and
f. referencing a predetermined schedule, transmitting the stored location from the log to a smart gateway via the transmitter of the unique first GRL device.

* * * * *